(12) United States Patent
Phipps

(10) Patent No.: US 11,045,944 B2
(45) Date of Patent: Jun. 29, 2021

(54) ARTICULATED ARM COORDINATE MEASURING MACHINE HAVING THERMAL COMPENSATION

(71) Applicant: FARO Technologies, Inc., Lake Mary, FL (US)

(72) Inventor: James P. Phipps, Sorrento, FL (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 355 days.

(21) Appl. No.: 16/253,920

(22) Filed: Jan. 22, 2019

(65) Prior Publication Data

US 2020/0230802 A1 Jul. 23, 2020

(51) Int. Cl.
*G01B 21/04* (2006.01)
*B25J 1/02* (2006.01)
*B25J 19/02* (2006.01)
*B25J 19/00* (2006.01)

(52) U.S. Cl.
CPC .............. *B25J 1/02* (2013.01); *B25J 19/0075* (2013.01); *B25J 19/02* (2013.01); *G01B 21/045* (2013.01)

(58) Field of Classification Search
CPC .......... B25J 1/02; B25J 19/02; B25J 19/0075; G01B 21/045; G01B 5/008; G01B 5/0014
USPC .......................................................... 33/503
See application file for complete search history.

(56) References Cited

U.S. PATENT DOCUMENTS

| | | | |
|---|---|---|---|
| 7,861,430 B2 * | 1/2011 | Jonas | G01B 21/045 33/503 |
| 8,028,432 B2 | 10/2011 | Bailey et al. | |
| 8,474,148 B2 * | 7/2013 | Jonas | G01B 21/045 33/503 |
| 8,919,005 B2 * | 12/2014 | Mamour | G01B 5/0014 33/503 |
| 2004/0184039 A1 * | 9/2004 | Christoph | G01B 5/0014 356/601 |
| 2015/0330761 A1 | 11/2015 | Gong | |
| 2015/0330762 A1 | 11/2015 | Gong | |
| 2015/0330763 A1 | 11/2015 | Gong | |
| 2015/0330764 A1 | 11/2015 | Gong | |
| 2015/0330765 A1 | 11/2015 | Gong | |
| 2015/0330766 A1 | 11/2015 | Gong | |
| 2015/0355310 A1 | 12/2015 | Gong et al. | |
| 2020/0230802 A1 * | 7/2020 | Phipps | B25J 1/02 |
| 2020/0249004 A1 * | 8/2020 | Phipps | G01B 5/008 |

* cited by examiner

*Primary Examiner* — Yaritza Guadalupe-McCall
(74) *Attorney, Agent, or Firm* — Cantor Colburn LLP

(57) ABSTRACT

An articulated arm coordinate measuring machine (AACMM) includes one or more heater elements that cooperate with a processor to maintain one or more components in the AACMM within a predetermined temperature range.

23 Claims, 48 Drawing Sheets

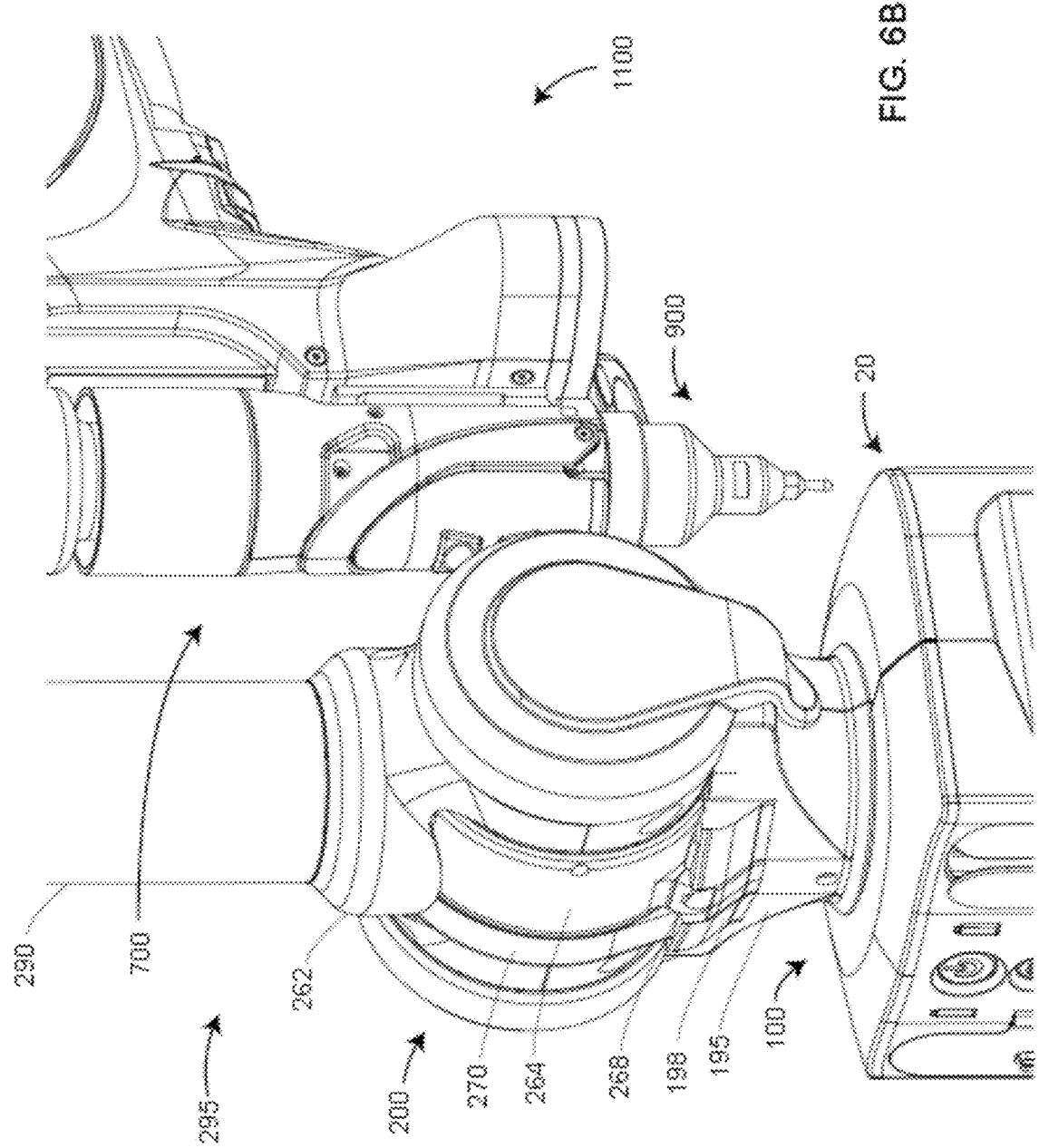

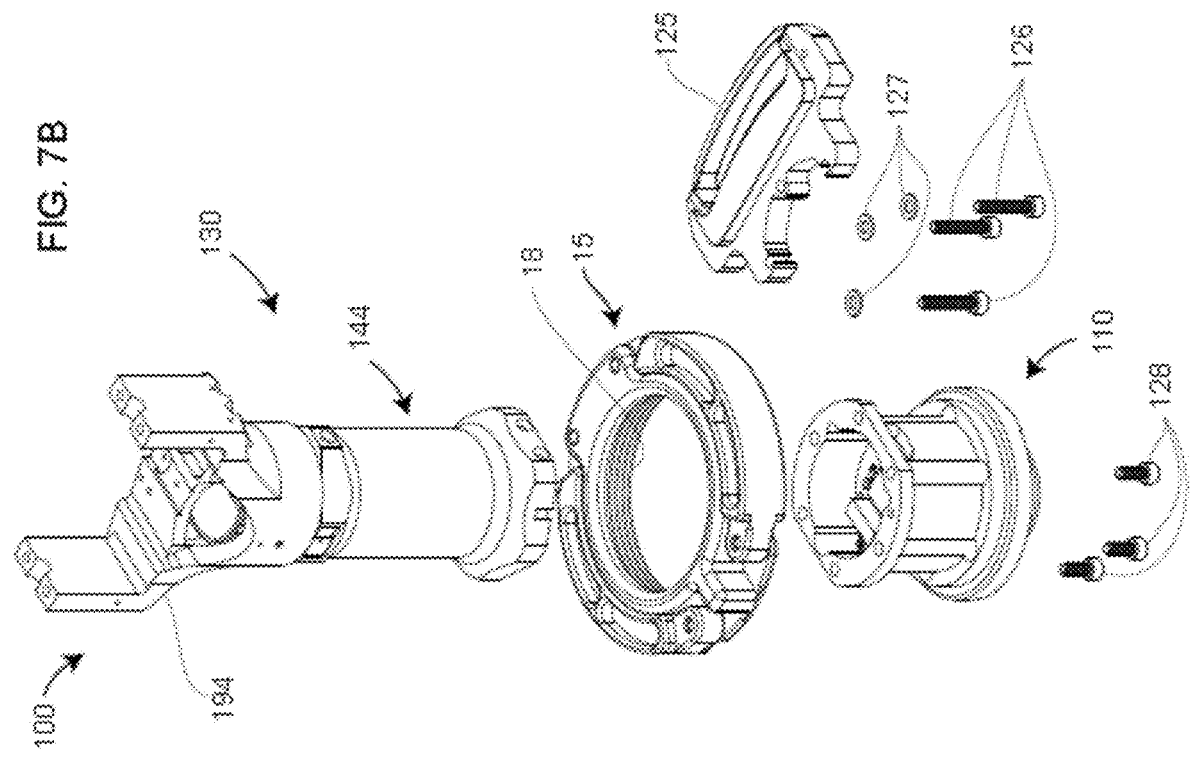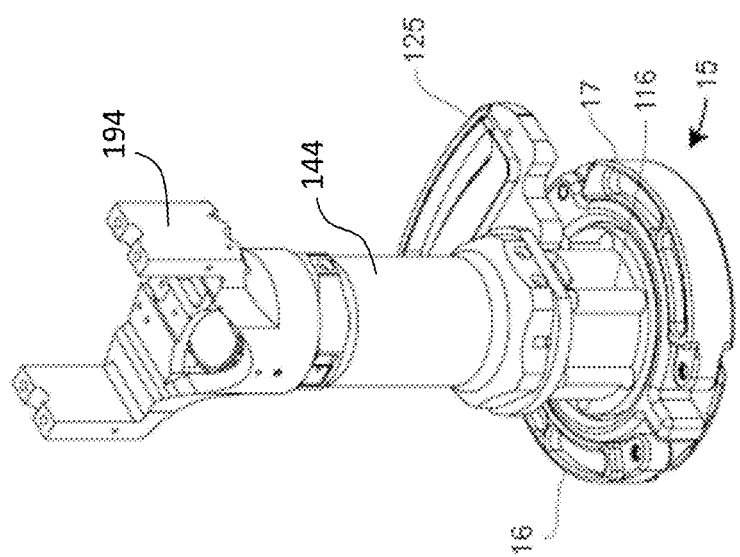

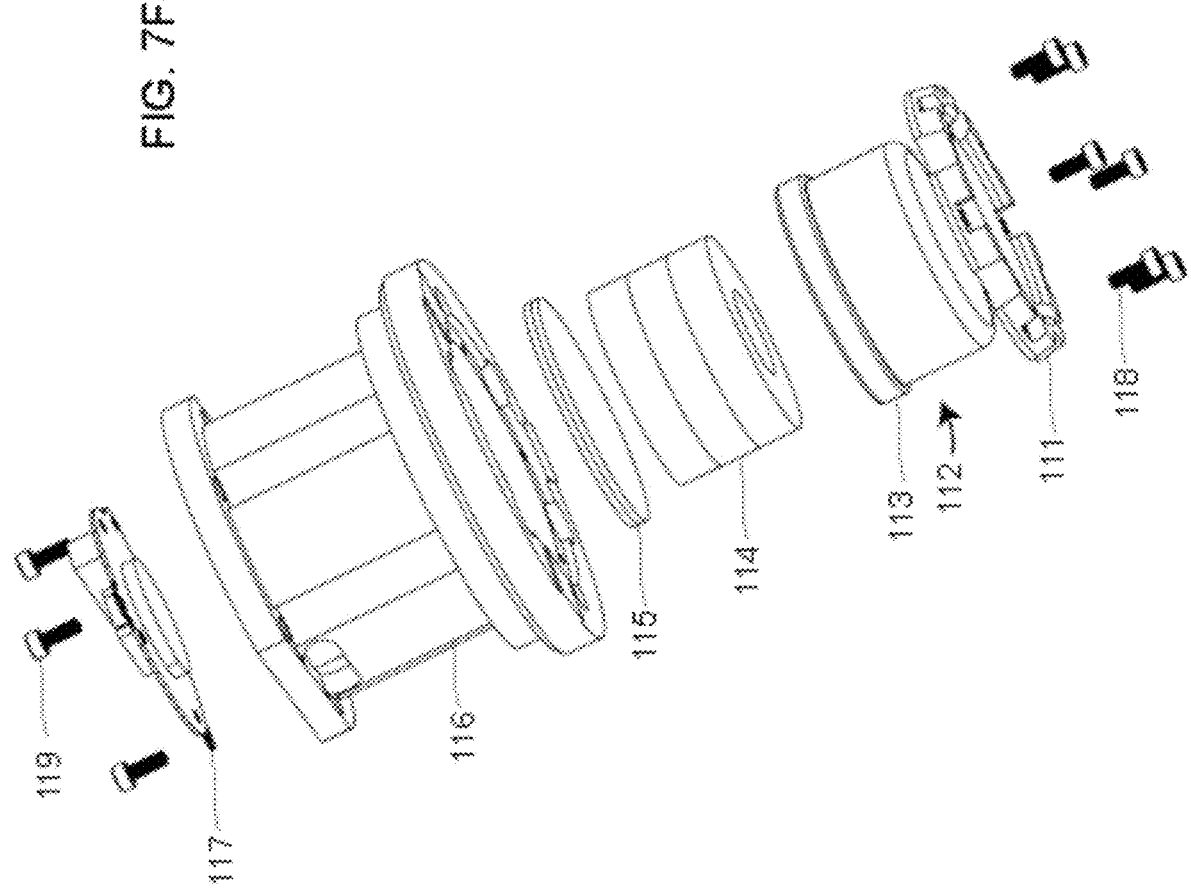
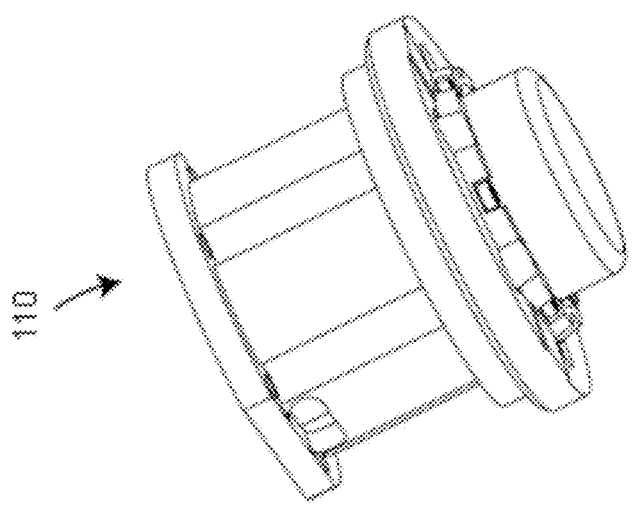

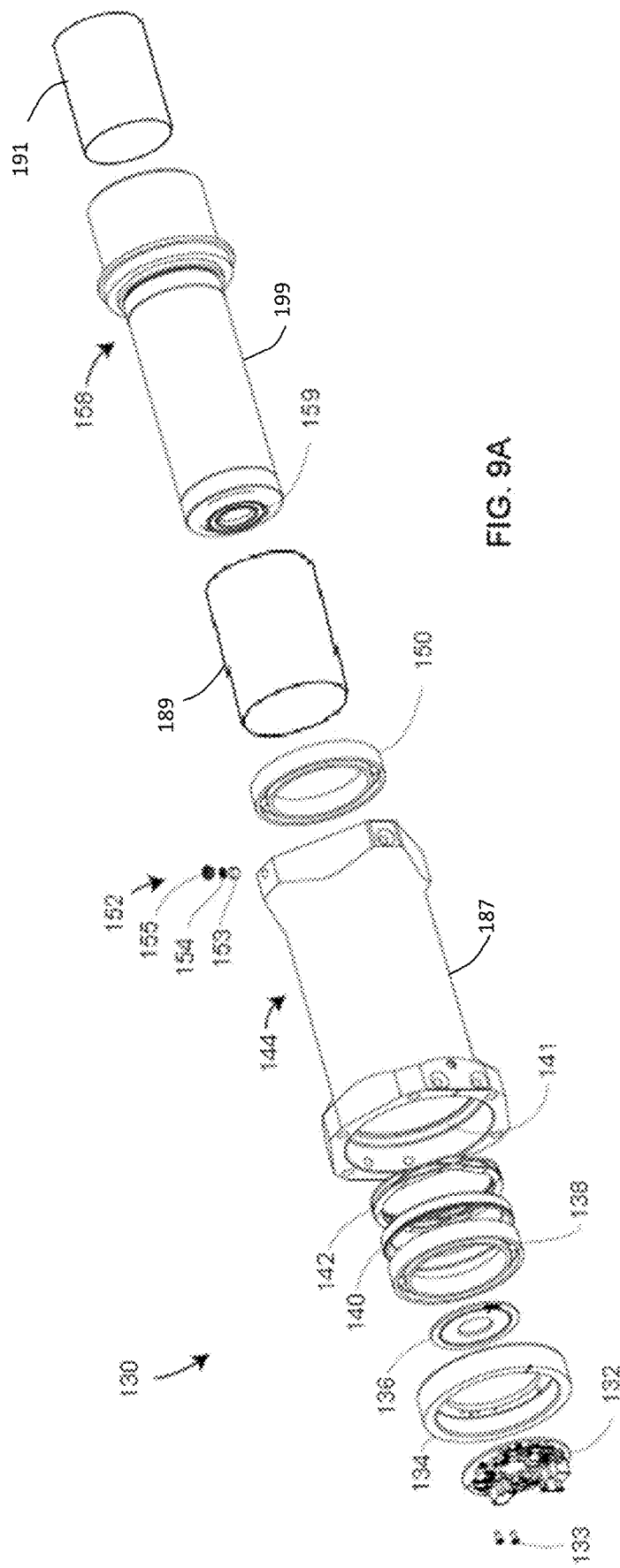

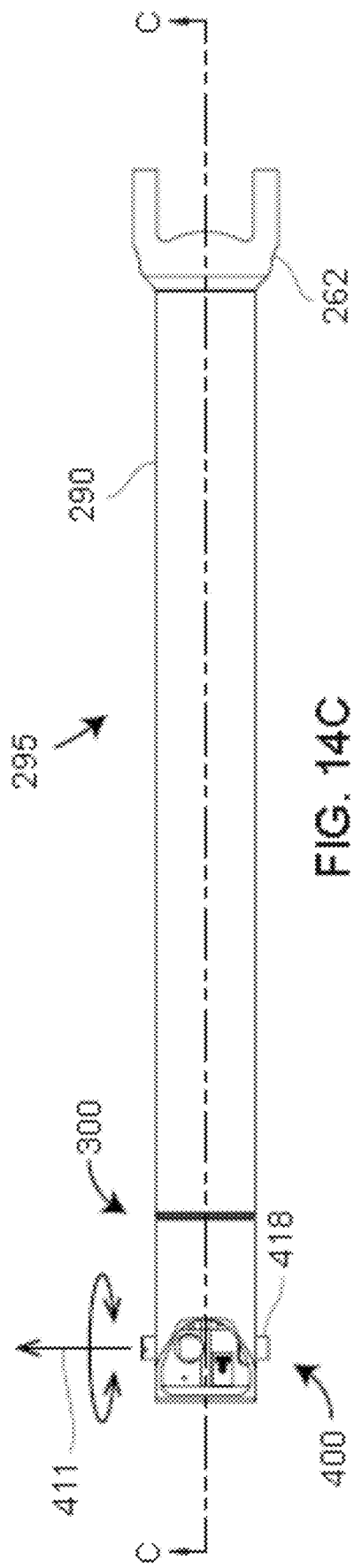
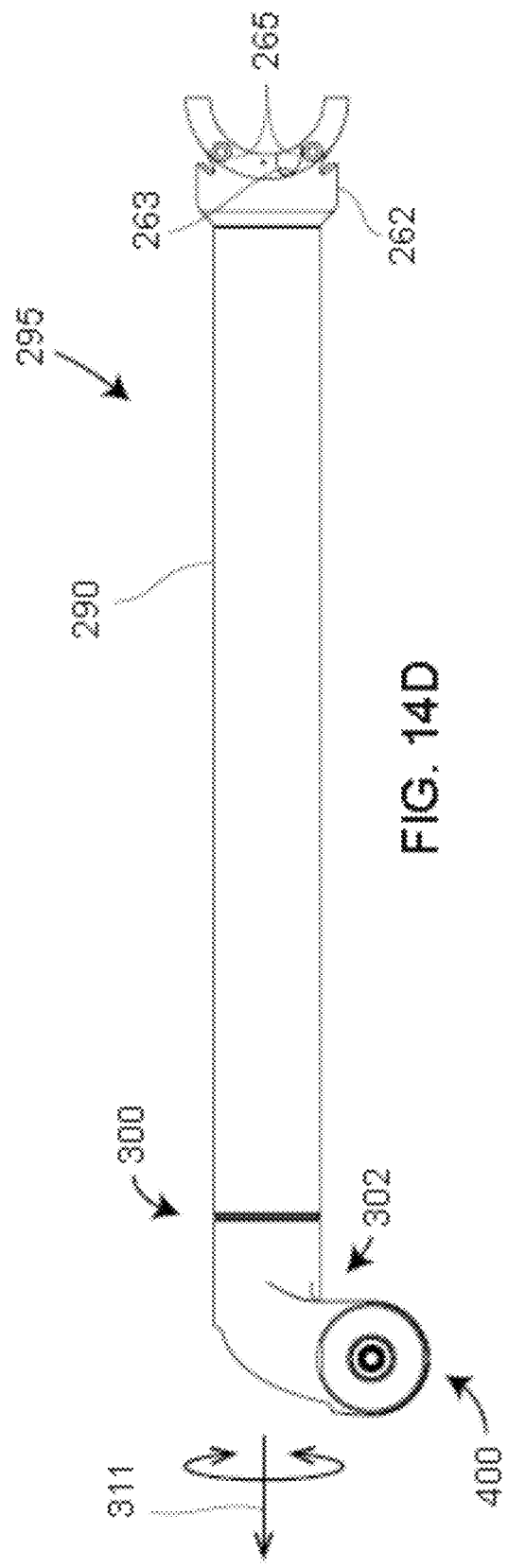
FIG. 14C
FIG. 14D

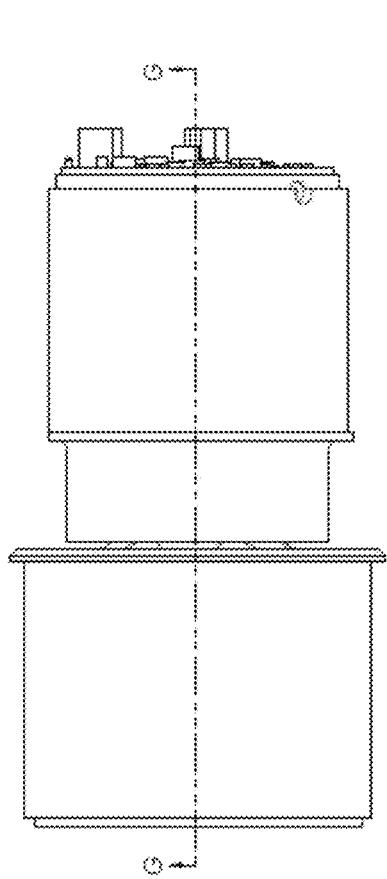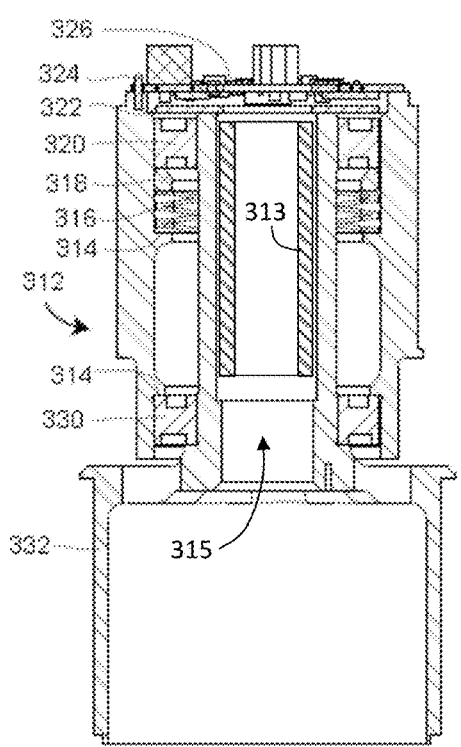
FIG. 15C
FIG. 15D

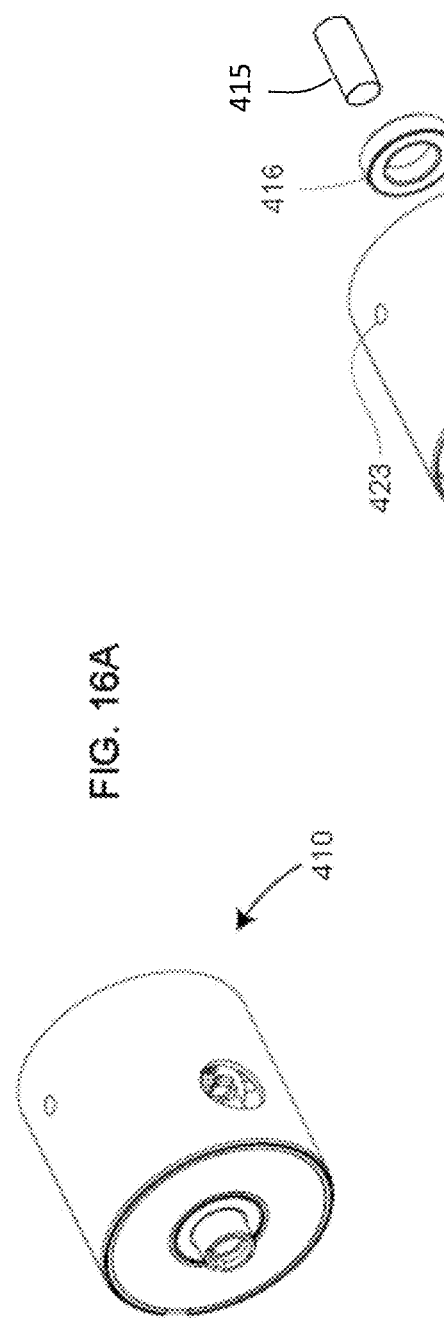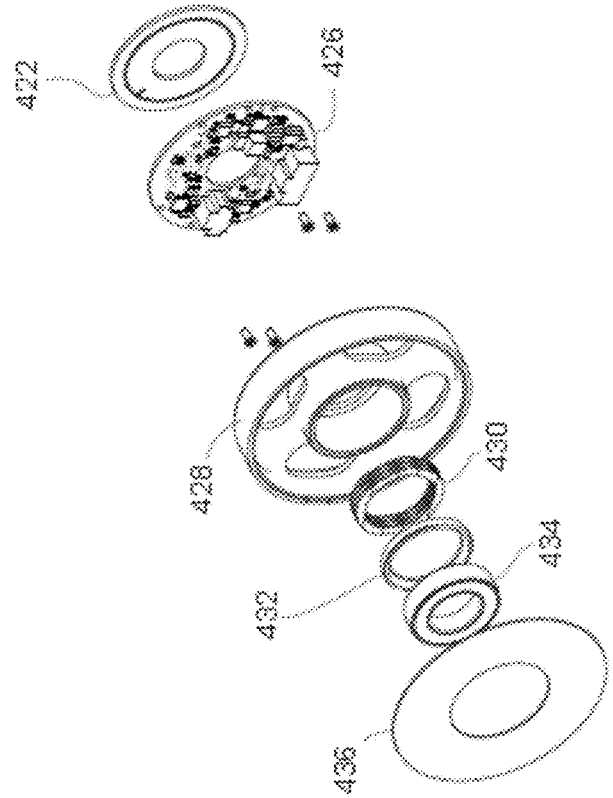
FIG. 16A
FIG. 16B

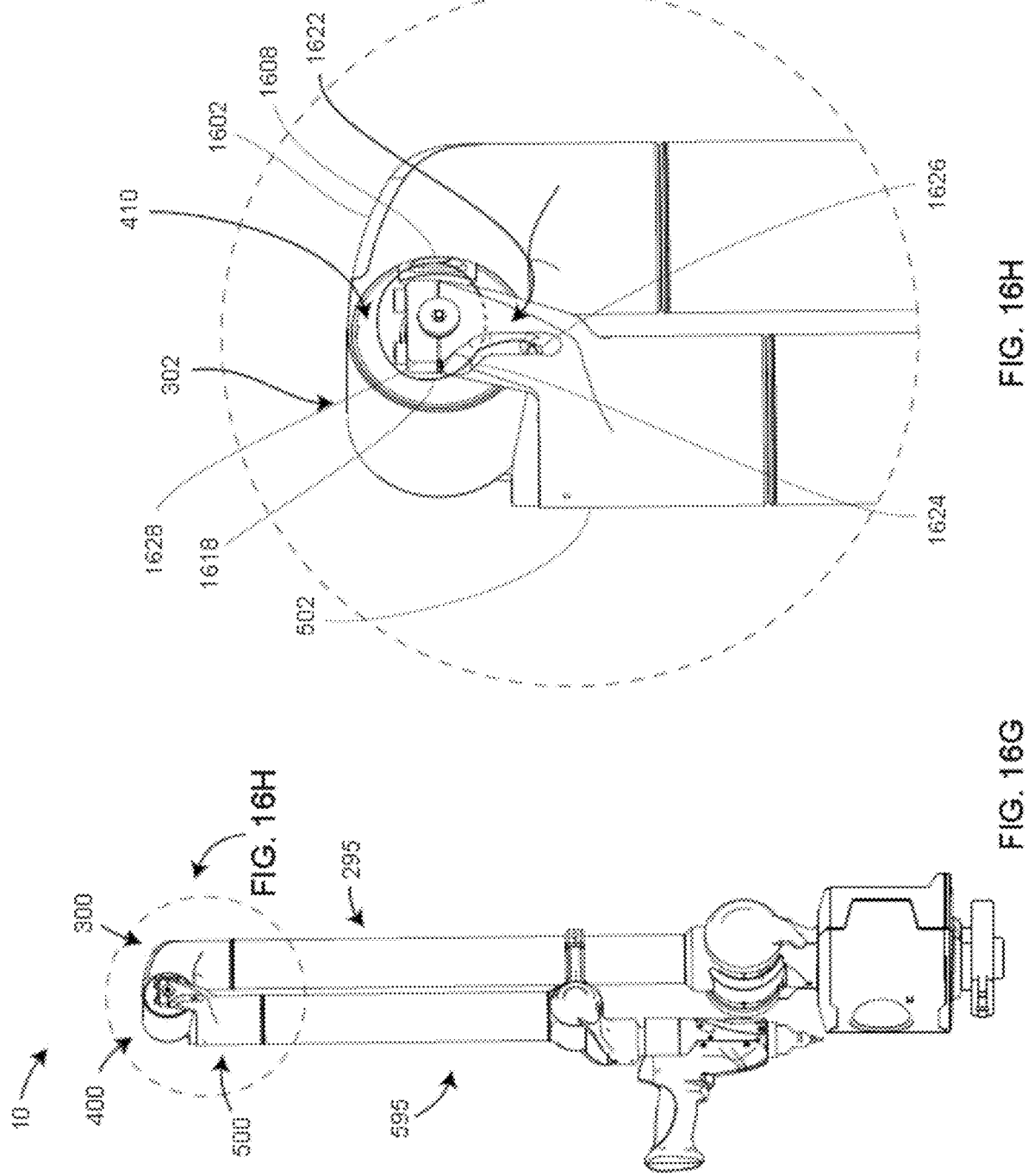

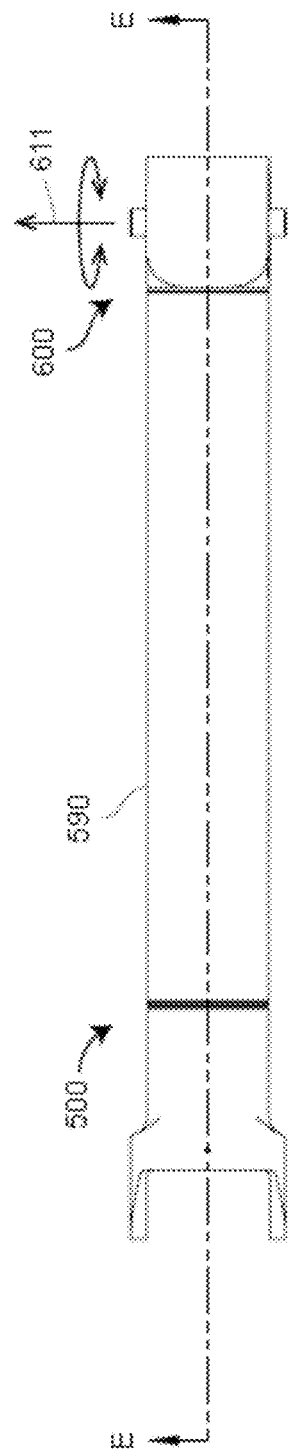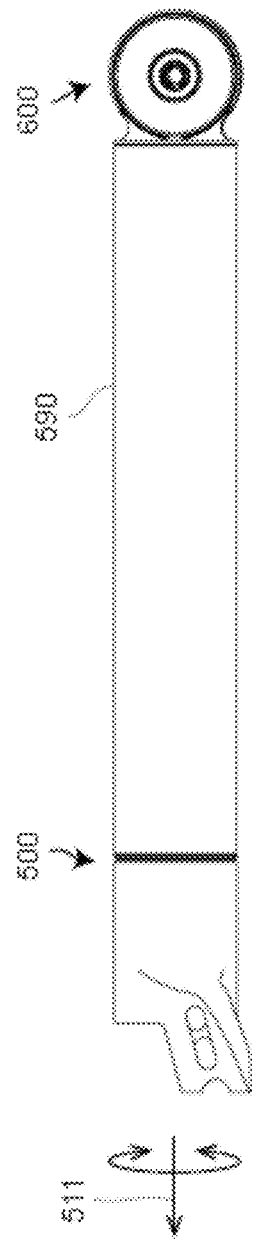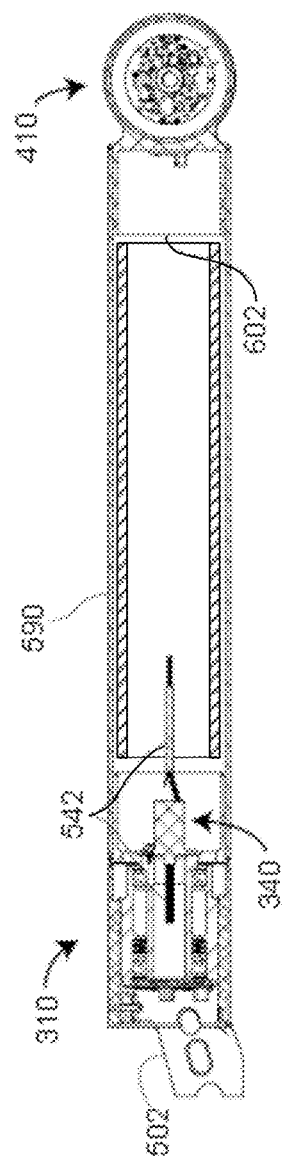

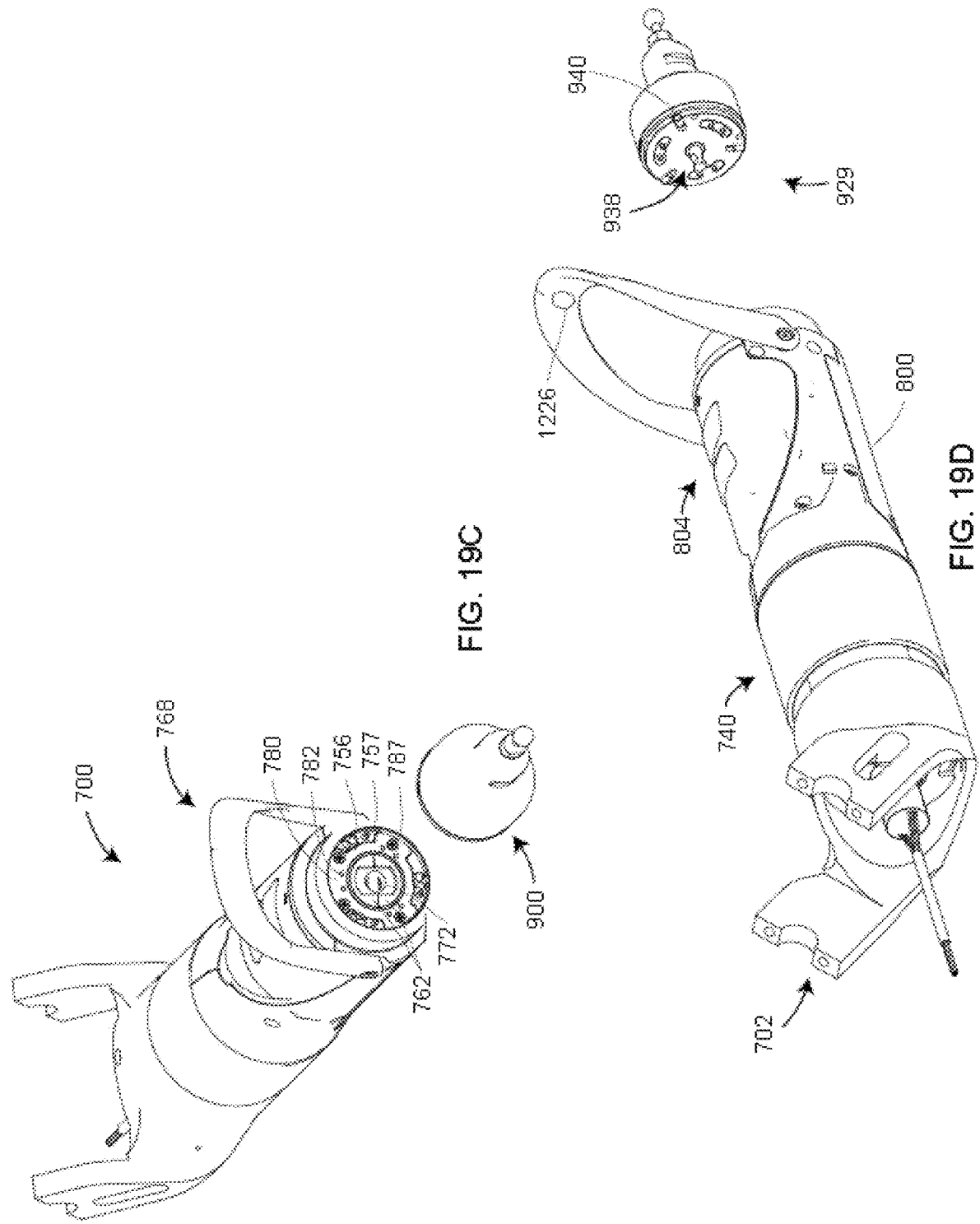

SECTION G-G

ARTICULATED ARM COORDINATE MEASURING MACHINE HAVING THERMAL COMPENSATION

BACKGROUND

The present disclosure relates to a coordinate measuring system, and in particular to coordinate measuring system including or cooperating with a portable articulated arm coordinate measuring machine (AACMM) that actively compensates for thermal effects.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

AACMM's are typically rated to operate within a defined temperature range. It should be appreciated that due to effects of the coefficient of thermal expansion (CTE), the dimensions of the components of the AACMM, such as the arm segments or the bearing assemblies for example, may change relative to the size when the AACMM was initially calibrated. The change in temperature may be due to the environment, or due to smaller thermal loads from the operators hand or body. Further, due to the CTE the materials used in the AACMM may be restricted, for example materials that have a high CTE such as aluminum are generally avoided. It should be appreciated that in some cases this results in the use of higher cost materials.

Accordingly, while existing AACMM's are suitable for their intended purposes the need for improvement remains, particularly in providing an AACMM having the features described herein.

BRIEF DESCRIPTION

According to one aspect of the invention, a portable articulated arm coordinate measuring machine (AACMM) for measuring the coordinates of an object in space is provided. The AACMM comprises a base and a manually positionable arm portion. The arm portion having an opposed first end and second end, the arm portion being rotationally coupled to the base, the arm portion including a plurality of connected arm segments, each arm segment including at least one position transducer for producing a position signal and at least one temperature sensor for producing a temperature signal. At least one heater element is associated with at least one of the plurality of connected arm segments. A measurement probe is coupled to the first end. An electronic circuit is provided that receives the temperature signal and activates the at least one heater element when a measured temperature is less than a predetermined temperature range.

In addition to one or more of the features described herein, or as an alternative, further embodiments of the AACMM may include the plurality of connected arm segments having a first arm segment and a second arm segment. In addition to one or more of the features described herein, or as an alternative, further embodiments of the AACMM may include a first axis-assembly and a second axis assembly coupled between the base and the first arm segment. In addition to one or more of the features described herein, or as an alternative, further embodiments of the AACMM may include a first heater element thermally coupled to the first-axis assembly.

In addition to one or more of the features described herein, or as an alternative, further embodiments of the AACMM may include the first axis-assembly having a bearing cartridge having a shaft and a housing operably coupled by a pair of bearings, the first heater element being thermally coupled to one of the shaft or housing. In addition to one or more of the features described herein, or as an alternative, further embodiments of the AACMM may include a third-axis rotary assembly and a fourth-axis rotary assembly coupled between the first arm segment and the second arm segment. In addition to one or more of the features described herein, or as an alternative, further embodiments of the AACMM may include a second heater element thermally coupled to one of the third rotary assembly and the fourth rotary assembly.

In addition to one or more of the features described herein, or as an alternative, further embodiments of the AACMM may include a third heater element thermally coupled to the other of the third rotary assembly and the fourth rotary assembly. In addition to one or more of the features described herein, or as an alternative, further embodiments of the AACMM may include a fourth heater assembly thermally coupled to the first arm segment. In addition to one or more of the features described herein, or as an alternative, further embodiments of the AACMM may include first arm segment having a first tube operably coupled between the base and the second arm segment.

In addition to one or more of the features described herein, or as an alternative, further embodiments of the AACMM may include the fourth heater assembly is coupled to an inside diameter of the first tube. In addition to one or more of the features described herein, or as an alternative, further embodiments of the AACMM may include the second arm segment includes a second tube operably coupled between the first arm segment and the first end. In addition to one or more of the features described herein, or as an alternative, further embodiments of the AACMM may include at least one segment temperature sensor operably coupled to measure a temperature of one of the first arm segment or the second arm segment.

In addition to one or more of the features described herein, or as an alternative, further embodiments of the AACMM may include the at least one segment temperature sensor having a first segment temperature sensor and a second segment temperature sensor, the first segment temperature sensor being operably coupled to measure a first temperature of the first arm segment, the second segment temperature sensor being operably coupled to measure a second temperature of the second arm segment.

According to another aspect of the invention, a portable articulated arm coordinate measuring machine (AACMM) for measuring the coordinates of an object in space is provided. The AACMM comprising a base and a first-axis assembly coupled to the base. A second-axis assembly is coupled to the first-axis assembly. A first arm segment is coupled to the second-axis assembly. A second arm segment is operably coupled to the first arm segment. A measurement probe is operably coupled to the second arm segment. At least one heater element is associated with at least one of the first-axis assembly, the second-axis assembly, the first arm segment or the second arm segment. At least one temperature sensor associated with at least one of the first-axis assembly, the second-axis assembly, the first arm segment or the second arm segment, the at least one temperature sensor producing a temperature signal. An electronic circuit is provided that receives the temperature signal and activates the at least one heater element when a measured temperature is less than a predetermined temperature range.

In addition to one or more of the features described herein, or as an alternative, further embodiments of the AACMM may include the first-axis assembly comprising a first bearing cartridge having a housing operably coupled to a shaft by a pair of bearings. In addition to one or more of the features described herein, or as an alternative, further embodiments of the AACMM may include the at least one heater element being thermally coupled to the shaft. In addition to one or more of the features described herein, or as an alternative, further embodiments of the AACMM may include the at least one heater element is thermally coupled to the housing. In addition to one or more of the features described herein, or as an alternative, further embodiments of the AACMM may include the at least one heater is coupled to an outer surface of the housing. In addition to one or more of the features described herein, or as an alternative, further embodiments of the AACMM may include the at least one heater being coupled to the housing in a gap between the shaft and an inside diameter of the housing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6B is an isometric view showing relative positions of some elements of the AACMM when connected arm segments are held in a vertical orientation according to an embodiment;

FIG. 7A and FIG. 7B are isometric and exploded views, respectively, of a first-axis assembly and a mounting device according to an embodiment;

FIGS. 7E, 7F, 7G, and FIG. 7H are isometric, exploded, front, and cross-sectional views, respectively, of a shock-absorber bumper according to an embodiment;

FIG. 9A and FIG. 9B are exploded and isometric views of the first-axis cartridge according to an embodiment;

FIGS. 14A, 14B, 14C, 14D, and FIG. 14E are isometric, exploded, front, side, and section views, respectively, of a third-axis assembly, a fourth-axis assembly, and a first segment according to an embodiment;

FIGS. 15A, 15B, 15C, and FIG. 15D are isometric, exploded, front, and section views of a third/fifth axis cartridge according to an embodiment;

FIGS. 16A, 16B, 16C, 16D are isometric, exploded, front, and section views of a fourth/sixth axis cartridge according to an embodiment;

FIGS. 16E, 16F, 16G, and FIG. 16H are isometric, partially exposed views of elements of third-, fourth-, and fifth-axis assemblies according to an embodiment;

FIGS. 17A, 17B, 17C, 17D, and FIG. 17E are isometric, exploded, front, side, and section views, respectively, of a fifth-axis assembly, a sixth-axis assembly, and a second segment according to an embodiment;

FIG. 19C and FIG. 19D are a first isometric view and a second isometric view, respectively, of a seventh-axis assembly and a detached tactile probe assembly according to an embodiment;

The detailed description explains embodiments of the invention, together with advantages and features, by way of example with reference to the drawings.

DETAILED DESCRIPTION

An AACMM is generally calibrated and the bearing preloads are set at a predetermined temperature. This calibration allows for operation of the AACMM within a predetermined operating temperature range. It should be appreciated that when the AACMM is operated outside of this operating temperature range, the accuracy of the measurements may be affected due to physical attributes such as the coefficient of thermal expansion (CTE) of the materials used in the AACMM. Accordingly, embodiments disclosed herein provide an AACMM that actively controls the temperature of components within the AACMM to maintain the components within a desired temperature range.

Figure 1A:
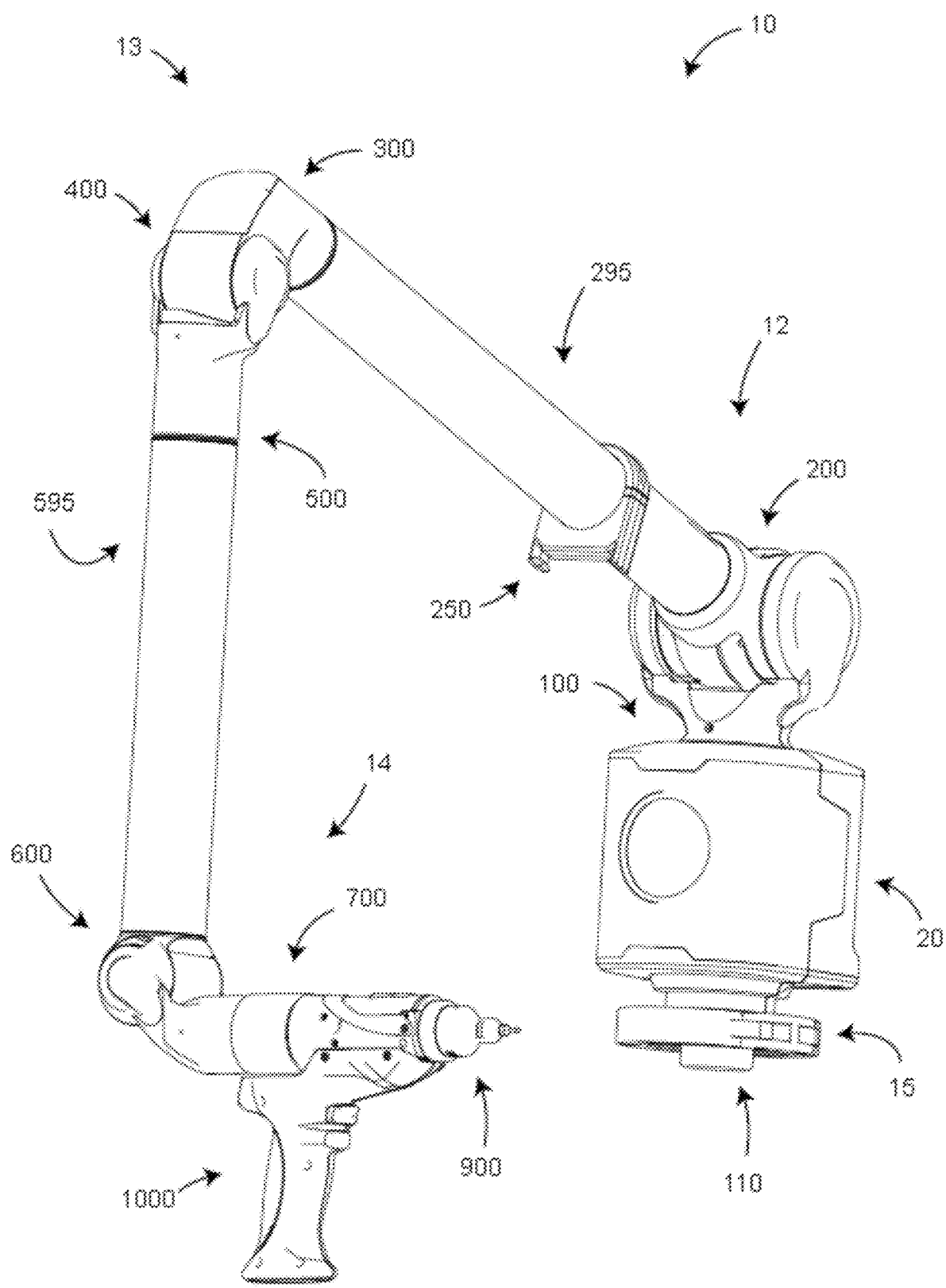
FIGS. 1A, 1B are two isometric views of a portable articulated AACMM according to an embodiment.
Figure 1B:
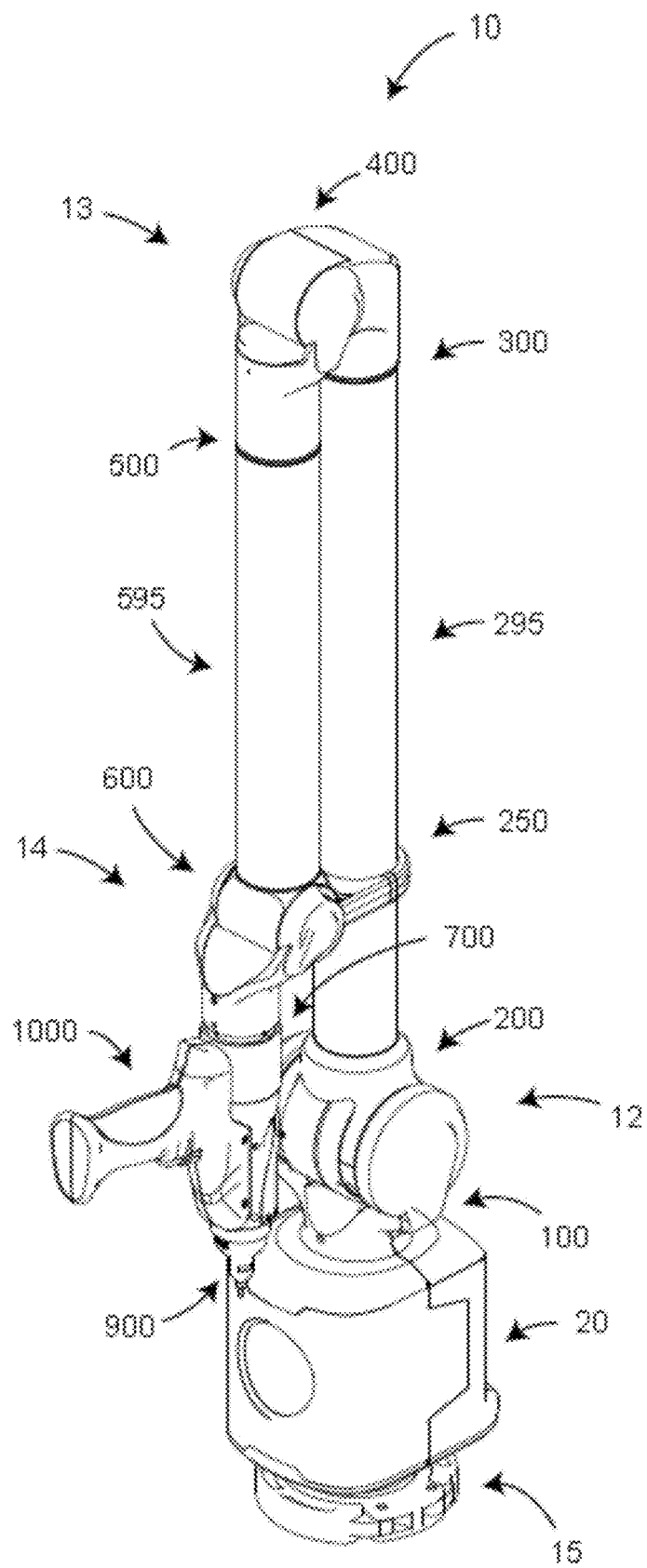
Figure 1C:
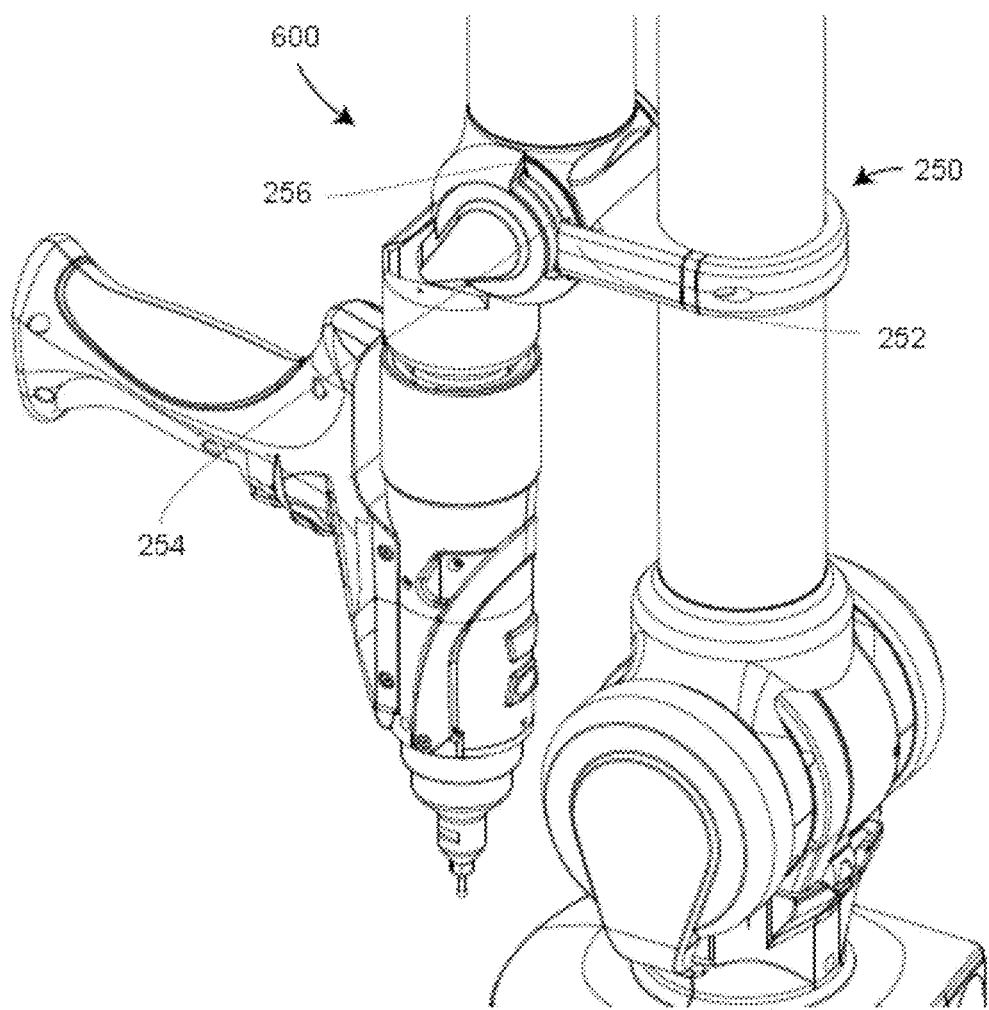
FIG. 1C is a partial isometric view of an AACMM according to an embodiment.

FIGS. 1A, 1B, and FIG. 1C illustrate, in isometric view, an AACMM 10 according to various embodiments of the present disclosure, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, and FIG. 1C, the AACMM 10 comprises includes seven rotational elements; hence the AACMM 10 is referred to as a seven-axis AACMM. In other embodiments discussed herein below, the AACMM 10 is a six-axis AACMM. The seven-axis AACMM 10 of FIGS. 1A, 1B, and FIG. 1C includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile probe assembly 900 and a handle 1000 are attached to the seventh-axis assembly. Each of the axis assemblies may provide either a swivel rotation or a hinge rotation. In the embodiment illustrated in FIGS. 1A, 1B, and FIG. 1C, the first-axis assembly 100 provides a swivel rotation about an axis aligned to a mounting direction of the base 20. In an embodiment, the second axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder.

In the embodiment illustrated in FIGS. 1A, 1B, and FIG. 1C, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, and FIG. 1C, the sixth-axis assembly provides a hinge rotation about an axis perpendicular to the second segment 595. In an embodiment, the AACMM 10 further comprises a seventh-axis assembly, which provides a swivel rotation of probe assemblies (e.g. probe 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B, 1C. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

In an embodiment, a parking clamp 250 on the first segment 295 includes parking-clamp fingers 252 (FIG. 1C) that tie together the first segment 295 to the second segment 595 while holding both segments in a vertical orientation. In an embodiment, the parking-clamp fingers 252 grip a parking clamp recess 254 while a sixth-axis yoke bumper 256 cushions the parking clamp 250 against the sixth-axis assembly 600, thereby reducing or preventing potential mechanical shock as the first segment 295 and the second segment 595 are brought together. In an embodiment, the parking clamp 250 holds the first segment 295 and the second segment 595 fixed vertical orientation, thereby reducing or minimizing the space taken by the arm segments 295, 595 when the AACMM 10 is not in use performing a measurement. In an embodiment, an operator may release the parking clamp fingers 252, thereby permitting free movement of the arm segments 295, 595 as illustrated in FIG. 1A. In another embodiment, the parking clamp is attached to the second segment 595 rather than the first segment 295. In another embodiment, the parking clamp fingers attach to a different element than the parking-clamp recess of FIG. 1C. In another embodiment, clamping is provided by a different mechanism than the parking-clamp fingers 252.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; a parking clamp affixed to one of the plurality of connected arm segments, the parking clamp having a plurality of fingers disposed lock in place two of the plurality of the connected arm segments when the plurality of fingers are pressed into a parking clamp recess of the AACMM, the parking clamp further disposed to release the two of the plurality of the connected arm segments when the fingers of the parking clamp are pulled away from the parking clamp recess; an electronic circuit that receives the position signal from the at least one position transducer and provides data corresponding to a position of the measurement device; and a processor operable to determine three-dimensional (3D) coordinates of a point measured by the measurement device based at least in part on the provided data corresponding to the position of the measurement device.

In an embodiment, the AACMM further includes a bumper, the bumper coupled to the AACMM and arranged to make contact with the parking clamp when the plurality of fingers are pressed into place in the parking clamp recess.

Figure 2A:
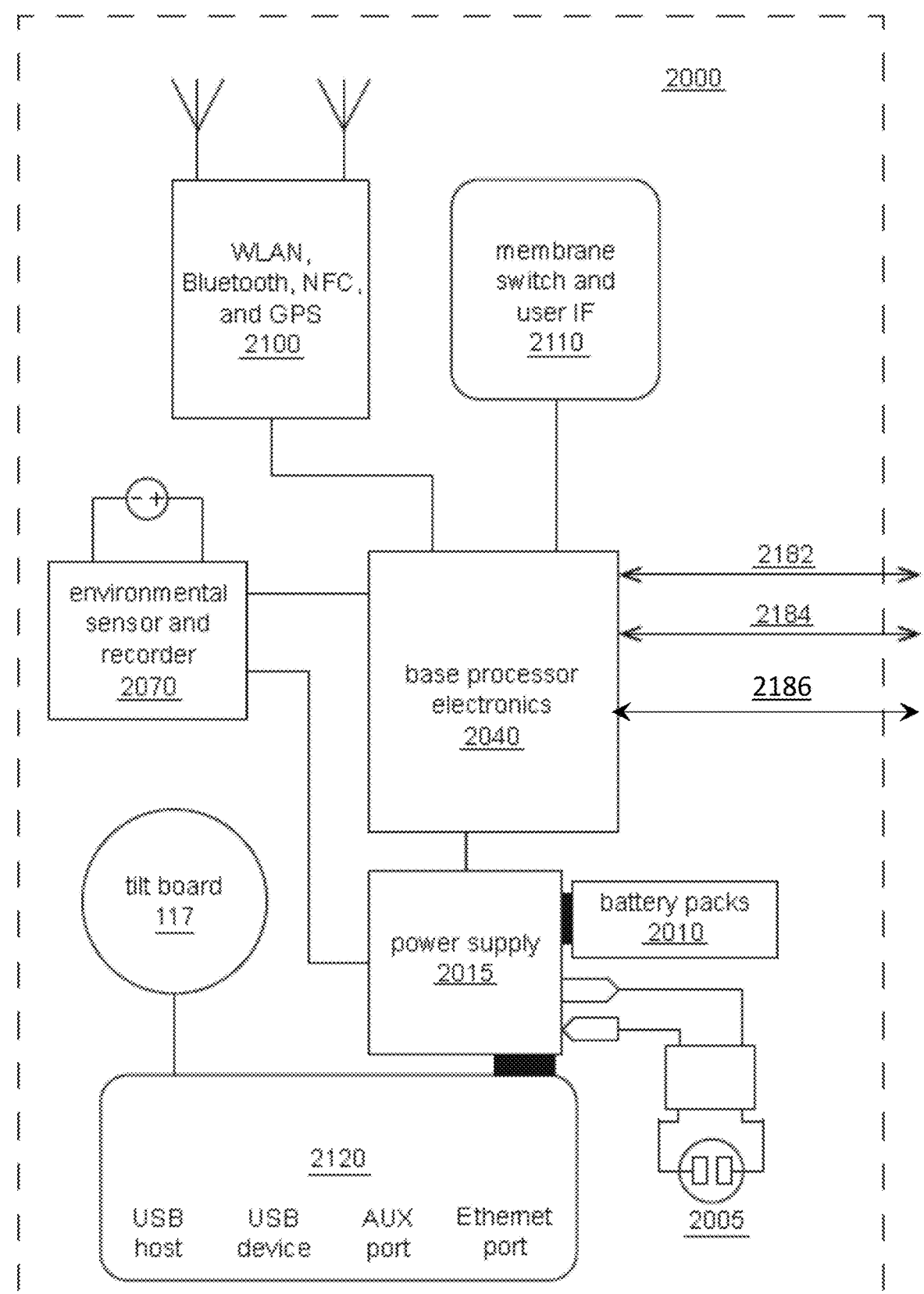
FIG. 2A is a block diagram of base electronics of an AACMM of FIG. 1 according to an embodiment.
Figure 2B:
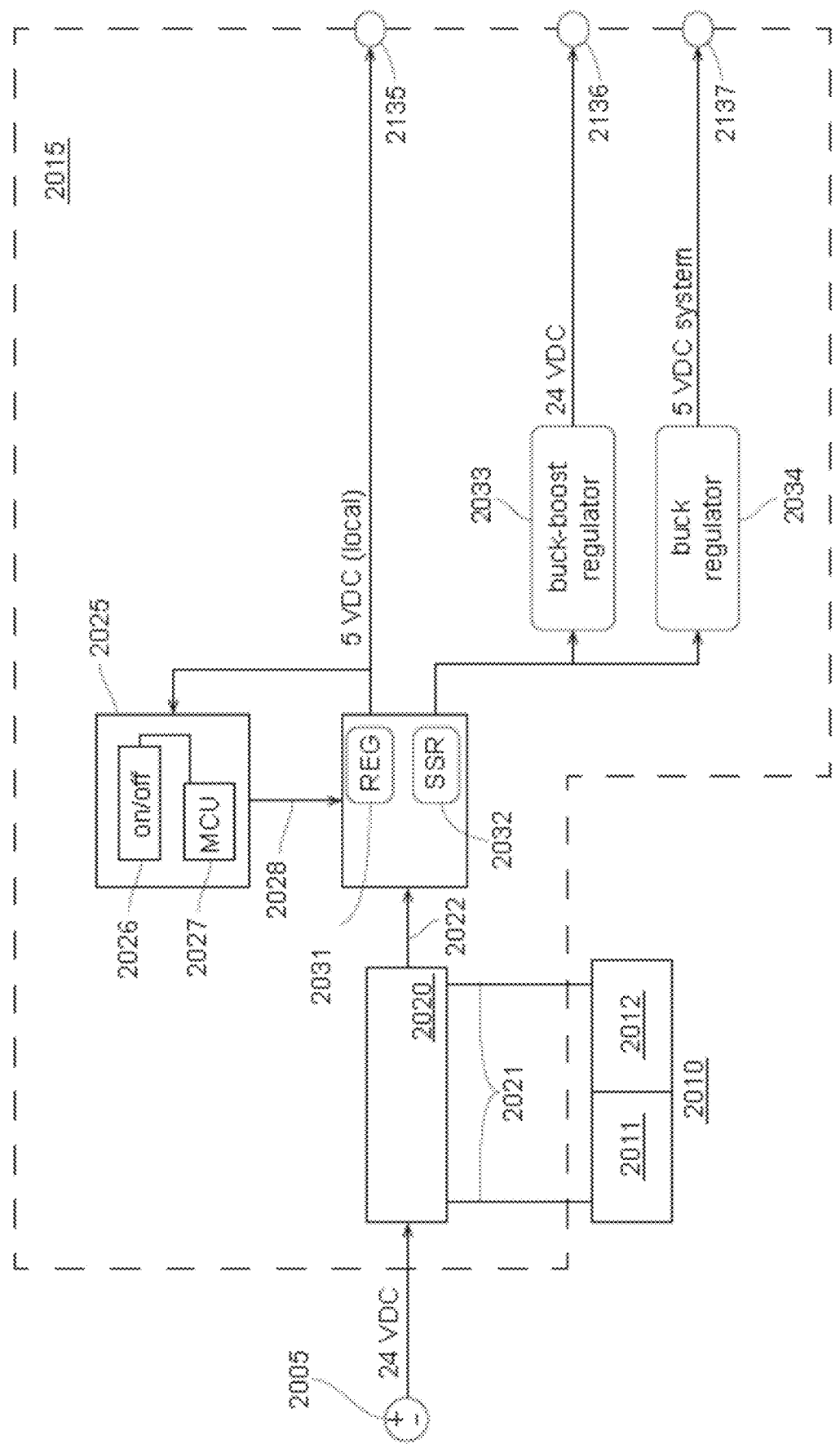
FIGS. 2B, 2C, and FIG. 2D are block diagrams providing further detail of elements within the block diagram of FIG. 2A according to an embodiment.

FIG. 2A is a block diagram of base electronics 2000. FIG. 2A includes modular power supply 2005, battery packs 2010, and a power supply 2015. These elements are shown in greater detail in a block diagram of FIG. 2B. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus for the purpose of lightweight communication, provides communication among the dual battery smart charger 2020 and smart battery packs 2010. In an embodiment, the smart battery packs 2010 include a first battery pack 2011 and a second battery pack 2012. In an embodiment, one battery pack provides electrical power to the AACMM 10 while the other battery pack is being charged. In an embodiment, either or both battery packs 2011, 2012 may be removed while power from the modular power supply 2005 is being applied. In other words, the battery packs may be "hot swapped."

Figure 6A:
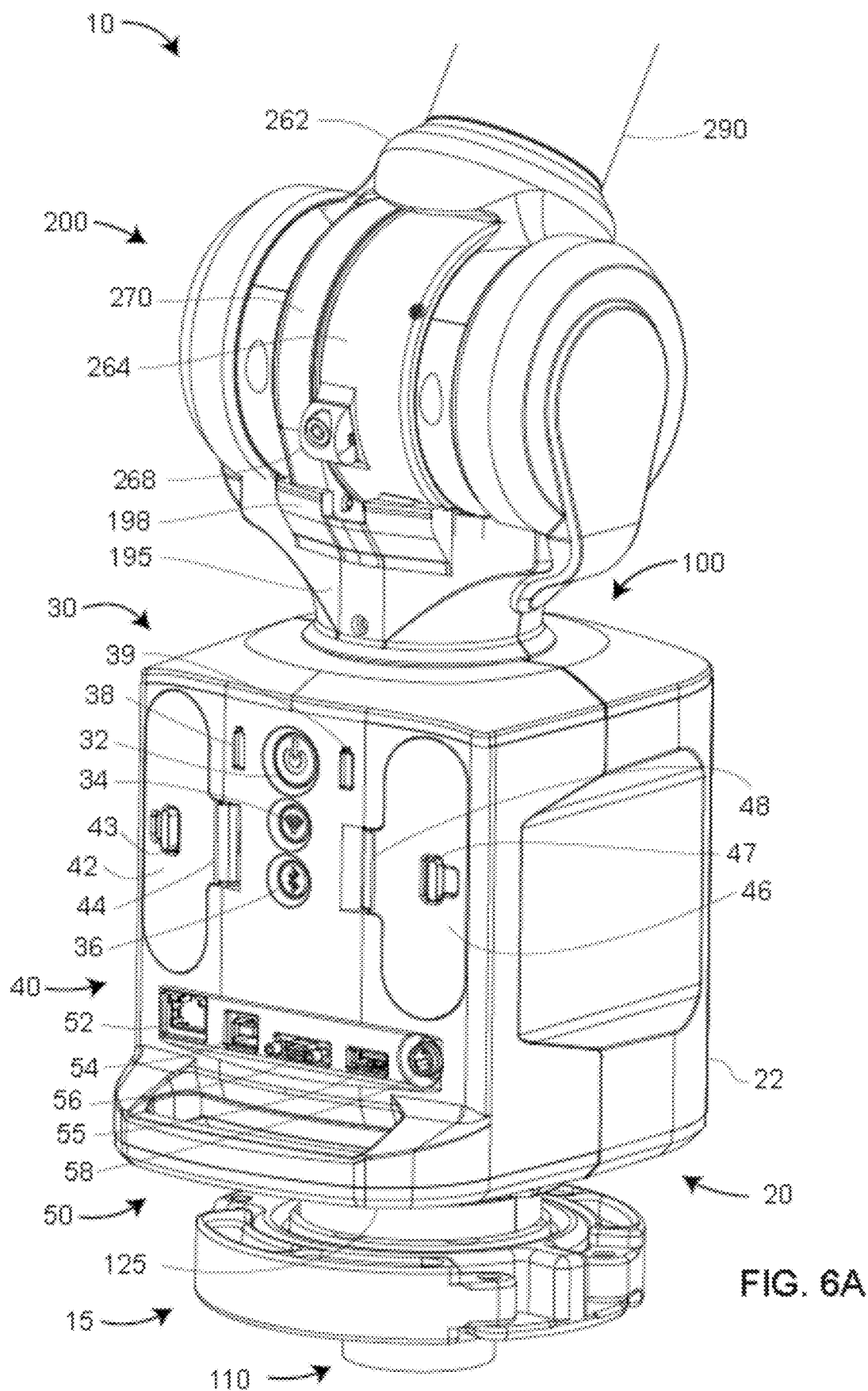
FIG. 6A is an isometric view describing some elements in a lower portion of the AACMM according to an embodiment.

In an embodiment, each battery pack 2011, 2012 includes a 14.4 VDC lithium-ion battery. In an embodiment, the battery packs 2011, 2012 are disposed in the base 20 behind a first battery door 42 and a second battery door 46, respectively, as shown in FIG. 6A. In an embodiment, the first battery door 42 and the second battery door 46 cooperate with a first battery-door hinge 44 and a second battery-door hinge 48, respectively, as well as a first battery-door latch 43 and a second battery-door latch 47, respectively. In an embodiment, a first-battery indicator light 38 and a second-battery indicator light 39 indicate an extent to which the first battery pack 2011 and the second battery pack 2012, respectively, are charged. In an embodiment, the external 24 VDC power supply attaches with a locking connector to a power supply port 58 shown in FIG. 6A.

Part of the electrical power passing through the line 2022 arrives at the regulator 2031, which provides a 5 VDC local voltage through a point 2135 to the environmental sensor and recorder 2070 (FIG. 2D) and to a user interface (IF) 2025, which includes an electrical on/off switch 2026 and a microcontroller (MCU) 2027. The electrical on/off switch 2026 is activated in response to pressing of a mechanical on-off button 32 shown in FIG. 6A. When the on/off switch 2026 is in the on state, the MCU 2027 produces a signal 2028 that causes a solid-state relay (SSR) 2032 to close, passing the voltage on the line 2022 to a buck-boost regular 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm end.

Figure 2C:
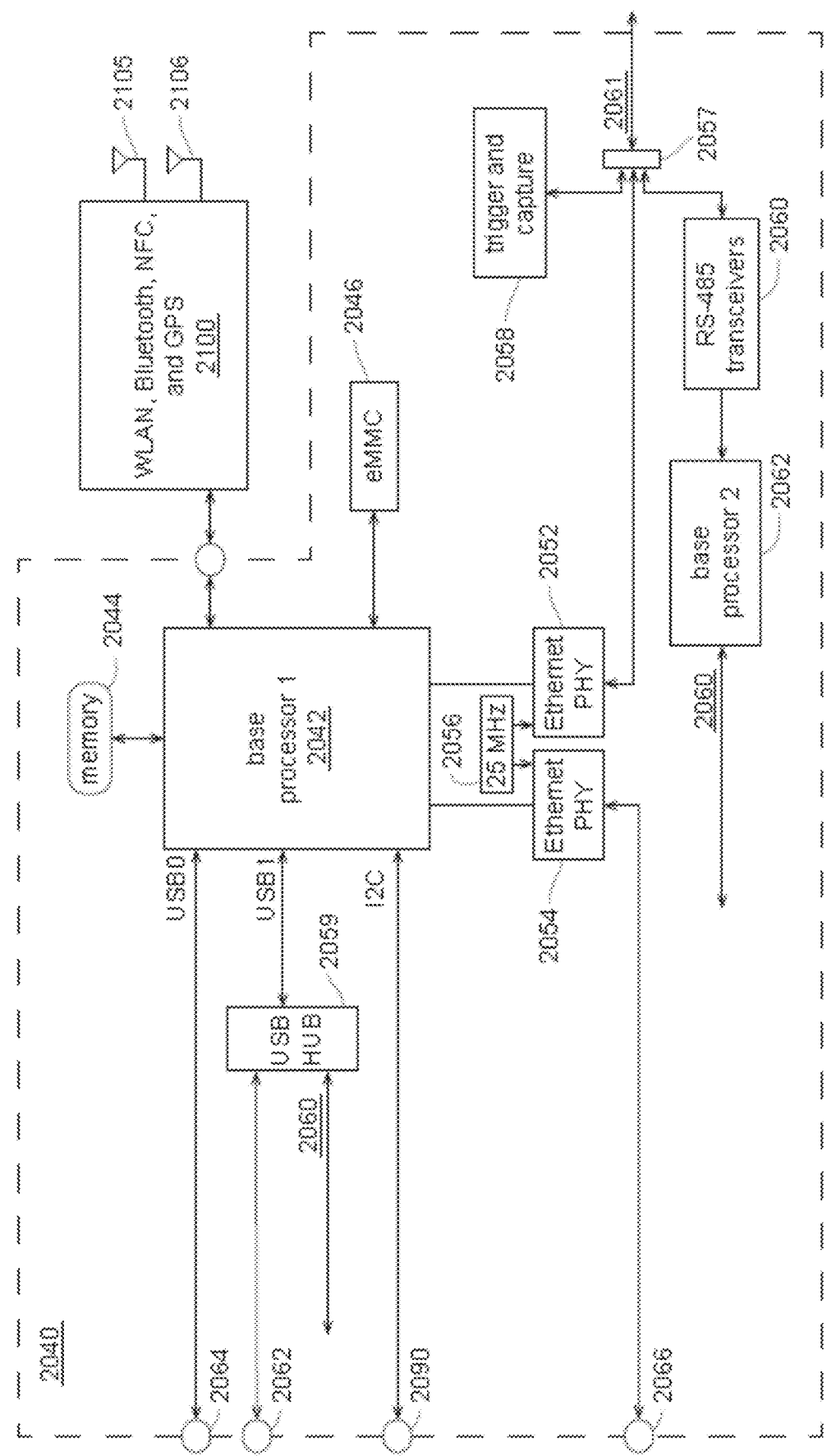
Figure 2D:
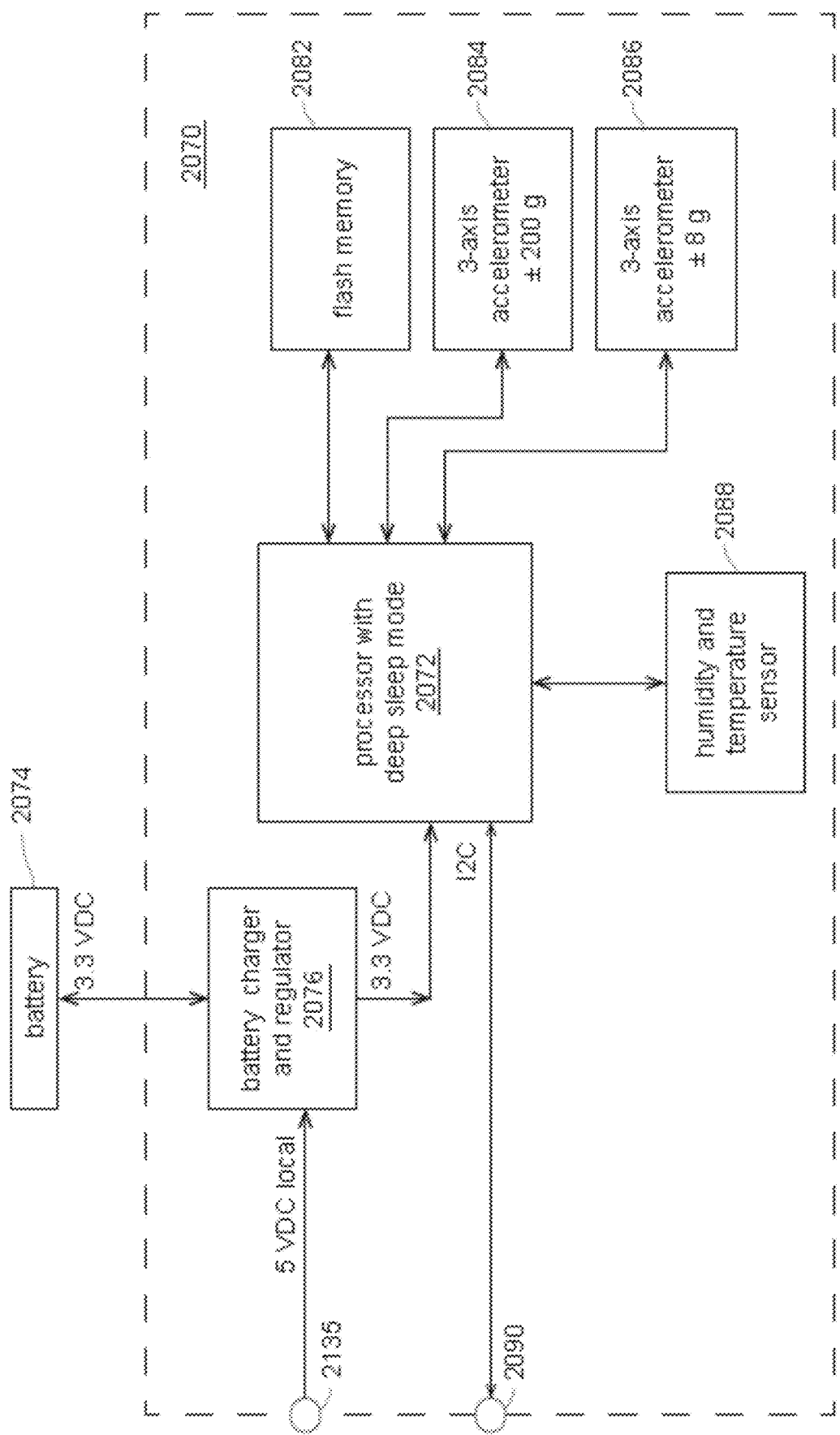

A block diagram of the environmental sensor and recorder 2070 is shown in FIG. 2D. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode 2072. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger 2076 uses the 5 VDC local voltage to charge the battery 2074.

FIG. 2C is a block diagram of the base processor electronics 2040, which includes a first base processor 2042 and a second base processor 2062. In an embodiment, the second base processor 2062 is a real-time processor. In an embodiment, the processor with deep sleep mode 2072 (FIG. 2D) communicates with the first base processor 2042 over an Inter-Integrated Circuit (I2D) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user may attach any compatible device to obtain power from the USB charging port 55. Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6A. In an embodiment, electrical signals pass to and from the USB host device through a point 2062 to a USB hub 2059 and on to the first base processor 2042.

In an embodiment, an Ethernet signal may be provided over an Ethernet port 52 as shown in FIG. 6A. Ethernet is a computer networking technology based on IEEE 802.3 standards. The Ethernet signal arrives at a point 2066 in FIG. 2C, travels to an Ethernet PHY 2054, which is clocked at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data may be transferred at a rate of one gigabit per second. In an embodiment, the second Ethernet path mainly transfers data obtained by AACMM accessory devices such as laser line probes (LLPs).

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly 960 in FIG. 22B. When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 (FIG. 22D) on the hard-probe assembly 900. In contrast, a touch-trigger probe assembly 960 (FIG. 22B) triggers a reading when a designated force is applied to the probe tip 904. Hence angular readings are taken in response to the trigger signal sent from the touch-trigger probe assembly 960. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2058 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN) 2101. In an embodiment, the WLAN 2101 is an IEEE 802.11 Wi-Fi network enabled by pressing a Wi-Fi button 34 shown in FIG. 6A. Wi-Fi enables wireless communication between the AACMM 10 and an external device such as a stationary or mobile computing device.

In an embodiment, the board 2100 further includes a Bluetooth™ Low Energy (BLE) device 2102 capable of wirelessly exchanging data with external devices such as computing devices. BLE is a wireless personal area network technology designed and marketed by the Bluetooth Special Interest Group. The BLE device 2102 is enabled by pressing a Bluetooth™ button 36 shown in FIG. 6A. The on-off button 32, the Wi-Fi button 34, and the Bluetooth™ button 36 are all part of a larger membrane switch and user interface (IF) 2110 shown in FIG. 2A.

In an embodiment, the board 2100 further includes near-field communication (NFC) hardware 2103. In an embodiment, the NFC hardware 2103 includes a dual-interface memory/tag device that communicates with an external NFC reader and a wired port that communicates with the first base processor 2042. In another embodiment, the NFC hardware includes a single-port NFC tag that communicates with an external NFC reader but may does not include a wired port for communicating with the first base processor 2042. The single-port NFC tag may store and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver 2104. In an embodiment, the GPS receiver 2104 is used to track the location of the AACMM 10, for example, to determine the location of the AACMM 10 when leased. In another embodiment, the GPS receiver 2104 is used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN 2101, Bluetooth™ 2102, NFC 2103, and GPS 2104 are used in conjunction with antennas, which may include antennas 2105, 2106.

Figure 3:
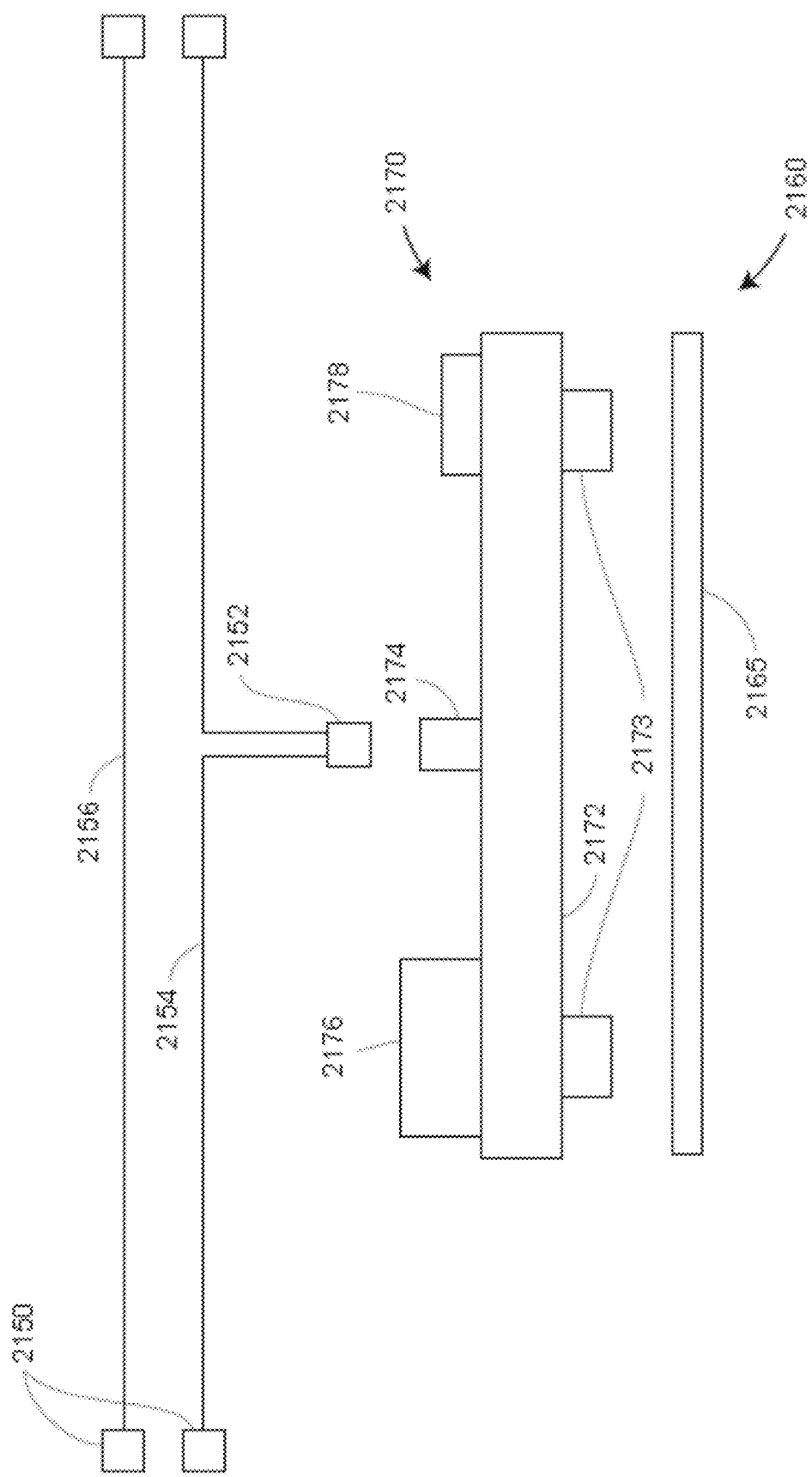
FIG. 3 is a block diagram of bus cables and their relation to encoder components according to an embodiment.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2A). Each encoder PCB 2172 connects to a corresponding T-cable 2154 of the first bus 2182. Cable connectors 2150 on each end of the T-cable 2154 attach to cable connectors 2154 on adjacent T-cables 2154 in the AACMM 10. In this way, angle information may be transferred from each angular encoder 2160 through the first bus 2182 to the main processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2A). Cable connectors 2150 of adjacent interconnect cables 2156 are connected together to provide a continuous electrical path for the second bus 2184.

Figure 4A:
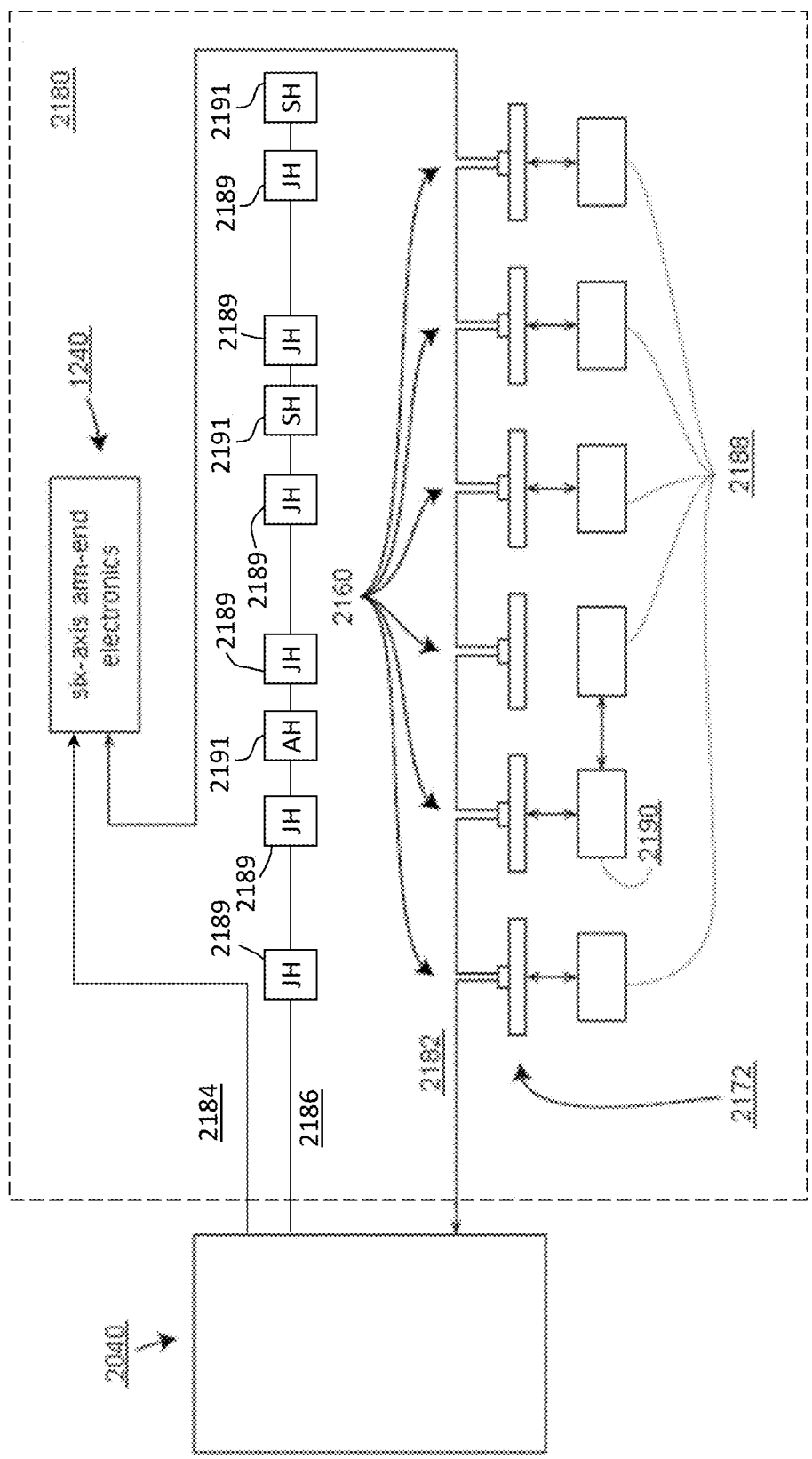
FIG. 4A and FIG. 4B are block diagrams of interconnecting elements in six-axis electronics and seven-axis electronics according to an embodiment.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 may be attached to the expandable temperature sensor 2190. In an embodiment, some temperature sensors 2188 are not expandable. In an embodiment, at least one temperature sensor, either 2188 or 2190, is placed in the vicinity of each angular encoder to provide the possibility of compensating angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

As will be discussed in more detail herein, the temperature sensors 2188, 2190 may be used as part of a control loop for activating heating modules 2189, 2191. Each of the heating modules 2189, 2191 are coupled to a third bus 2186 which provides power and control signals thereto. The heater modules 2189 are associated with the bearing cartridges for axis-assemblies 200, 300, 400, 600. The heater modules 2191 are associated with the respective arm segments 295, 595 and the probe end.

Figure 4B:
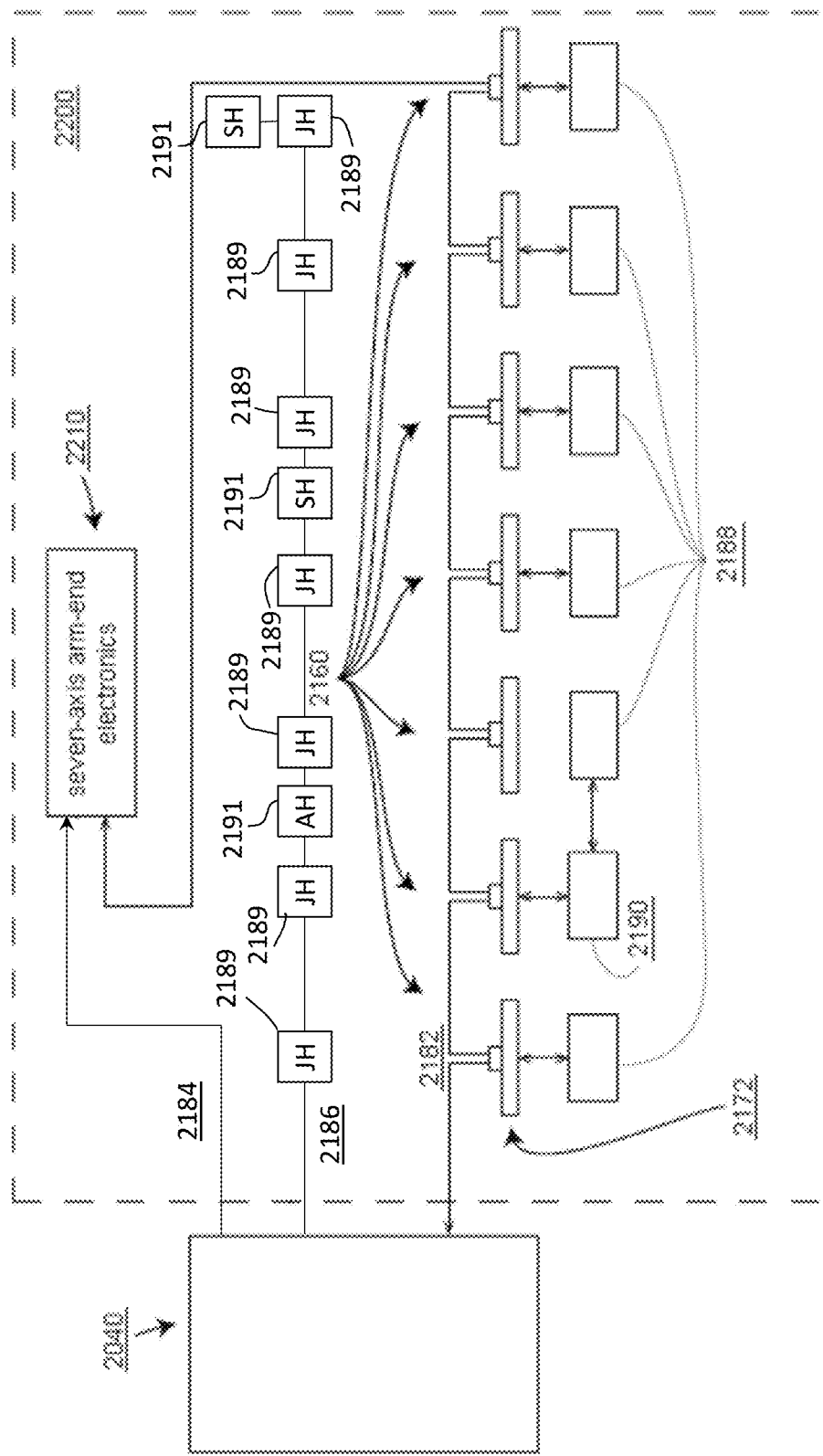

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 may be attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Similar to the embodiment of FIG. 4A, the seven-axis AACMM further includes a plurality of heater elements 2189, 2191. Each of the heating modules 2189, 2191 are coupled to a third bus 2186 which provides power and control signals thereto. The heater modules 2189 are associated with the bearing cartridges for axis-assemblies 200, 300, 400, 600, 700. The heater modules 2191 are associated with the respective arm segments 295, 595 and the probe end.

Figure 5:
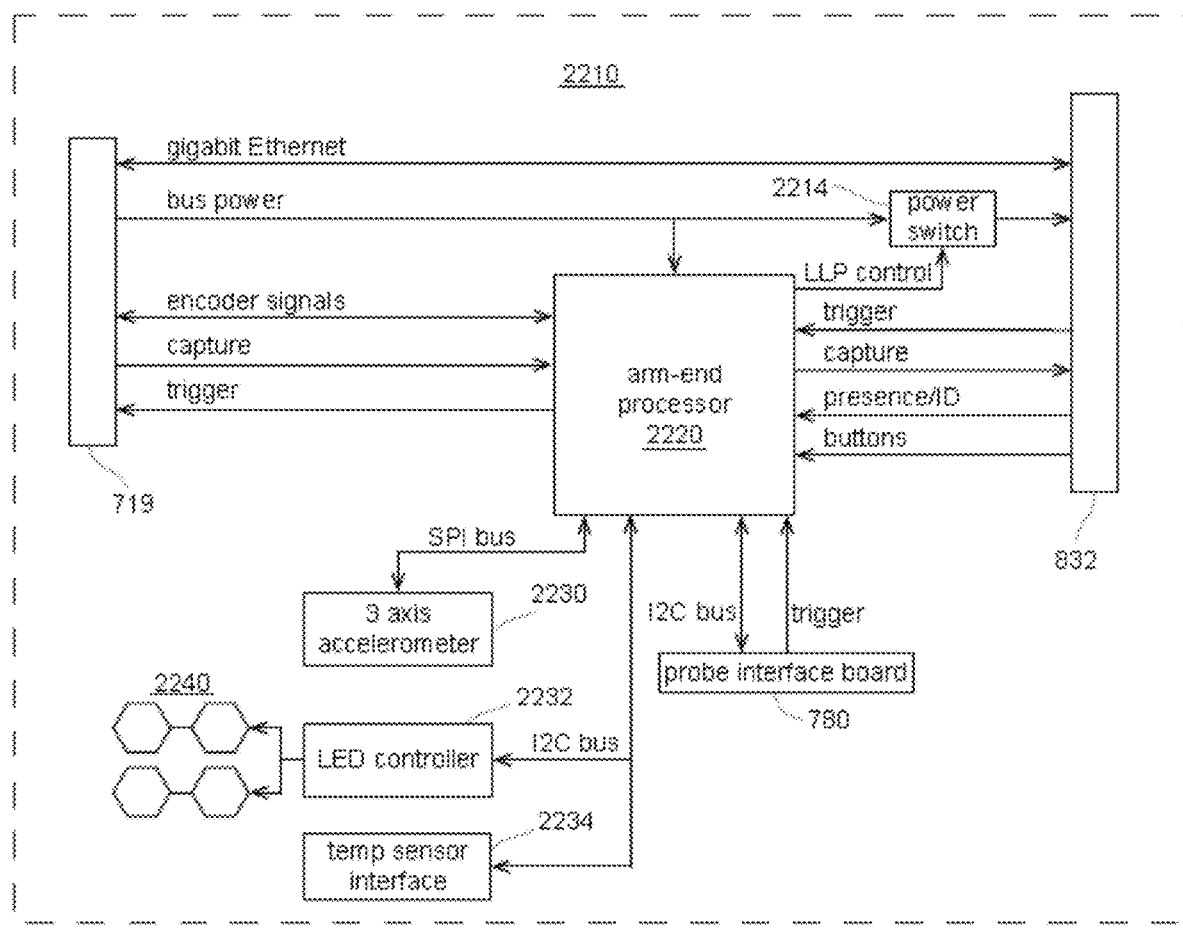
FIG. 5 is a block diagram of seven-axis arm-end electronics according to an embodiment.

FIG. 5 is a block diagram of elements of the seven-axis arm-end electronics 2210. Bus connectors 719, also shown in FIG. 19F, include two electrical connectors that attach to cable connectors 2150 (FIG. 3) of the first bus 2182 (FIG. 2A) and the second bus 2184 of the sixth-axis assembly 600. An arm-to-handle connector 832 in FIG. 5, connects to a handle-to-arm connector of an accessory such as a laser line probe (LLP) 1100 as shown in FIGS. 24A, 24B or to a handle 1000 as shown in FIGS. 18A, 18C, 18D, 18E. FIG. 5 includes a probe interface board 780, further illustrated in FIGS. 19C, 19F, 20A, 21A, 21B, 25A, 25D. The probe interface board 780 is configured to make electrical contact with removable tactile probes, as discussed further herein below. The probe interface board 780 communicates bidirectionally with the arm-end processor 2220 through an I2D bus. When a touch-trigger probe assembly 960 (FIG. 22D) is attached, the probe interface board 780 further sends trigger signals from the probe interface board 780 to the arm-end processor 2220.

Figure 19A:
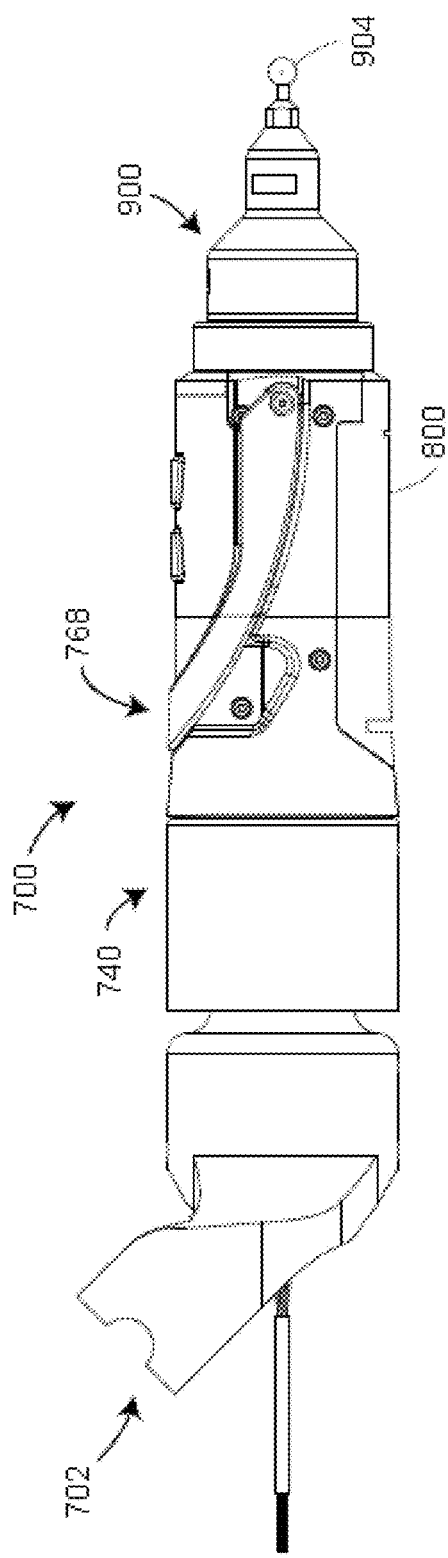
FIGS. 19A, 19B are side views of a seventh-axis assembly having a tactile probe assembly latched in placed and detached, respectively, according to an embodiment.
Figure 19B:
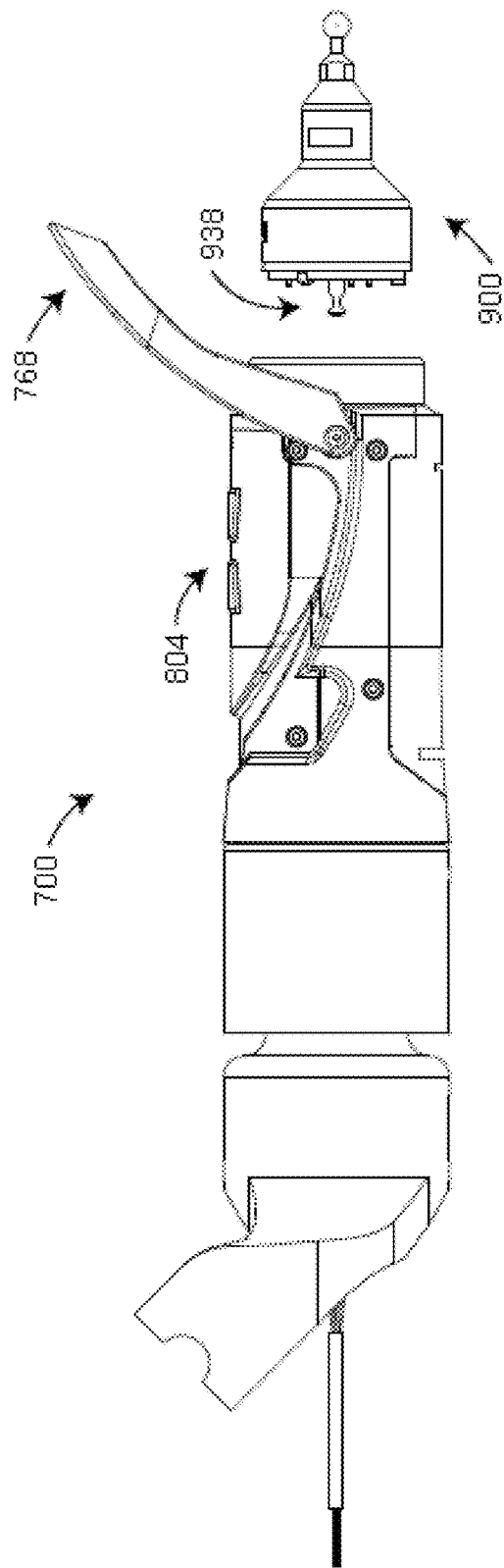
Figure 19E:
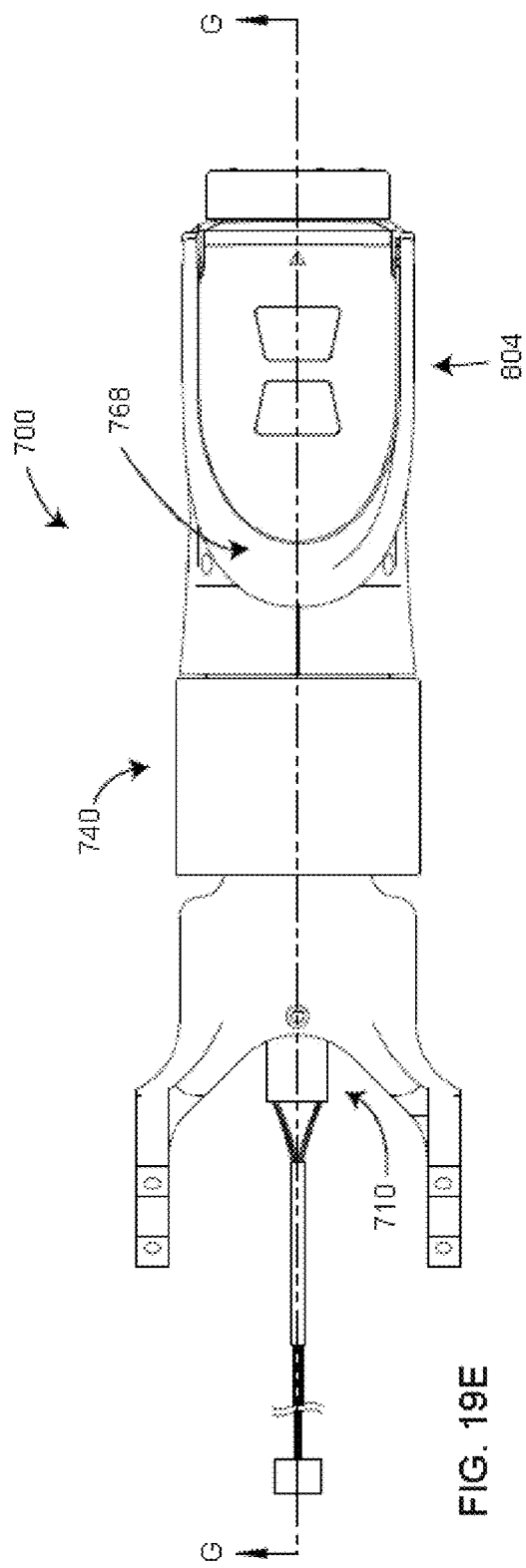
FIG. 19E and FIG. 19F are top and section views of a seventh-axis assembly according to an embodiment.
Figure 19F:
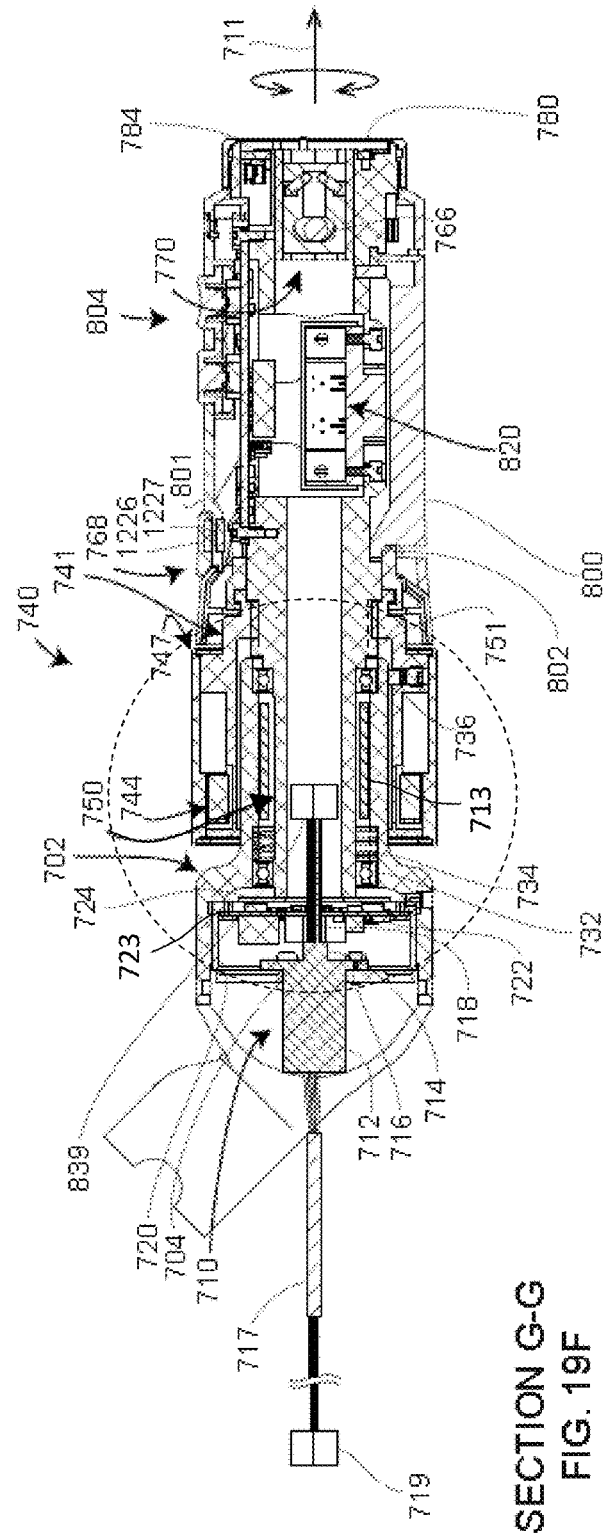
Figure 19G:
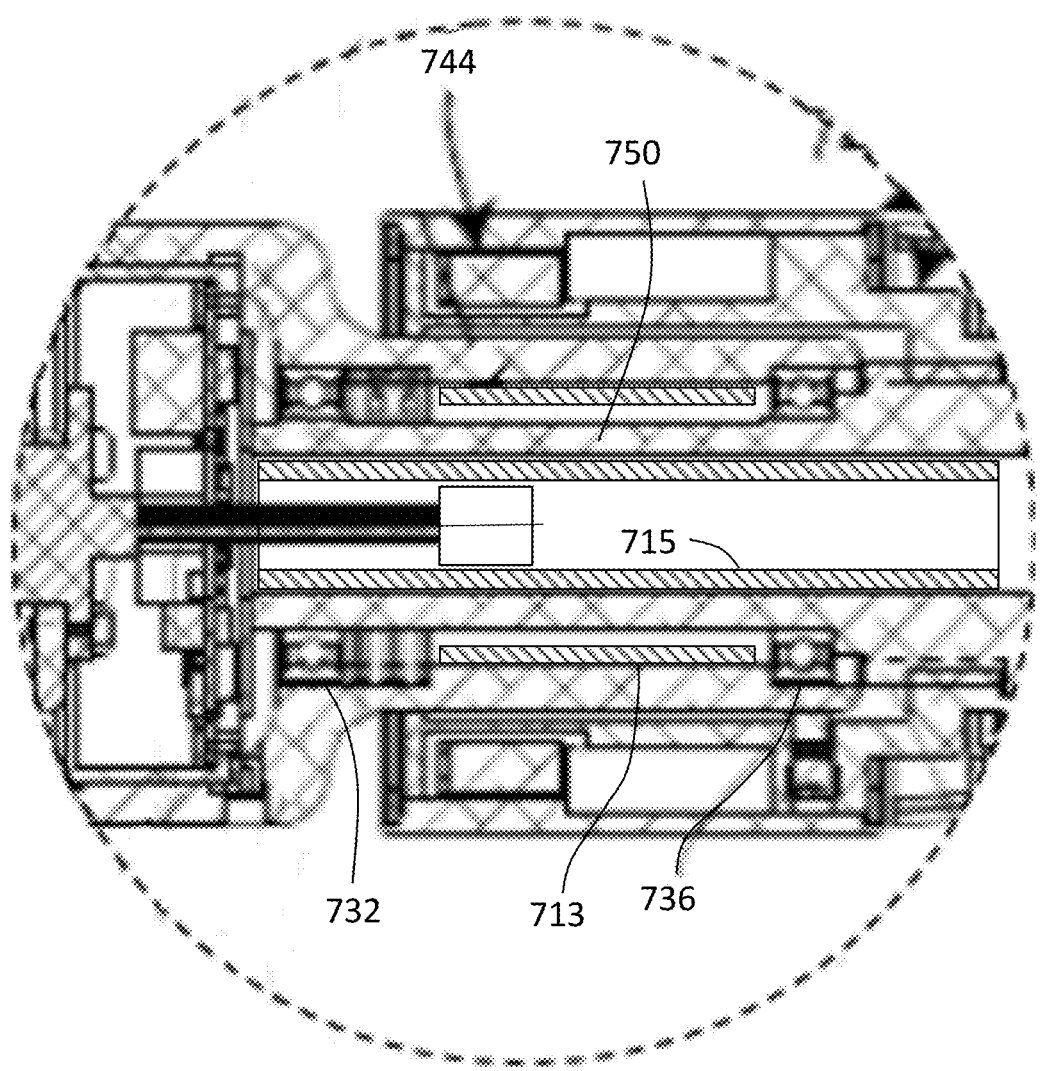
FIG. 19G is an enlarged view of a portion of the sectional view of FIG. 19F in accordance with an embodiment.

In an embodiment, the seven-axis arm-end electronics 2210 includes an arm-end processor 2220 as shown in FIGS. 5 and 19G. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts may provide a clue to an origin of problems observed in service. In an embodiment, the three-axis accelerometer 2230 is included on a seven-axis arm-end board similar to the six-axis arm-end board 1260 shown in FIG. 25D.

In an embodiment, the arm-end processor 2220 is further connected to a light-emitting diode (LED) controller 2232 through an I2D bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the light emitted from the LEDs 2240 is controlled separately for each LED 2240 so that light emitted by the LEDs 2240 may be one color from an upper light diffuser 1222 and another color from a lower light diffuser of an end-effector assembly 1200, as shown in FIG. 25A.

In an embodiment, the arm-end processor 2220 also communicates with a temperature sensor interface 2234 over an I2D bus. The temperature sensor interface provides a measured temperature that may be used to compensate for thermal expansion of elements attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP 1100 control signal from the arm-end processor 2220. The LLP 1100 control signal is a signal provided by the LLP 1100 or other accessory indicating that it is connected to the AACMM 10 and should receive electrical power from the bus. Besides sending bus power to the LLP 1100 or other accessory device, the arm-to-handle connector 832 also transfers high-speed data from accessories such as the LLP 1100 over the second bus 2184 (FIG. 4A, 4B) to the first base processor 2042. In an embodiment, actuator or button presses may result in signals being transmitted the arm-to-handle connector 832 to the arm-end processor 2220 in response to pressing of a handle button 1010 shown in FIGS. 18A, 18E, 24A, 24B. The capture signals are sent from the arm-end processor 2220 to the arm-to-handle connector 832 to synchronize measured values obtained from accessories such as the LLP 1100 with the angular readings obtained by the angular encoders in the arm-axis assemblies 100, 200, 300, 400, 500, 600, 700. In some cases an accessory may send a trigger signal to the arm-end processor 2220. An accessory device may also send a presence/ID signal indicating its presence and identity in the system.

FIG. 6A and FIG. 6B show some elements of the lower arm (i.e. the portion of the articulated arm adjacent the base). The mounting device 15 provides a way of a attaching the AACMM 10 to a mounting ring as discussed further herein below in relation to FIG. 7J. The shock-absorber bumper 110 provides a way to cushion a potential drop of the AACMM 10 when affixing the arm to a mounting ring, as discussed herein below in relation to FIGS. 7E, 7F, 7G, and FIG. 7H. The base 20 includes elements shown in FIG. 6A and FIG. 6B such as a base cover 22, a control panel 30, a battery access 40, and a port panel 50, as well as mechanical elements shown in later figures, as discussed herein below. The control panel 30 includes the on-off button 32, the Wi-Fi button 34, the Bluetooth™ button 36, the first-battery indicator light 38, and the second-battery indicator light 39. The battery access 40 includes the first battery door 42, the first battery-door latch 43, the first battery-door hinge 44, the second battery door 46, the second battery-door latch 47, and the second battery-door hinge 48. The port panel 50 includes an Ethernet jack 52, a USB data-transfer port 54, a USB charging port 55, an auxiliary port 56, and a power supply port 58.

Figure 8C:
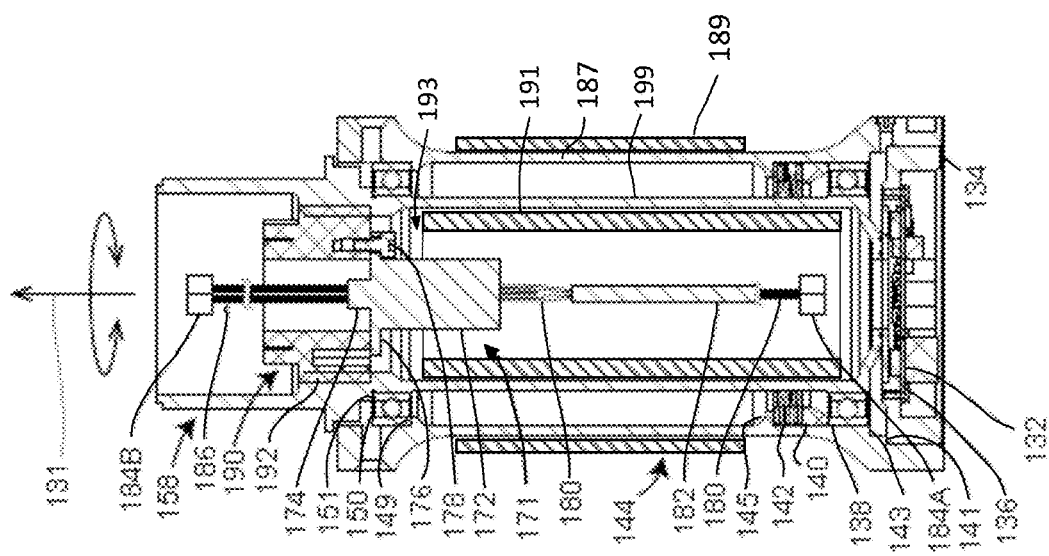
FIGS. 8A, 8B, 8C, and FIG. 8D are front, side, cross-sectional, and exploded views, respectively, of a first-axis cartridge according to an embodiment.
Figure 8B:
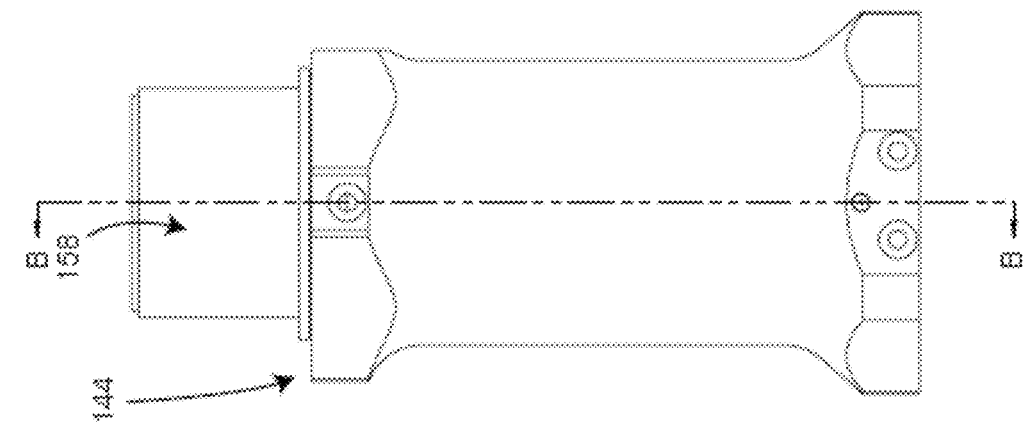
Figure 8A:
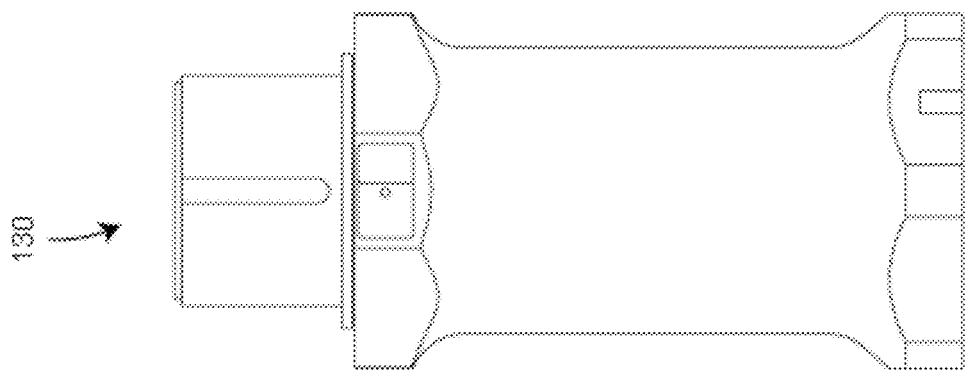
Figure 9B:
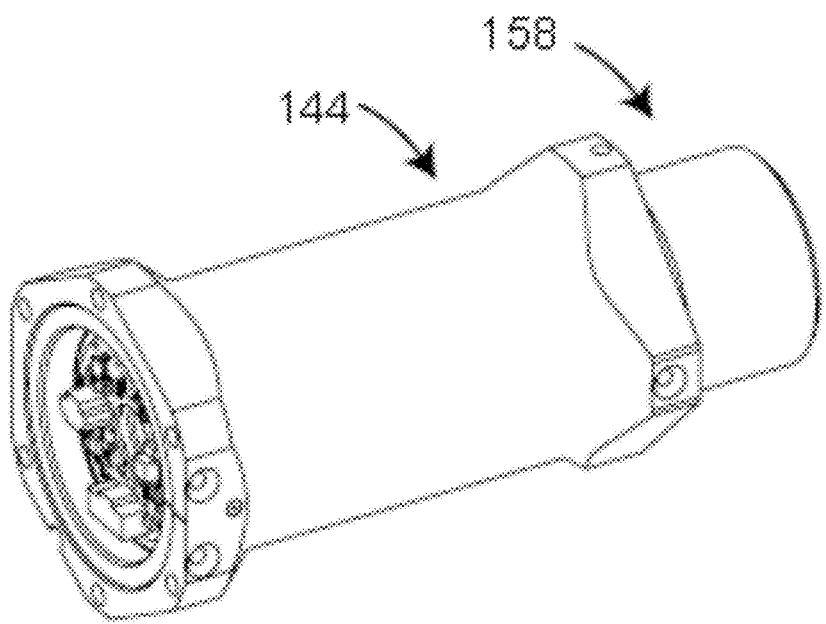
Figure 9C:
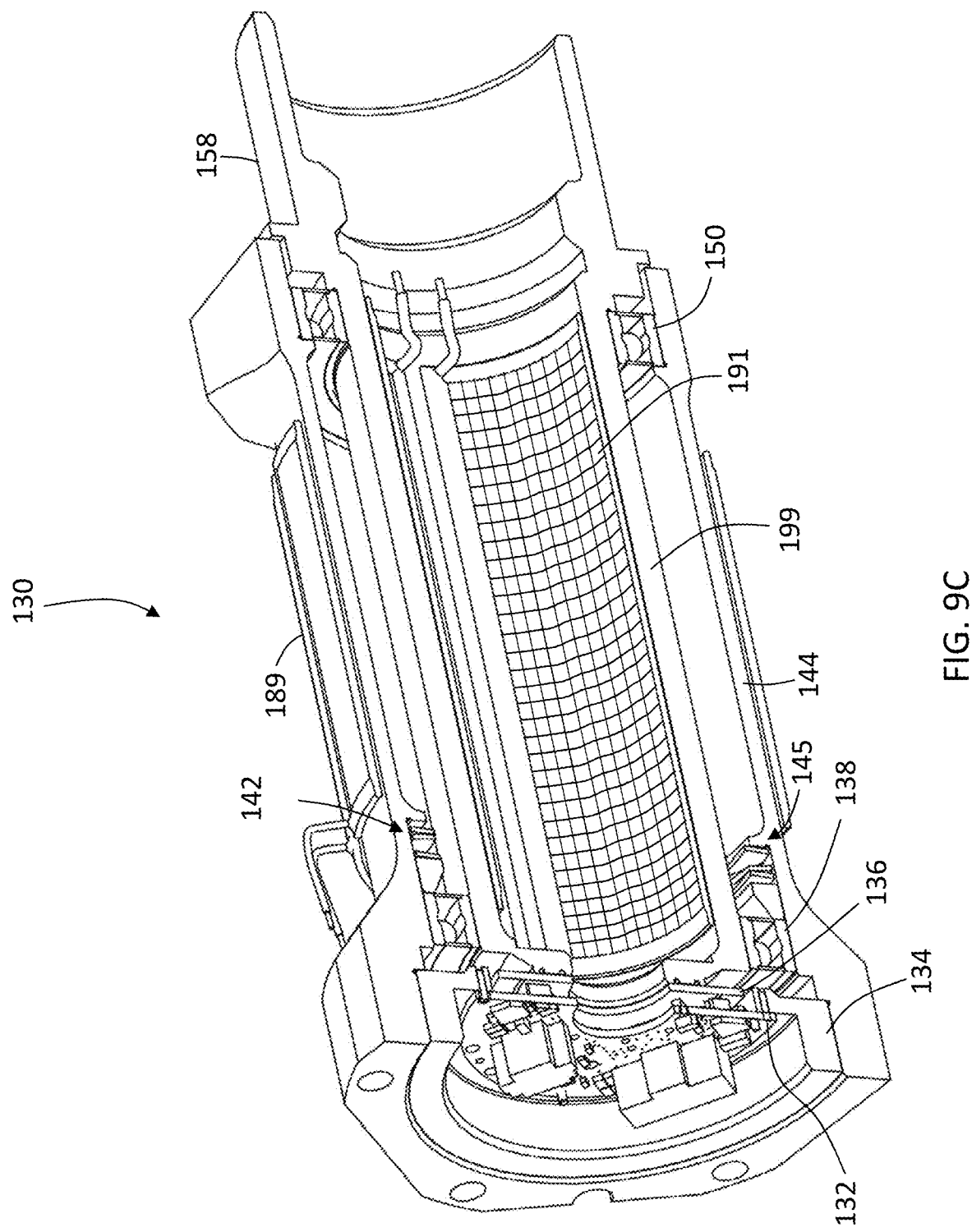
FIG. 9C is a sectional view of the first-axis cartridge according to an embodiment.

The first-axis assembly 100 is shown in FIGS. 6A, 6B, 7A, 7B, 7C, and FIG. 7D. The first-axis assembly 100 includes a first-axis cartridge 130 and a first-axis yoke structure 194. The handle 125 and the shock-absorber bumper 110 are coupled to the first axis assembly 100. As shown in FIGS. 8A, 8B, and FIG. 8C, in the first-axis cartridge 130, a first-axis shaft 158 rotates about a first axis 131 relative to a first axis housing 144. As shown in FIGS. 9A, 9B, and FIG. 9C with continuing reference to FIG. 8C, the first-axis cartridge 130 includes an encoder board with read heads 132, a read-head plate 134, an encoder disk 136, a lower bearing 138, a preload bearing spacer 140, a wave washer 142, a first-axis housing 144, an upper bearing 150, and a first-axis shaft 158. The first-axis housing 144 includes a lower lip 145 against which the wave washer 142 is placed.

In an embodiment, in a first manufacturing step the upper bearing 150 is held in place between a fifth lip 151 of the first-axis shaft 158 and a fourth lip 149 of the first-axis housing 144. The wave washer 142 is benched or placed against the third lip 145 and brought into contact with the preload bearing spacer 140, which is brought into contact with an outer race of the lower bearing 138. In an embodiment, in a second manufacturing step, the first-axis shaft 158 is press fit against the lower bearing 138 until a bottom of the lower bearing lies on a plane of the second lip 143. A press fit, also known as an interference fit or a friction fit, is a fastening between two parts obtained by pressing the parts together under conditions in which there is a slight interference between the parts, resulting in friction that holds the parts tightly in place. The wave washer 142 and preload bearing spacer 140 press downward on the outer race of the lower bearing 138, which in turn presses down on the ball in the lower bearing. In response, the inner race presses upward on the ball in the lower bearing 138. The lower bearing 138 when subjected to such forces is said to be preloaded, a condition that improves the performance of the bearing. Advantages obtained by preloading a bearing include increased bearing rigidity and better consistency in angular movements.

In an embodiment, the spring force from the wave washer 142 further presses the third lip 145 upward, causing the fourth lip 149 to press upward on an outer race of the upper bearing 150 and, in reaction, causing the fifth lip 151 to press downward on the inner race of the upper bearing 150. Hence preload is also applied to the upper bearing 150. In an embodiment, the lower bearing 138 and the upper bearing 150 are deep groove ball bearings. In another embodiment, the lower bearing 138 and the upper bearing 150 are angular contact ball bearings. In other embodiments, other types of bearings are used.

In an embodiment, with the first-axis shaft 158 press fit in place, glue is applied to the glue grooves 159 of the first-axis shaft 158 and the encoder disk 136 is adjusted in place and allowed to cure. Screws 133 attach the encoder board with read heads 132 to the read-head plate 134, which is benched against the first lip 141 of the first-axis housing 144.

In an embodiment, a brush assembly 152 includes a carbon brush 153, a brush spring 154, and a set screw 155. The brush assembly is inserted through the first-axis housing 144, enabling the carbon brush to electrically ground the upper bearing, which can otherwise generate static electricity during rotation. Hence, use of the brush assembly 152 improves electrical reliability.

Figure 8D:
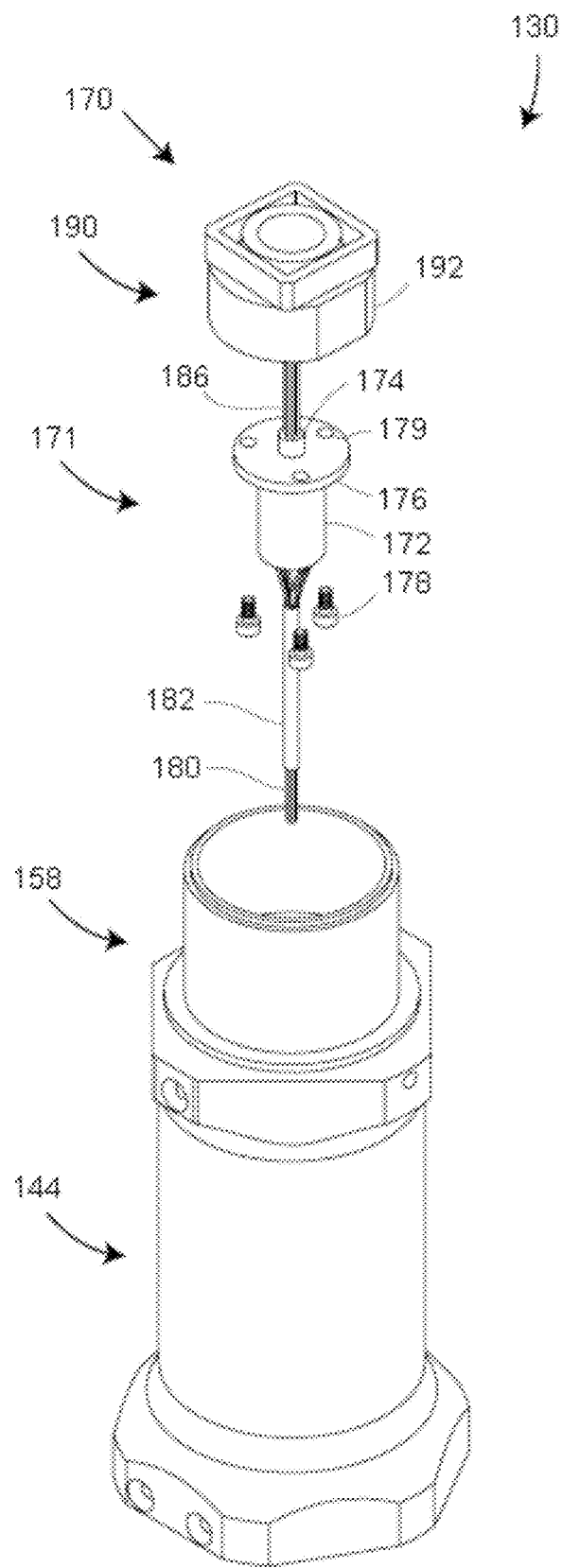

In an embodiment illustrated in FIG. 8C and FIG. 8D, the first-axis cartridge 130 further includes an electrical transfer assembly 170. The electrical transfer assembly 170 includes a first-axis slip ring 171, a slip-ring adapter 190, and cable elements. Cable elements include bus connectors 184A, 184B, first cable wires 180, and a cable jacket 182. The first-axis slip ring 171 includes a slip-ring housing 172, a slip-ring flange 176, slip-ring holes 179, and slip-ring screws 178. In an embodiment, the slip-ring adapter 190 screws onto the first-axis shaft 158 in a threaded portion 192. First-axis slip-ring screws 178 extend through slip-ring holes 179 of the slip-ring flange 176 to attach the first-axis slip ring 171 to the slip-ring adapter 190. The slip-ring flange 176 and the slip-ring housing 172 turn together, but the slip-ring shaft 174 turns independently of the slip-ring housing. Furthermore, first cable wires 180, which enter the slip-ring housing 172, turn with the slip-ring housing 172, while the second cable wires 186, which enter the slip-ring shaft 174, turn with the slip-ring shaft 174. In an embodiment, electrically contacting brushes keep electrical continuity among first cable wires 180 and second cable wires 186 even as the slip-ring shaft 174 rotates relative to the slip-ring housing 172. In an embodiment, the slip-ring shaft 174 does not rotate relative to the slip-ring housing 172 until the second cable wires 186 become twisted enough to apply a restoring torque to the slip-ring shaft 174.

In an embodiment, the first-axis cartridge 130 includes a heater element 191 disposed within the hollow interior 193 of first-axis shaft 158. The heater element 191 is in thermal contact with the side wall 199. In an embodiment, a temperature sensor (e.g. temperature sensor 2188) is associated with the first-axis cartridge 130 transmits a signal to the base processor electronics 2040. The base processor electronics 2040 determines if the temperature of the first-axis cartridge 130 is within a predetermined temperature range. When the temperature of the first-axis cartridge 130 is below the predetermined temperature range, the base processor 2040 activates heater element 191. It should be appreciated that because the heater element 191 is in thermal contact with the side wall 199, the temperature of the first-axis bearing cartridge 130 will be increased. When the temperature of the first-axis bearing cartridge 130 is elevated to a predetermined temperature (within the predetermined temperature range), the base processor 2040 deactivates the heater element 191. It should be appreciated that by maintaining the first-axis cartridge within the predetermined temperature range, changes due to the CTE of the bearing cartridge materials will be reduced. Further advantages are gained in that the bearing pre-loads will remain within a desired range.

In an embodiment, the first-axis bearing cartridge 130 may include a second heating element 189 disposed around and in thermal contact with the outer wall 187 of the first-axis housing 144. In an embodiment, the second heater element 189 is disposed within the gap between the side wall 199 and the outer wall 187. The second heating element 189 is also activated by the base processor 2040 in response to the temperature of the first-axis bearing cartridge 130 being below a predetermined temperature range. The combination of the heater elements 191, 189 allow for the controlling of the operating temperature of the first-axis bearing cartridge 130. In an embodiment, the first heater element 191 is an Adafruit 1481 heating pad produced by Adafruit Industries, LLC of New York, N.Y. In an embodiment, the heater element 189 is a 5 VDC heating pad such as Model RB-Spa-717 manufactured by Sparkfun Electronics of Boulder, Colo.

It should be appreciated that while the illustrated embodiment shows the heater element 191 as being disposed within the inner diameter of the side wall 199 this is for exemplary purposes and the claims should not be so limited. In other embodiments, the heater element 191 may be coupled to the outer diameter of the side wall 199 or the inner diameter of the outer wall 187.

In an embodiment illustrated in FIG. 7A and FIG. 7B, the first-axis assembly 100 includes the first-axis cartridge 130, the first-axis yoke structure 194, the shock-absorber bumper 110, the handle 125, screws 126, 128, and washers 127. Optionally, the first-axis assembly 100 may be used in conjunction with the mounting device 15. In an embodiment, the three short base screws 128 attach one side of the shock-absorber bumper 110 to a bottom of the first-axis housing 144, while the three long base screws 126 and corresponding washers 127 attach the handle 125 and the shock-absorber bumper 110 to the bottom of the first-axis housing 144. In an embodiment, the mounting device 15 sits loosely on the shock-absorber bumper 110 until it is tightened onto a mounting ring as described further herein below.

FIGS. 7E, 7F, 7G, and FIG. 7H illustrate the shock-absorber bumper 110, which includes lower screws 118, a guiding retainer ring 111, a bell 112, a damper 114, a preload spacer 115, a base-nut retainer 116, a tilt board 117, and upper screws 119. The bell further includes a bell lip 113. The damper 114 sits in the bell 112, which rests on the guiding retaining ring 111, which is screwed onto a bottom of the base nut retainer 116. The preload spacer 115 sits atop the damper 114 and makes contact with the base nut retainer 116, as shown in the section view of FIG. 7H. Upper screws 119 attach the tilt board 117 to the base nut retainer 116. The damper 114 is made of compressible material so that the bell 112 deflects or compresses upward when a force is applied to a bottom of the bell 112. The purpose of the shock-absorber bumper 110 is to reduce mechanical shock to the AACMM 10 that may occur if the AACMM 10 suddenly drops when being mounted to a table, stand, or similar structure.

Figure 7D:
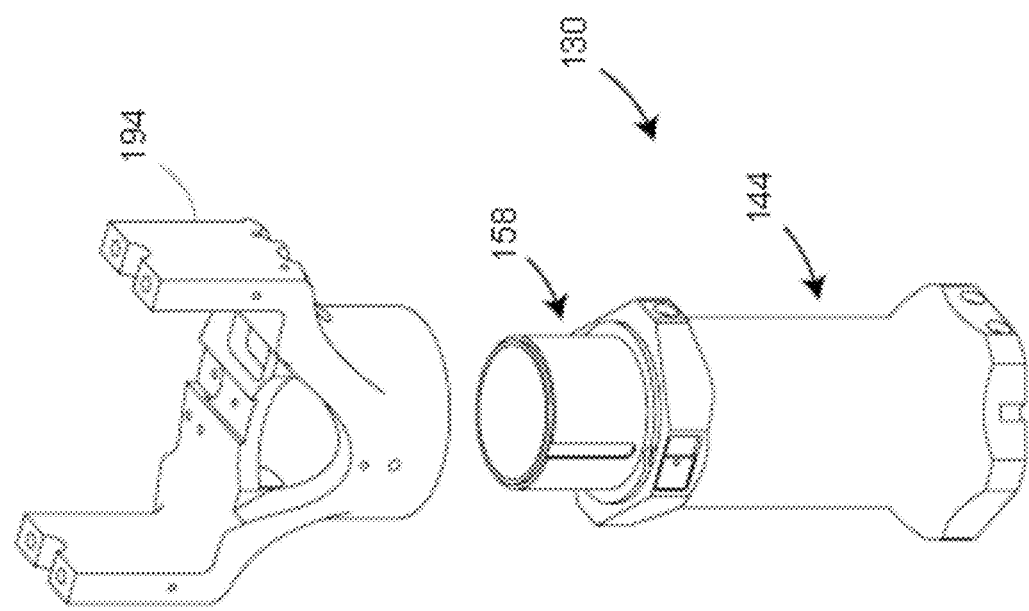
FIG. 7C and FIG. 7D are isometric and exploded views, respectively, of a first-axis cartridge and a first-axis yoke structure according to an embodiment.
Figure 7C:
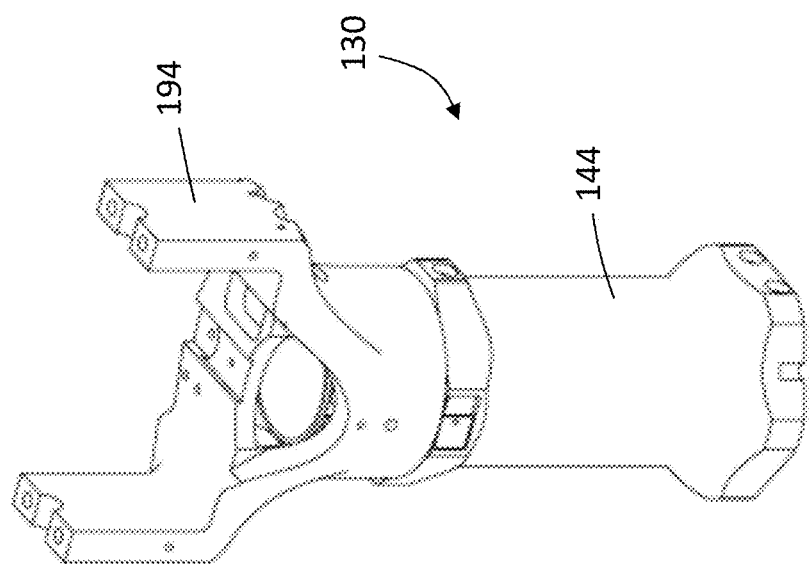
Figure 7H:
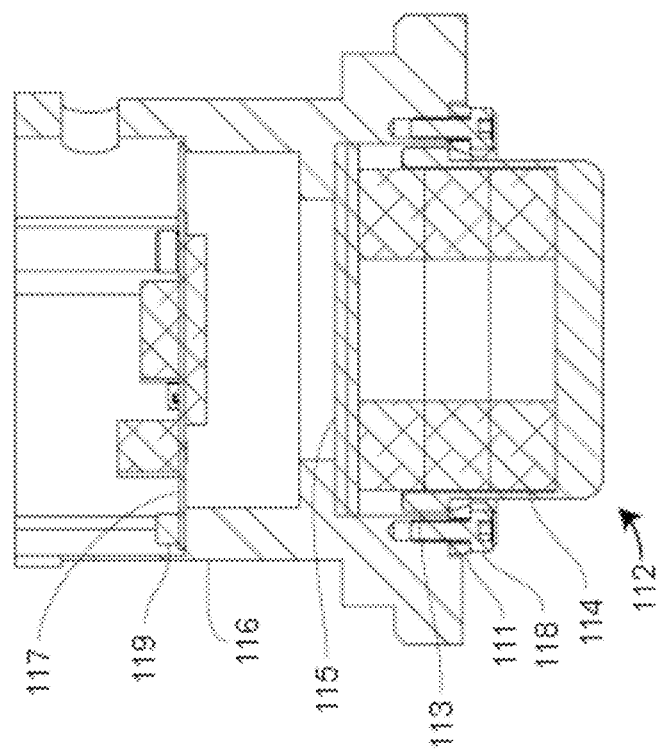
Figure 7G:
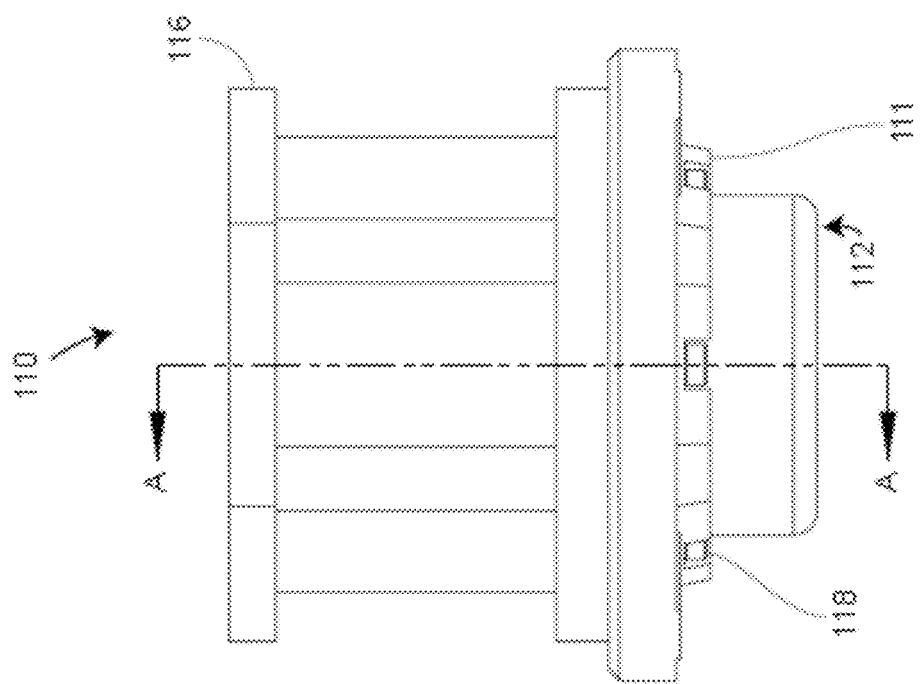
Figure 7J:
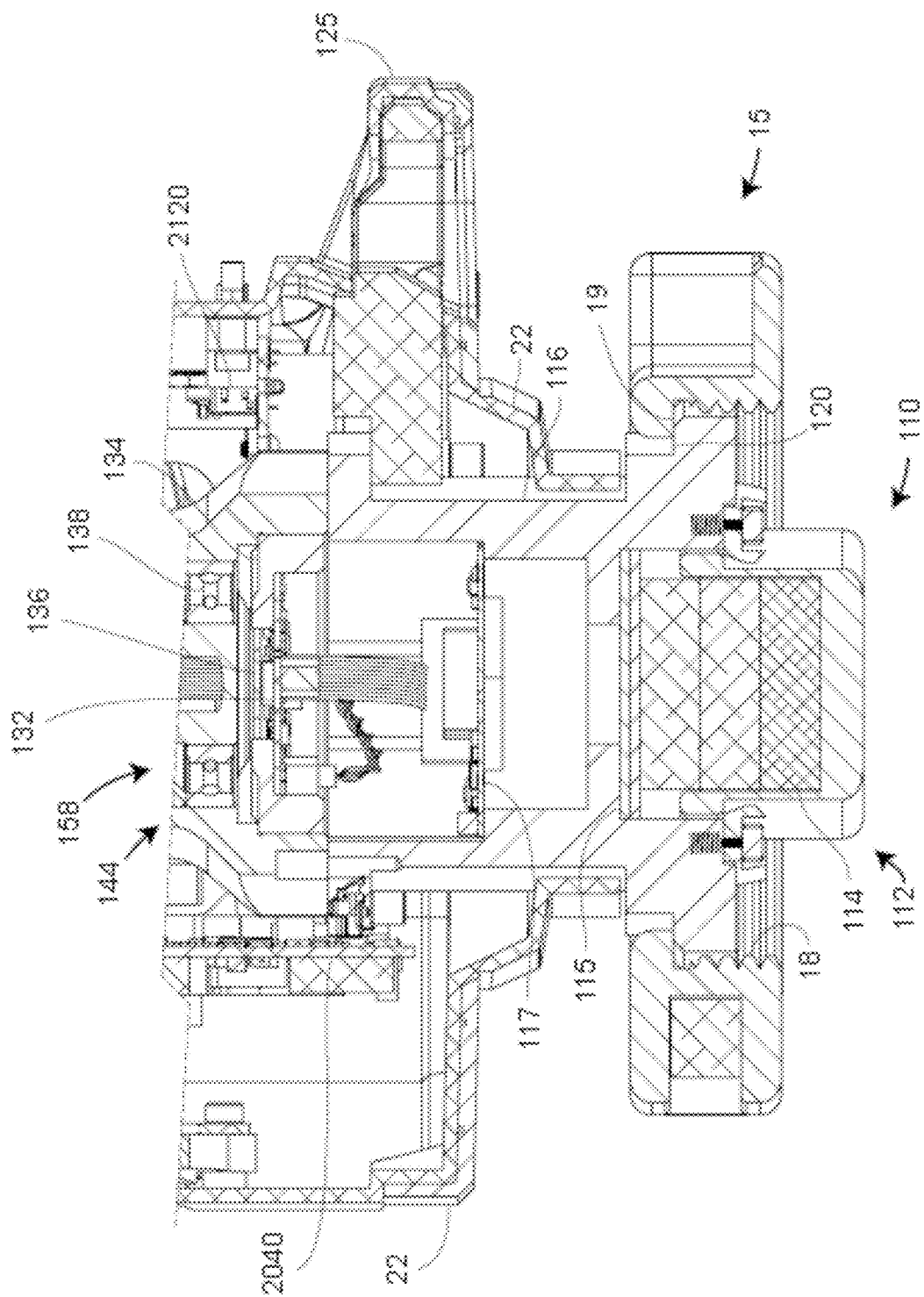
FIG. 7J is a cross-sectional view of a lower portion of the articulated-arm base and the mounting device according to an embodiment.

Advantages provided by the shock-absorber bumper 110 may be understood by referring to FIG. 7J, which shows the shock-absorber bumper 110, the first-axis housing 144, the base cover 22, the handle 125, the base processor electronics 2040, the rear connector interface 2120, and the tilt board 117. Also shown in FIG. 7J and FIG. 7A are the mounting device 15, which includes screw threads 18, a mounting device lip 19, a first wing 16, and a second wing 17. The mounting device 15 is described in U.S. Pat. No. 8,028,432, the contents of which are incorporated by reference herein.

In an embodiment, an externally threaded mounting ring (not shown) is attached to a mounting surface such as an instrument stand, tripod, or table. In an embodiment, internal screw threads 18 of the mounting device 15 engage the external screw threads of the mounting ring. As the screw threads are tightened, a mounting device lip 19 is drawn into firm contact with a base-nut retainer shelf 120 of the mounting device 15. In this way, the AACMM 10 is locked firmly in place. Advantageously, the screw threads on the mounting device may be temporarily loosened to allow the base 20 of the AACMM 10 to be turned to different direction before being retightened.

Initially, when the base 20 of the AACMM 10 is being positioned by the user on the mounting ring, the bottom of the AACMM 10 may not be centered on the mounting ring. As a result, when the AACMM 10 is centered on the ring, the AACMM 10 may drop suddenly, shocking the mechanical elements within the AACMM 10. The shock-absorber bumper 10 reduces or minimizes the risk of damage to the AACMM 10 by catching the mounting surface with the bottom of the bell 112 and slowing the descent of the AACMM 10 as the damper 114 compresses. In other embodiments, the mounting device 15 is attached to threads not included on a mounting ring. In still other embodiments, the AACMM 10 is attached to a mounting without use of the mounting device 15. In this embodiment, the shock-absorber bumper may provide protection against rapid falls of and shocks to the AACMM 10.

A portable articulated arm coordinate measuring machine (AACMM), comprising: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; a shock-absorber assembly coupled to a lower portion of the AACMM, the shock-absorber assembly operable to reduce mechanical shock to the AACMM when the AACMM is brought into contact with a support element; and a processor operable to determine three-dimensional (3D) coordinates of a point measured by the measurement device based at least in part on the provided data corresponding to the position of the measurement device.

In an embodiment, the shock-absorber assembly includes a retractable surface that, when brought into contact with the support element, retracts toward an interior of the shock-absorber assembly through compression of a damper material.

Figure 10:
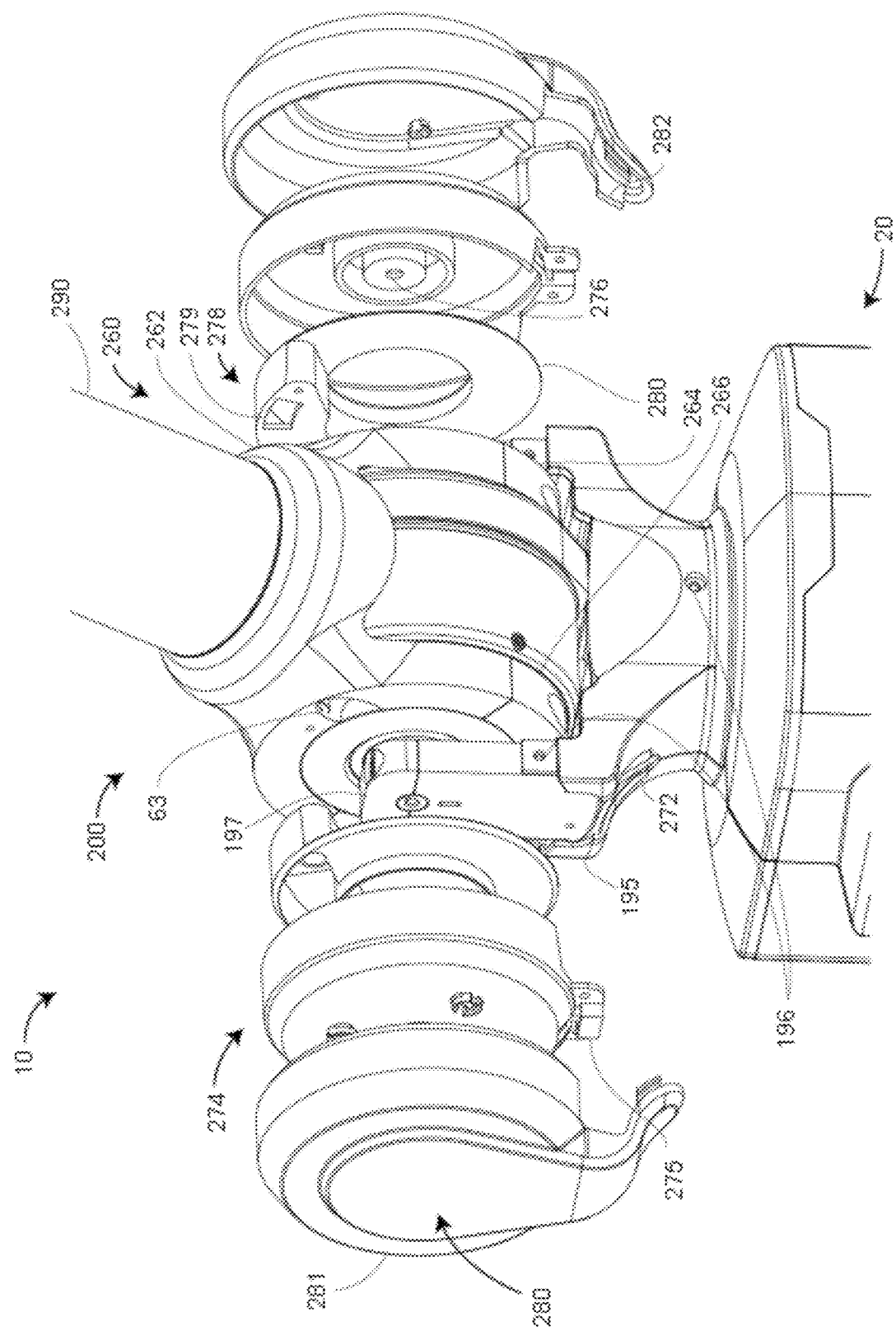
FIG. 10 is an exploded view of a lower portion of the AACMM according to an embodiment.
Figure 11:
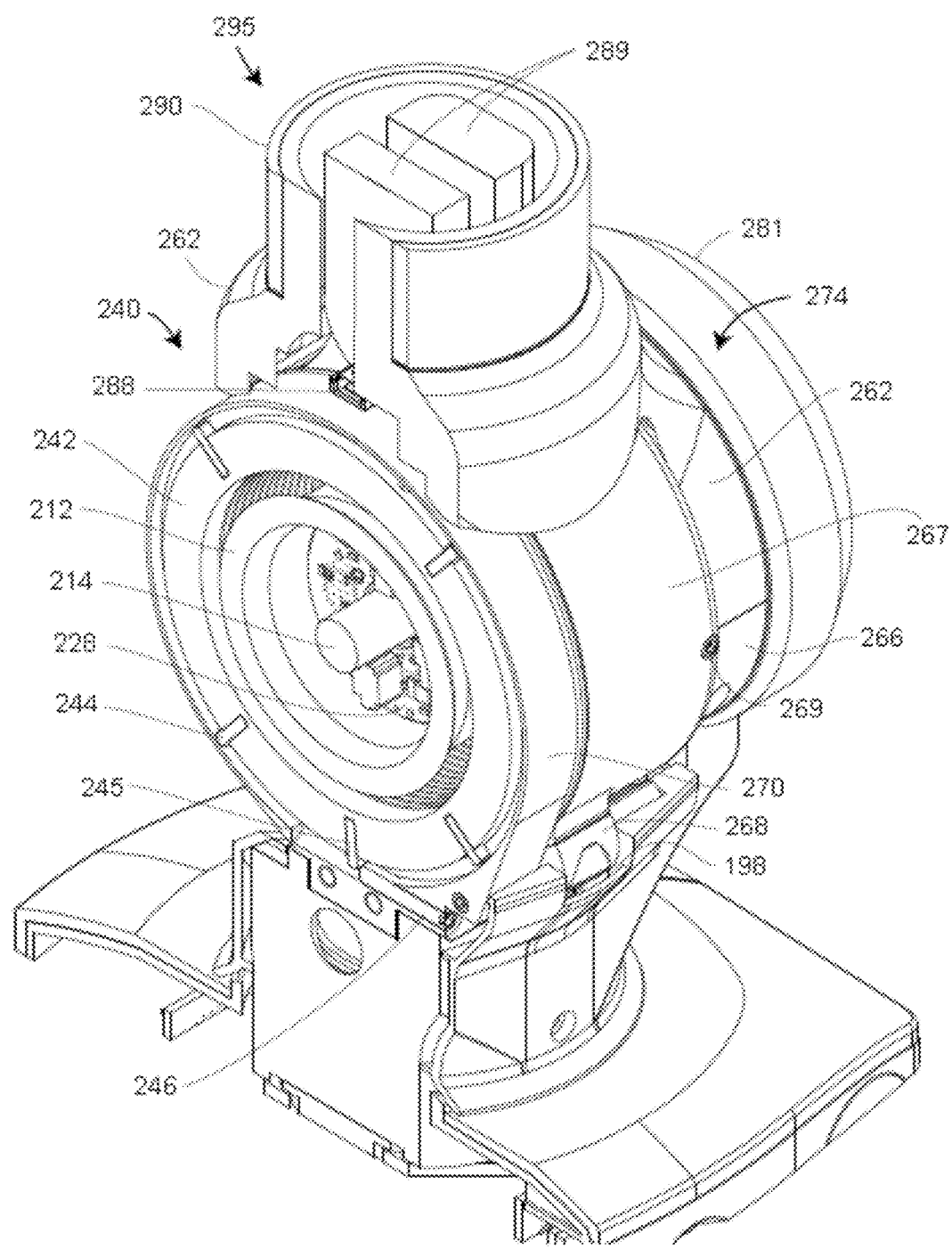
FIG. 11 is a partial isometric view of a second-axis/counterbalance assembly and surrounding components according to an embodiment.
Figure 12:
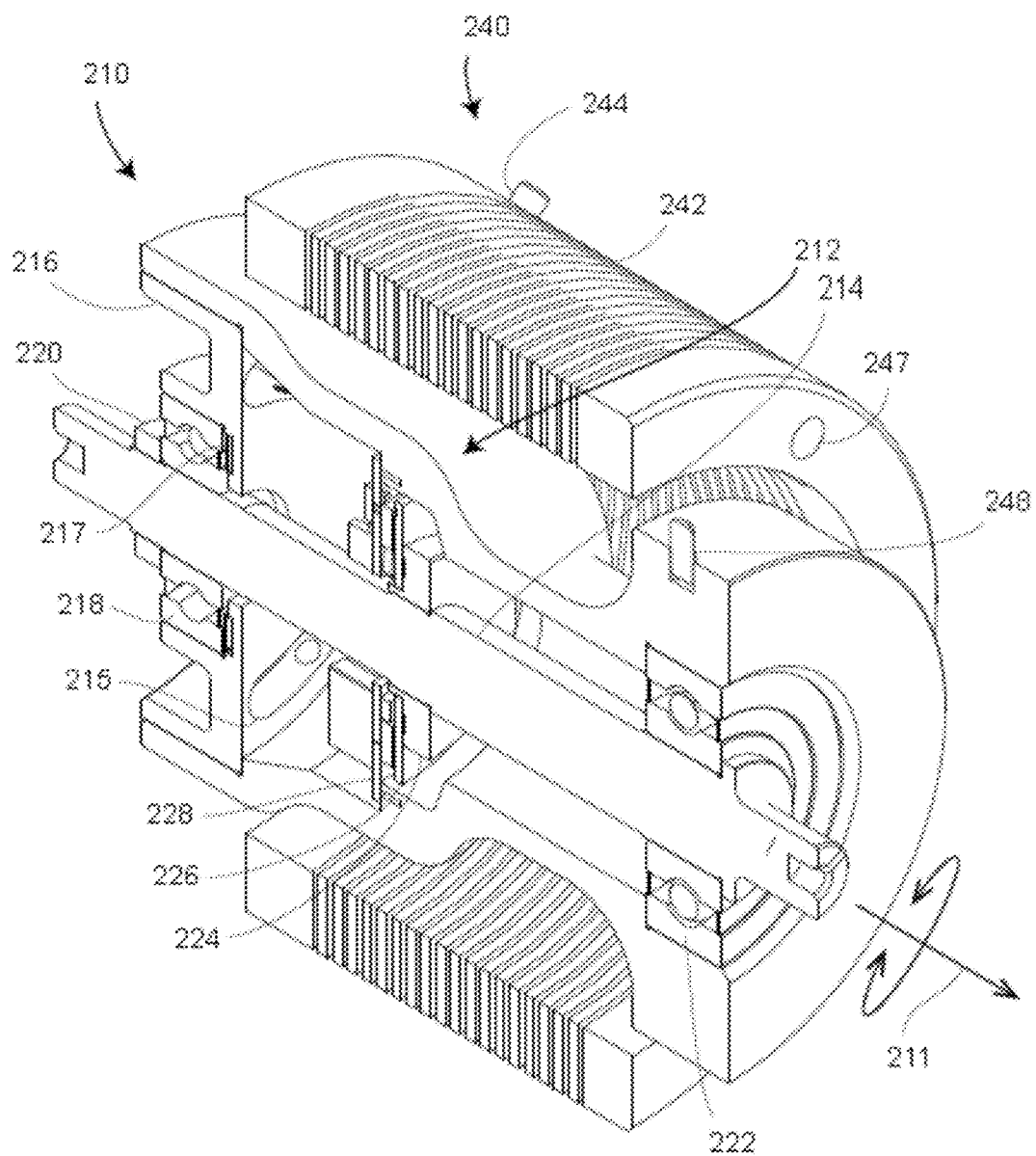
FIG. 12 is a partial section view of a second axis cartridge and counterbalance ring according to an embodiment.
Figure 13:
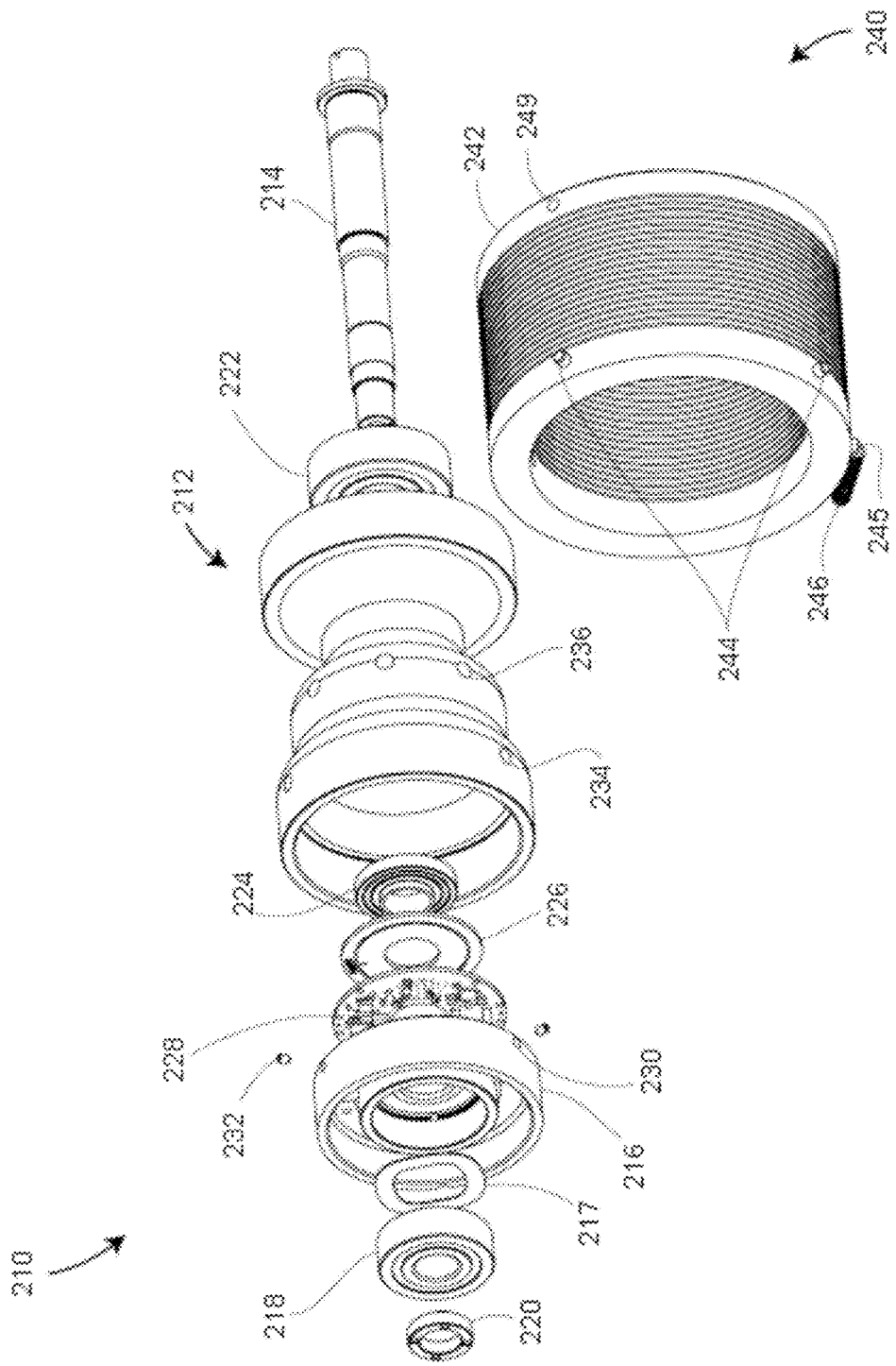
FIG. 13 is an exploded view of the second-axis cartridge and counterbalance ring according to an embodiment.

FIGS. 6A, 6B, 10, and FIG. 11 show some external elements of the second-axis assembly 200, including first-segment yoke 260, second-axis cap 280, cable cover 274, and cable-track 278. The first-segment yoke 260 includes first-segment yoke beam 262, first-segment-yoke right bow 264, and first-segment-yoke left bow 266. FIGS. 12, 13 show some internal elements of the second-axis assembly 200, including the second-axis cartridge 210 and the counterbalance ring 240. In an embodiment, the second-axis assembly 200 provides a hinge-type rotation about a second axis 211. In an embodiment, the second-axis assembly 200 also includes the counterbalance ring 240 that provides a torque that lightens the downward force on arm segments held by an operator, thereby making it easier for an operator to support and maneuver the AACMM 10 in making measurements.

In an embodiment, the second-axis cartridge 210 includes a second-axis shaft 214, a left second-axis bearing 222, a second-axis housing 212, a second-axis disk mount 224, an encoder disk 226, an encoder board with read heads 228, a cartridge inner plate 216, a wave washer 217, a right second-axis bearing 218, and a lock nut 220. In an embodiment, the left second-axis bearing 222 is press fit onto both the second-axis shaft 214 and the second-axis housing 212. In an embodiment, the cartridge inner plate 216 is press fit to the second axis housing, and the inner race of the right second-axis bearing 218 is press fit onto the second-axis shaft 214. The wave washer 217 applies force to the outer race of the right second-axis bearing 218 but not to the inner race. The inner race of the right second-axis bearing is held in place with the lock nut 220. In an embodiment, the force applied by the wave washer 217 pushes the outer race of the right second-axis bearing 218 against a ball in the bearing 218, with a corresponding and oppositely directed force between applied to the ball by the inner race. The distance between the inner race of the bearing 218 and the inner race of the bearing 222 is set so that upon tightening the lock nut 220 into position, the inner race of bearing 222 pulls inward on the shaft, with an oppositely directed force applied to the ball by the outer race. The result of the application of these forces is a preloading similar to preloading of the bearings in the first-axis cartridge 130. Bearing lock set screws 232 are passed through outer access holes 234 and inner access holes 230, where the inner access holes 230 penetrate both cylindrical portions of the cartridge inner plate 216, enabling the bearing lock set screws 232 to hold rigidly fix the position of the outer race of the right second-axis bearing 218. Although the wave washer 217 applies a force to the outer race that establishes preload of the bearings in the second-axis cartridge 210, the wave washer 217 may be subject to vibration when the AACMM 10 is in use. Hence the bearing lock set screws provides a more stable locking into position of the outer race of the right second-axis bearing 218. In an embodiment, epoxy is further applied to the outer race to hold it in place.

In an embodiment, the second-axis disk mount 224 is press fit onto the second-axis shaft 214. The encoder disk 226 is glued and centered on the second axis 211 and allowed to cure. The encoder board with read heads 228 is centered on the encoder disk and affixed to the second-axis housing 212. In an embodiment, disk centering holes 236 in the second-axis housing 212 are used to assist in centering the encoder disk on the rotating shaft 214. A tool inserted through the disk centering holes 236 is used to move or nudge the encoder disk 226 in a direction to center it on the shaft. In an embodiment, the centering procedure is performed while slowly rotating the second-axis shaft 214 on a rotation fixture used in a manufacturing process. As the encoder disk 226 is slowly rotated, electrical signals generated by the rotation fixture indicate a direction in which the encoder disk 226 should be moved or nudged to center the encoder disk 226 on the second-axis shaft 214.

A wire-routing slot 215 (FIG. 12) is cut into the cartridge inner plate 216 to pass the busses 2182, 2184, 2186 through the second-axis cartridge 210. An anti-rotation pin 248 that is pressed into the second-axis housing 212 mates with first-segment yoke beam 262 shown in FIGS. 10, 11. The first-segment-yoke beam 262 attaches to the first-segment tube 290 of the first segment 295 as further shown in FIGS. 11, 14A, 14B, 14C, 14D, and FIG. 14E. Hence the second-axis housing 212 rotates together with the first segment 295. The first-segment-yoke beam 262 further attaches to first-segment-yoke right bow 264 and first-segment-yoke left bow 266 as shown in FIG. 10. In an embodiment, a temperature sensor 288 is included adjacent to the first-segment yoke beam 262.

As shown in FIG. 12 and FIG. 13, the counterbalance ring 240 includes a torsion spring 242, spring retaining pins 244, threaded holes 247 to accept yoke locking screws, an anti-rotation threaded hole 249 to accept an anti-rotation set screw 249, and a tensioning set screw 246. Threaded holes 247 in the counterbalance ring 240 attach with yoke locking screws to holes 265 in first-segment yoke beam 262 shown in FIG. 14D. Likewise, the anti-rotation threaded hole 249 receives an anti-rotation set screw 269 to fix one side of the torsion spring 242 to a counterbalance ring cylinder 267 as shown in FIG. 11. Hence, the side of the torsion spring that includes the threaded hole 247 and the anti-rotation threaded hole 249 turns along with the first segment yoke beam and the first segment 295.

In contrast, the other side of the torsion spring is fixed to a spring tension plate 270 attached rigidly to the base 20, as shown in FIG. 11. A tensioning set screw 246 in FIG. 11 and FIG. 13 is brought into contact with a spring tension pin 245. A counterbalance ring bump 268 makes contact with a first-axis yoke bumper 198 when the first segment 295 is rotated as far as possible about the second axis 211 (FIG. 12) in one direction. At this position, the amount of force exerted by one side of the torsion spring 242 relative to the other side is determined by an adjustment of the tensioning set screw 246. As the first segment 295 is rotated to bring the counterbalance ring bump 258 farther from the first-axis yoke bumper 198, the amount of force exerted by the torsion spring 242 increases. The effect of the increase in the force as the first segment 295 is moved away from a vertical orientation is to apply an increasing force to the first segment 295, with the force directed opposite the direction of gravity. In this way, the arm segments are made to feel lighter and easier to handle to the user. Spring retaining pins 244 shown in FIG. 11 and FIG. 13 keep the torsion spring 242 centered within the spring tension plate 270.

As illustrated in FIG. 10 and FIG. 11, the second-axis shaft 214 is clamped between upper prongs of the first-axis yoke structure 194 and first-axis-yoke caps 197. Hence the second-axis shaft 214 is fixed in relation to the base 20. A first-axis yoke cover 195 is placed over a lower portion of the yoke structure 194 and locked into place with screws applied to first-axis-yoke-cover screw holes 196. Placed about each side of the first-axis yoke structure 194 (FIG. 7B) are a cable-track 278, a cable cover 274, and a second-axis cap 280. The second-axis cap 280 includes a cap body 281 and a cap snap connector 282, the cap snap connector 282 attaching to a cap snap receptacle 272 of the first-axis yoke cover 195. In an embodiment, the assembly includes two opposing second-axis caps 280, each having a cap snap connector 282 that couples with a respective cap snap receptacle 272. Wires routed from the base 20 pass through an opening in the cap snap receptacle 272 and through a cable-cover pass-through 275 of the cable cover 274. The wires are channeled by a cable-track plate 280 and through a cable-track window 279 of the cable track 279. The wires pass through a first-segment-yoke cable hole 263. The wires that pass through the first-segment-yoke cable hole 263 may pass directly into the first-segment tube 290 or through the wire-routing slot 215 to the encoder board connector 2174 (FIG. 3) before passing back through the wire-routing slot 215 into the first-segment tube, as shown in FIGS. 10, 14E. In an embodiment, wires of the first bus 2182 (FIG. 4A) pass through the first-segment yoke-cable hole 263 on one side of the first-segment-yoke beam 262 while the wires of the second bus 2184 pass through the first-segment yoke-cable hole 263 on the other side. In an embodiment, the cable-track 278 and the cable cover 274 are attached to the second-axis shaft 214 with a screw that passes through a cable-cover screw hole 276. In an embodiment, each second-axis cap 280 is snapped onto a corresponding cable cover 274.

Figure 14A:
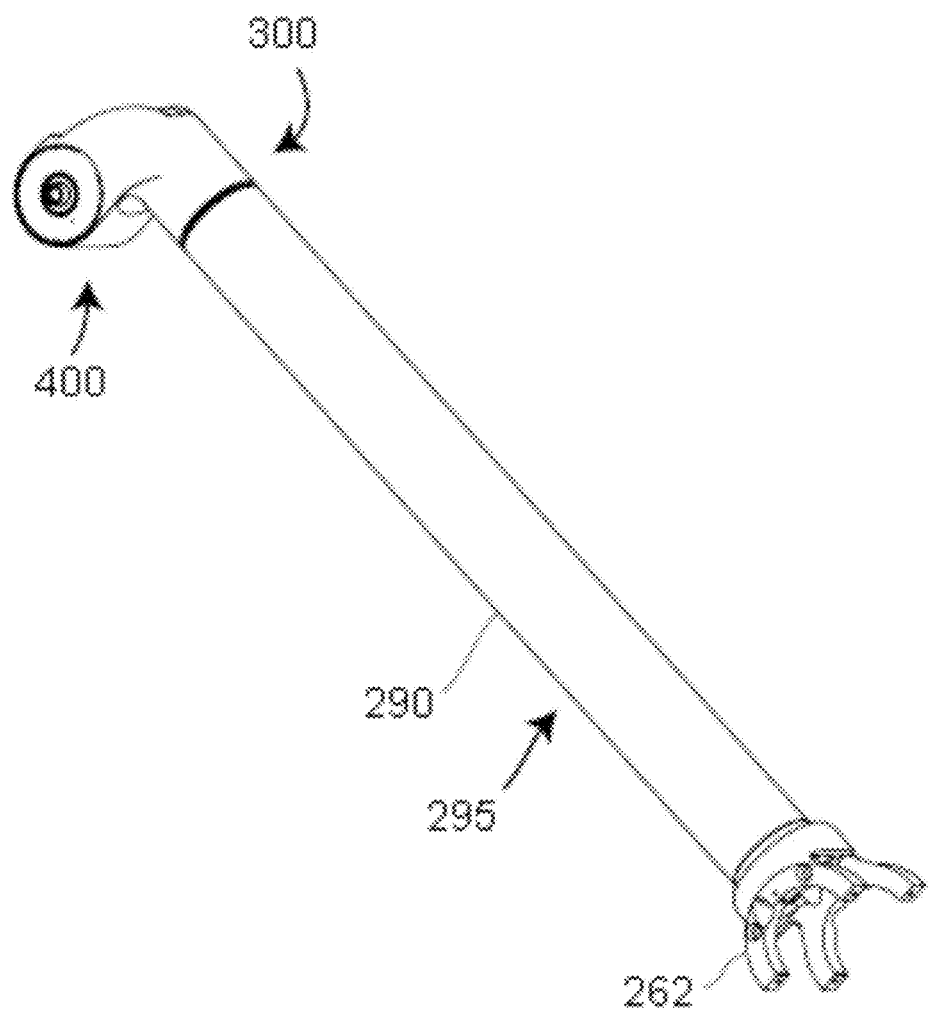
Figure 14B:
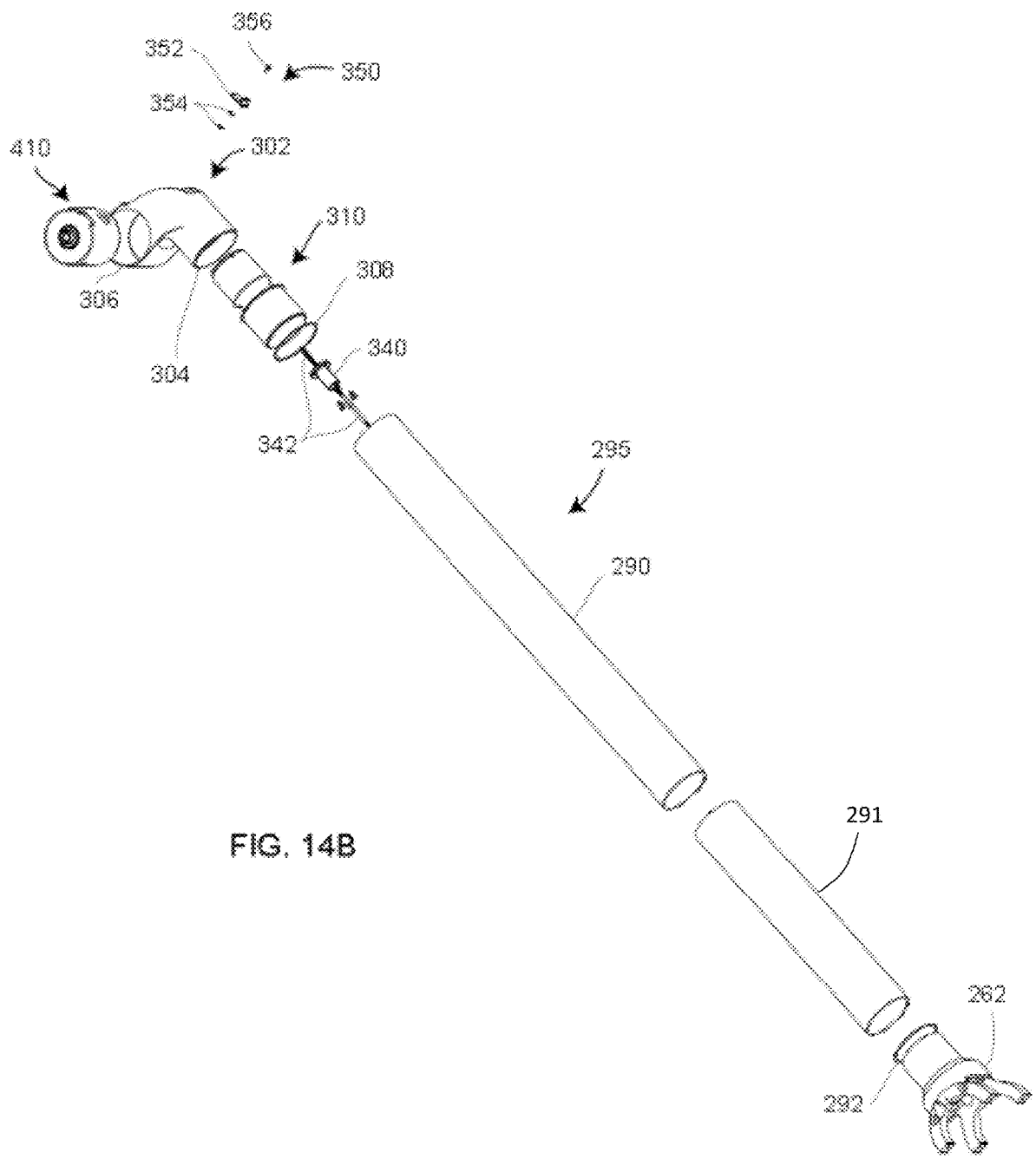
Figure 14E:
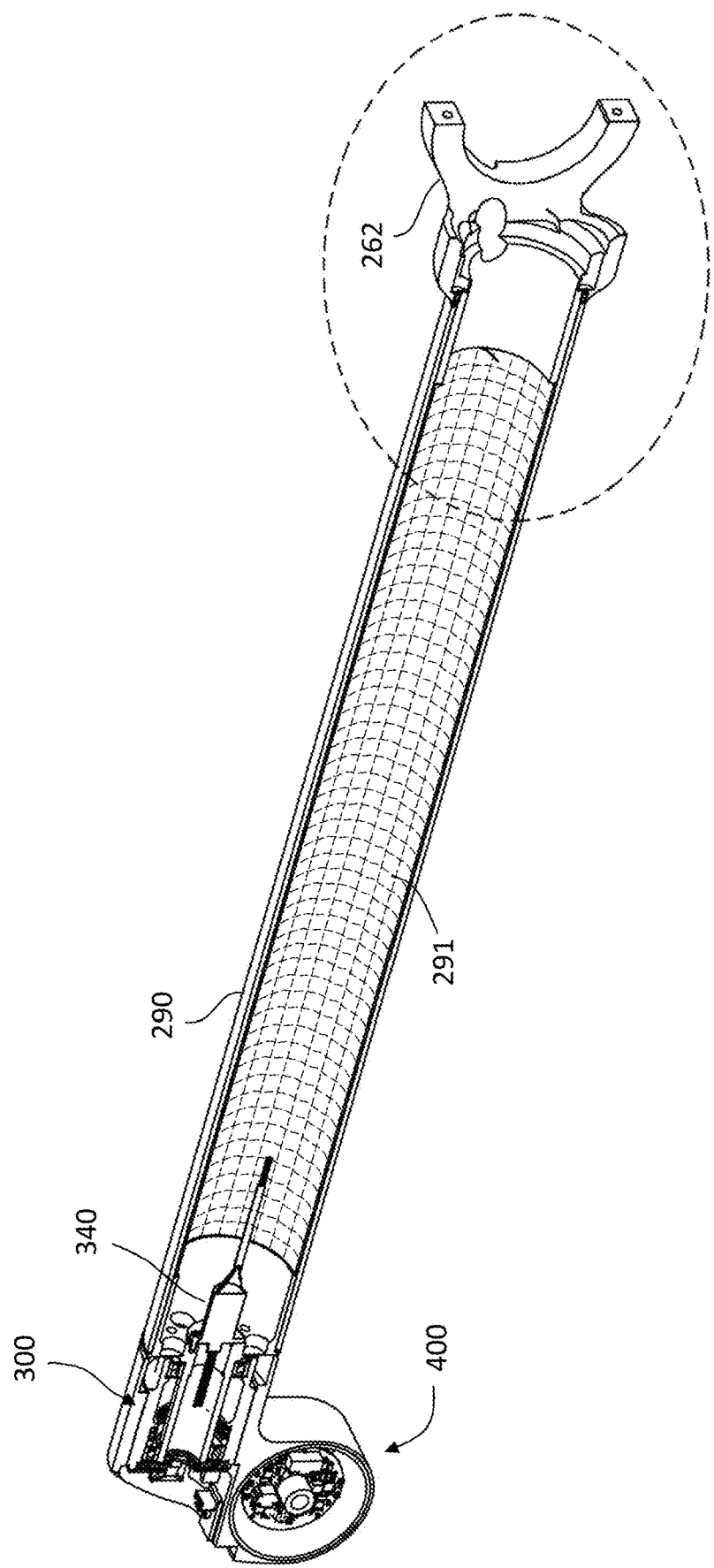
Figure 14F:
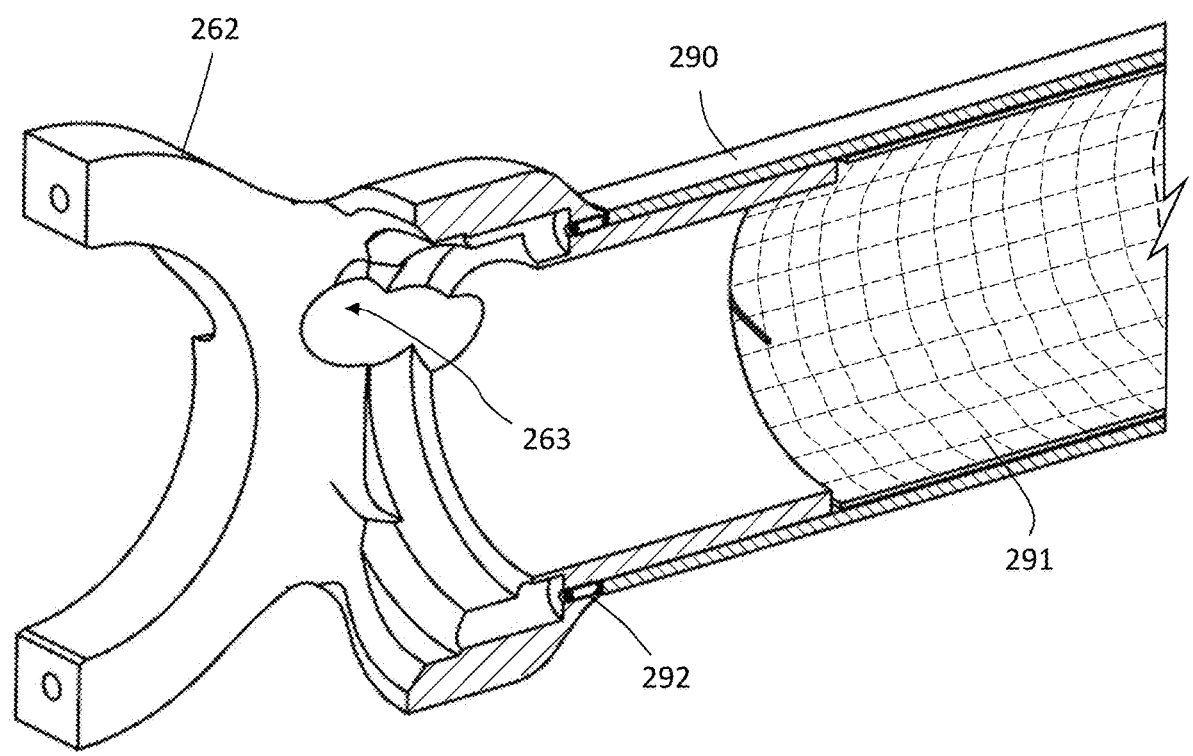
FIG. 14F is an enlarged view of a portion of the sectional view of FIG. 14E according to an embodiment.
Figure 15A:
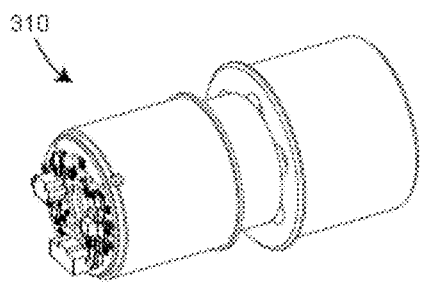
Figure 15B:
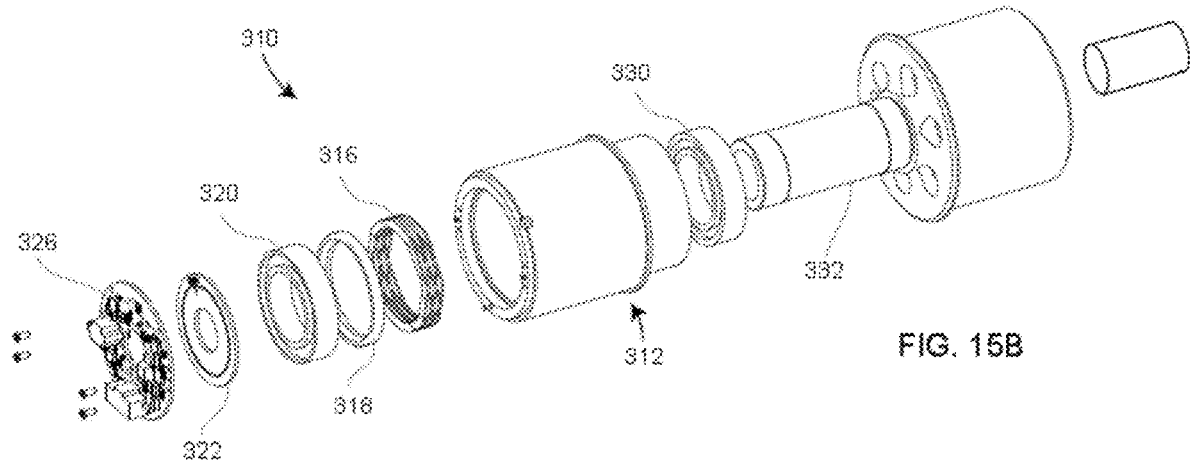

FIGS. 14A, 14B, 14C, 14D, and FIG. 14E illustrate the first-segment-yoke beam 262, the first segment 295, the third-axis assembly 300, and the fourth-axis assembly 400. The section view of FIG. 14E shows that the first-segment-yoke beam 262 attaches inside the first-segment tube 290. FIG. 14B shows a conductive grounding ring 292 that provides grounding between the first-segment-yoke beam 262 and the first segment tube 290, thereby improving electrical reliability and performance of the AACMM 10. Likewise, a conductive grounding ring 308 provides grounding between the cartridge adapter 302 and the first-segment tube 290. In an embodiment, the first-segment tube 290 is made of a carbon-fiber composite or aluminum material.

In an embodiment, the first segment 295 includes a heater element 291 that is disposed within the first-segment tube 290. The heater element 291 is in thermal contact with the first-segment tube 290 and is electrically coupled to the base processor 2040, such as via bus 2186 for example. The base processor 2040 activates the heater element 291 in response to a signal from a temperature sensor (e.g. temperature sensor 288) indicating that the temperature of the first segment 295 is below a predetermined temperature range. In an embodiment, the first-segment tube 290 is made from a material having a relatively high CTE, such as aluminum for example.

The wires of the first bus 2182, the second bus 2184 and the third bus 2186 (FIG. 4A) are routed through the first-segment-yoke cable hole 263 as described herein above. The bus wires 2182, 2184, 2186 continue as cables 342 to pass through the third/fifth-axis slip ring 340, which is a part of the third/fifth cartridge 310. The term third/fifth-axis slip ring indicates that the same slip-ring assembly 340 is used in both the third-axis assembly 300 and in the fifth-axis assembly 500 (FIG. 1). The term third/fifth cartridge indicates that the same cartridge assembly 310 is used in both the third-axis assembly 300 and the fifth-axis assembly 500. The cartridge adapter 302 is a common component of the third-axis assembly 300 and the fourth-axis assembly 400 since these axis assemblies house the third/fifth-axis cartridge 310 and the fourth/sixth-axis cartridge 410, respectively. The third-axis assembly 300 provides rotation of the cartridge adapter 302 about a third axis 311 shown in FIG. 14D. The fourth-axis assembly 400 provides rotation of fourth/sixth-axis shaft 418 about a fourth axis 411 shown in FIG. 14C.

The third/fifth-axis cartridge 310 illustrated in FIGS. 14E, 15A, 15B, 15C, and FIG. 15D includes an encoder board with read heads 326, an encoder disk 322, an upper bearing 320, a preload bearing spacer 318, a wave washer 316, a third/fifth-axis housing 312, a lower bearing 330, a third/fifth-axis shaft 332, and the third/fifth-axis slip ring 340 with cables 342. The third/fifth-axis shaft 332 rotates relative to the third/fifth-axis housing 312.

In an embodiment, the third/fifth-axis shaft 332 is press fit against an inner race of the upper bearing 320. The wave washer 316 is placed against a housing upper ledge 314. The preload bearing spacer 318 sits between the wave washer 316 and an outer race of the upper bearing 320. The spring action of the wave washer 316 acts to push the outer race of the upper bearing 320 against a ball in the upper bearing 320. In reaction, the inner race of the upper bearing 320 pushes oppositely against the ball in the upper bearing 320. The wave washer 316 also pushes downward on the housing lower ledge 314, thereby pushing the outer race of the lower bearing 330 against the ball in the lower bearing 330. In response, the inner bearing presses oppositely against a ball in the lower bearing 330. In this way, a preload is applied to the bearings 320, 330 in the third/fifth axis cartridge 310. In an embodiment, the encoder disk 322 is glued to the third/fifth-axis shaft 332, centered on the shaft 332, and cured in place. The encoder board with read heads 326 is pinned in place with the pin 324.

Similar to the first-axis bearing cartridge, the third/fifth-axis cartridge 310 includes a heater element 313 disposed within the hollow interior 315 of the third/fifth-axis shaft 332. The heater element 313 is in thermal contact with the third/fifth-axis shaft 332 and in electrical contact with the base processor 2040, such as via bus 2138 for example. The base processor activates the heater element 313 in response to a signal from an adjacent temperature sensor, such as temperature sensor 352 for example, indicating that the temperature of the third/fifth-axis cartridge 310 is below a predetermined temperature range.

The fourth/sixth-axis cartridge 410 illustrated in FIGS. 16A, 16B, 16C, and FIG. 16D includes a fourth/sixth-axis bearing 416 located the encoder side, a fourth/sixth-axis housing 412, a fourth/sixth-axis shaft 418, an encoder disk 422, an encoder board with read heads 426, a drum flexure 428, a wave washer 430, a preload bearing spacer 432, a fourth/sixth-axis bearing 434 located on the spring side, and a protective cover 436. The fourth/sixth-axis shaft 418 rotates relative to the fourth/sixth-axis housing 412. In an embodiment, the fourth/sixth-axis cartridge 410 does not include a slip ring but rather provides routing for the wires through as described herein below with respect to FIGS. 16E, 16F, 16G, and FIG. 16H. In an embodiment a slip ring is not used on those second-axis assembly 200, the third-axis assembly 400, or the sixth-axis assembly 600 because the total amount of rotation is limited by the hinge movement of these assemblies.

In an embodiment, with the wave washer 430 and the preload bearing spacer 432 held in place by the drum flexure 428, the inner race of the fourth/sixth-axis bearing 434 is press fit to the fourth/sixth-axis shaft 418, while the inner race of the fourth/sixth-axis bearing 416 is press fit against the shaft 418 and benched against the shaft first ledge 417. The force applied by the wave washer 430 and preload bearing spacer 432 pushes the outer race of the bearing 434 against a ball in the bearing 434, and a counter force presses the inner race of the bearing 434 in an opposing direction against the ball in the bearing 434. At the same time, the forces on the bearing 434 pull the outer race of the bearing 416 against a housing first ledge 414. This combination of actions provides preloads for the bearings 416, 434. In an embodiment, the encoder disk 422 is glued to the housing second ledge 424, after which it is centered on the fourth/sixth-axis shaft 418 and cured in place. In an embodiment, the encoder board with read heads 426 is attached to the fourth/sixth-axis housing 412. In an embodiment, centering of the encoder disk 422 about the fourth/sixth-axis shaft 418 is facility by moving or nudging the encoder disk with a tool placed through one or more encoder-adjustment holes 423 in the fourth/sixth-axis housing 412.

Similar to the first-axis bearing cartridge, the fourth/sixth-axis cartridge 410 includes a heater element 415 disposed within the hollow interior 419 of the fourth/sixth-axis shaft 418. The heater element 415 is in thermal contact with the fourth/sixth-axis 418 and in electrical contact with the base processor 2040, such as via bus 2138 for example. The base processor activates the heater element 415 in response to a signal from an adjacent temperature sensor, such as temperature sensor assembly 350 (FIG. 24B) for example, indicating that the temperature of the fourth/sixth-axis cartridge 410 is below a predetermined temperature range.

Figure 16C:
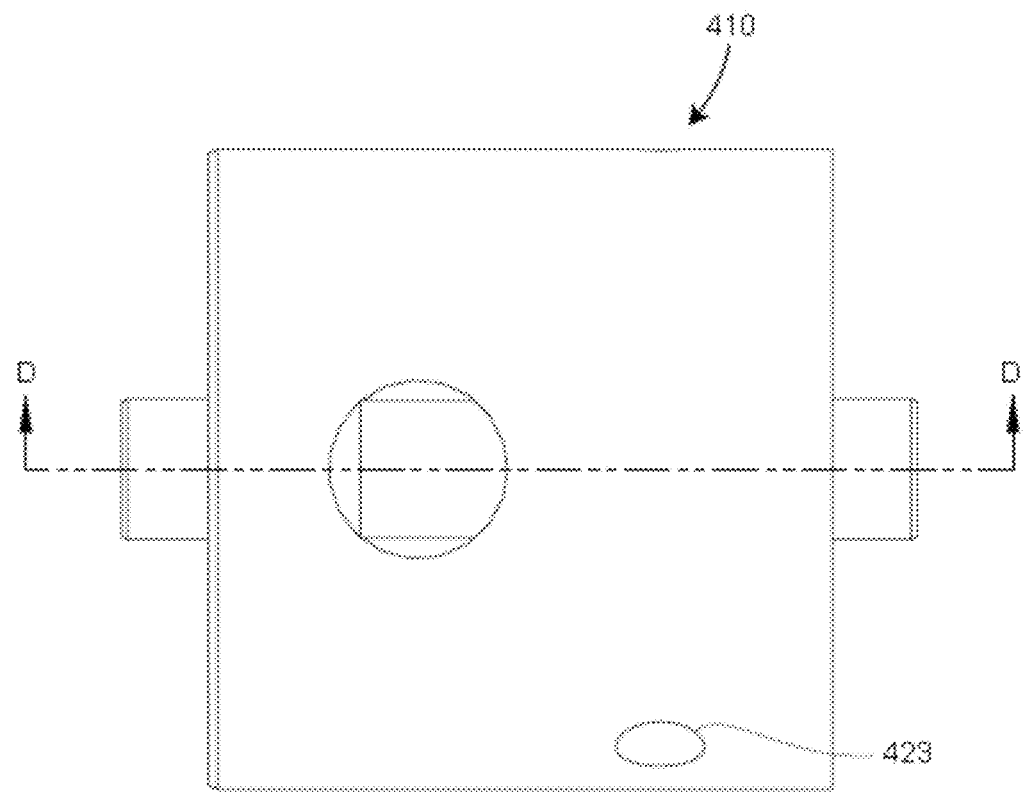
Figure 16D:
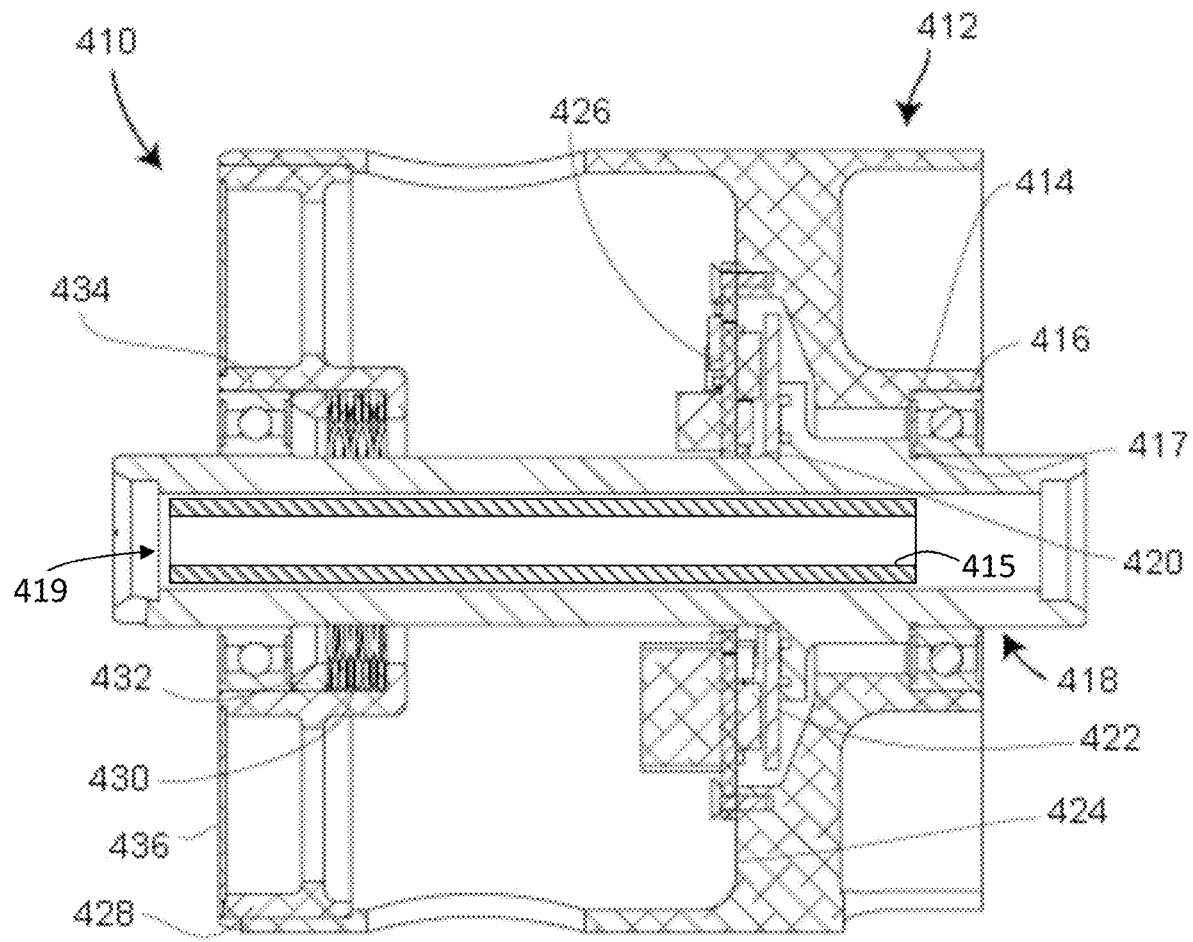
Figure 16E:
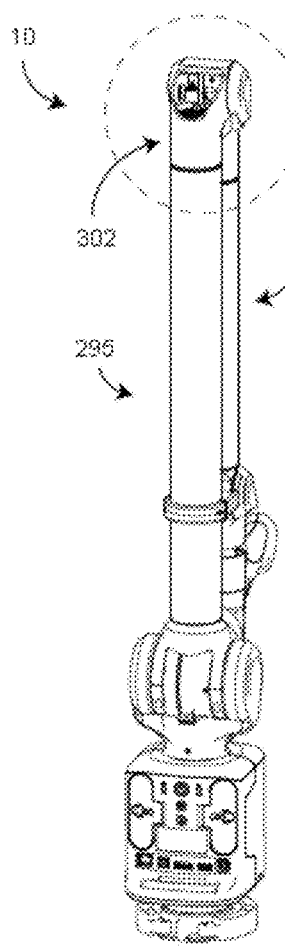
Figure 16F:
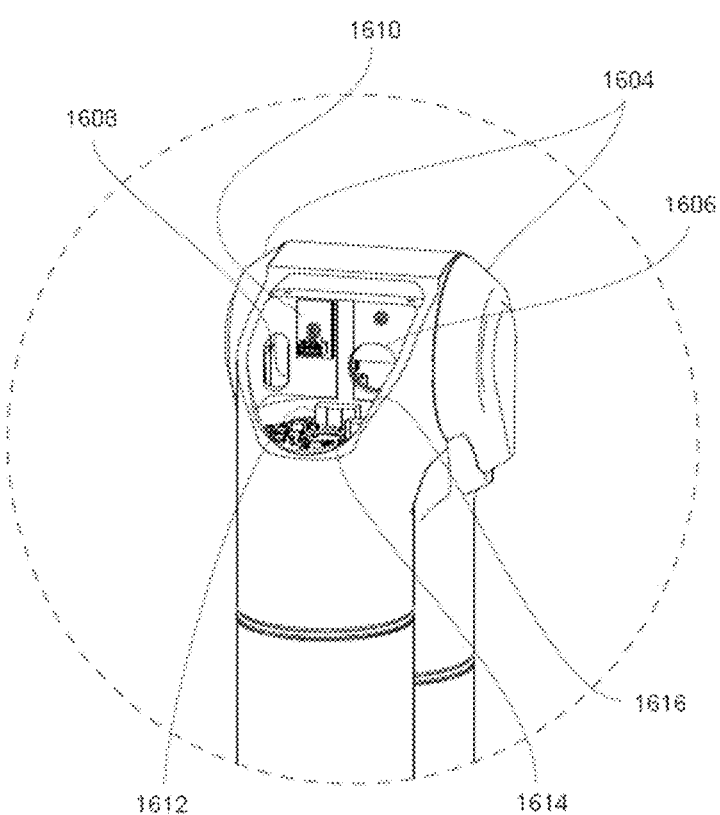

FIG. 16E and FIG. 16F show the AACMM 10 including the first segment 295, second segment 595, and cartridge adapter 302. The cartridge adapter 302 includes a top-bumper opening 1616 that accommodates a top bumper 1602 as shown in FIGS. 16G, 16H. The encoder board with read heads 326 (FIG. 15B) is visible through the top-bumper opening 1616. An encoder connector 1612 and a temperature-sensor connector 1614 are attached to the encoder board 326. A cable (not shown) attaches the temperature-sensor 350 and temperature sensor connector 1610 to the temperature sensor connector 1614. The temperature-sensor assembly 350 (FIG. 14B) includes a temperature sensor 352, thermal putty 354, and screw 356. Readings from the temperature sensor are sent through the encoder board 326 (FIG. 15B) to the encoder connector 1612 where they are transferred to the first bus 2154 (FIG. 3). The cables 342 (FIG. 14B), which include the first bus 2154 and the second bus 2156, pass from the third/fifth-axis slip ring 340 (FIG. 14B) through a hole in the encoder board 326. The cable wires in the first bus 2154 attach to the encoder connector 1612, which in an embodiment is a T-connector, and continue on through the encoder-access hole 1606. The first housing hole 413 in the fourth/sixth-axis housing of FIG. 16B is aligned with the encoder-access hole 1606, thereby enabling the cable wires in the first bus 2154 to pass through the holes 1606 and 413 before attaching to a connector on the encoder board with read heads 426. The wires of the first bus 2154 pass back through the encoder-access hole 1606. The wires of the first bus 2154 and the second bus 2156 travel through the exit hole 1608, as may be seen from a different perspective in FIG. 16H.

It should be appreciated that the wires of third bus 2186 may be routed through the arm segments in a similar manner to the first bus 2154 and the second bus 2156.

FIG. 16G and FIG. 16H show that the fifth-axis yoke/receptacle 502 and the first-axis-yoke cap 1628 clamp to the fourth/sixth-axis shaft 418 (FIG. 16B). Cable wires passing through the exit hole 1608 make one-and-a-half-turn cable loop 1618 traveling through a channel 1622 by passing through a channel loop hole 1624 before passing through a channel exit hole 1626 to enter the fifth-axis assembly 500. Side bumpers 1604 (FIG. 16F) are placed over some elements as shown in FIG. 16H.

Figure 17A:
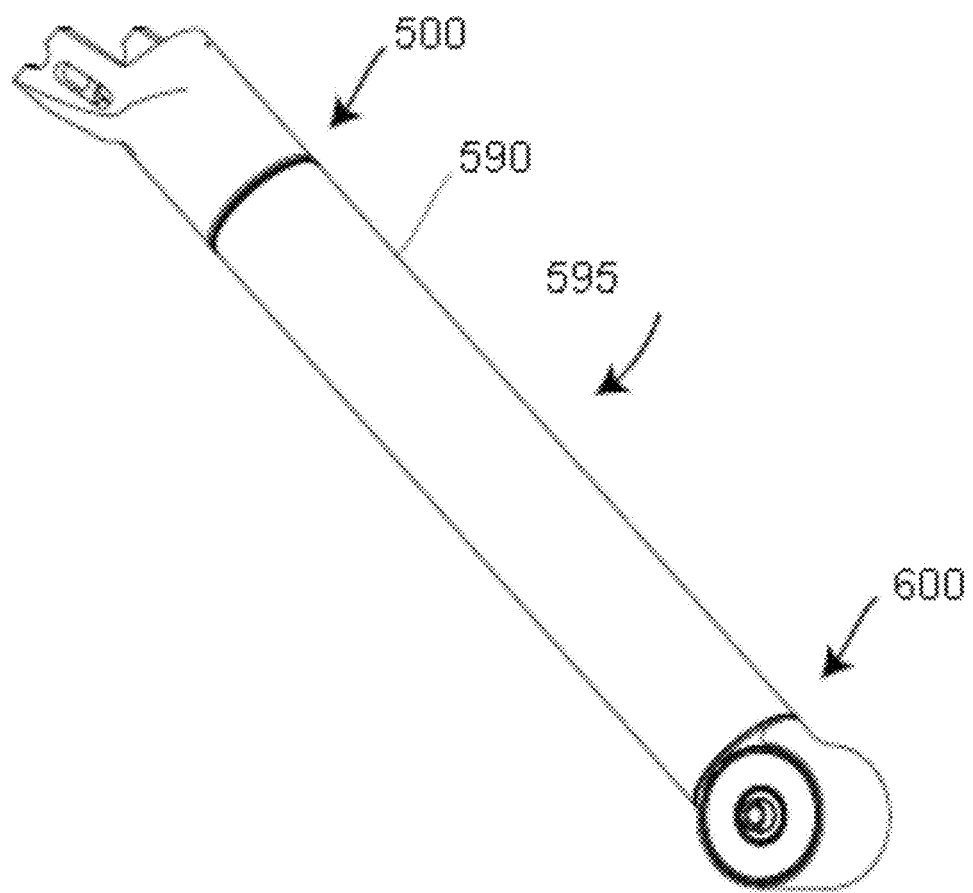
Figure 17B:
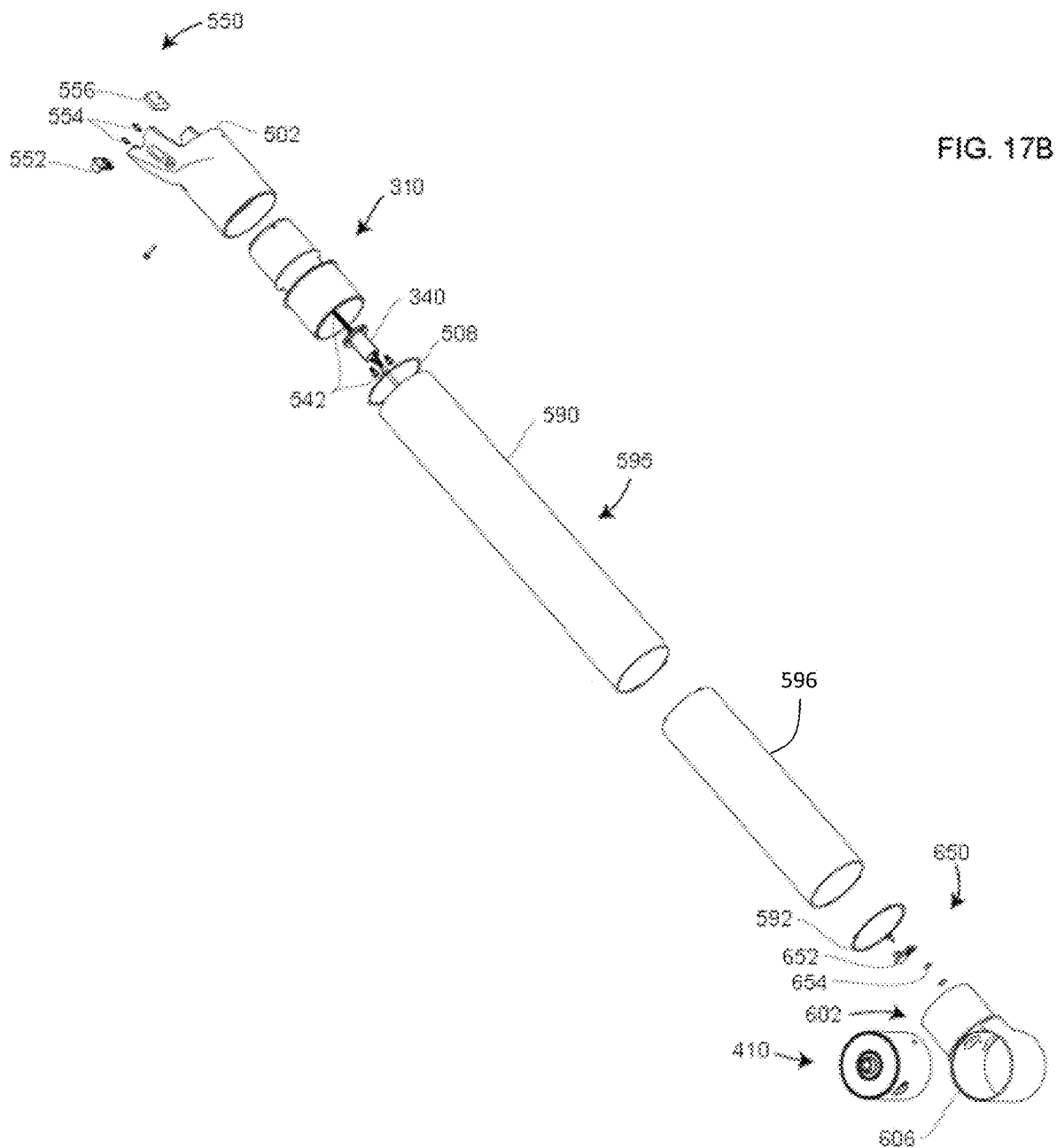

FIGS. 17A, 17B, 17C, 17D, 17E illustrate the fifth-axis assembly 500, the second segment 595, and the sixth-axis assembly 600. The fifth-axis assembly 500 includes a temperature-sensor assembly 550, a fifth-axis yoke/receptacle 502, a third/fifth-axis cartridge 310, and a conductive grounding ring 508. The second segment 595 includes a second-segment tube 590. The sixth-axis assembly includes a temperature-sensor assembly 650, a fourth/sixth-axis cartridge receptacle 606, and a cartridge adapter 602. As shown in FIGS. 17B, 17E, the third/fifth-axis cartridge 310 attaches to the inner portion of the second-segment tube 590, which in an embodiment is hollow. In an embodiment, another part of the third/fifth-axis cartridge 310 fits in the fifth-axis yoke/receptacle 502. In an embodiment, the temperature-sensor assembly 550 includes a temperature sensor 552, thermal putty 554, and a metal contact 556 that holds the temperature sensor 552 in place. In an embodiment, the third/fifth-axis cartridge 310 includes the elements described in FIGS. 15A, 15B, 15C, 15D, including the third/fifth-axis slip ring 340 and corresponding cables 542. The conductive grounding ring 508 provides electrical continuity between the cartridge 310 and the second-segment tube 590, which in an embodiment is made of carbon-fiber composite or aluminum material.

As shown in FIG. 17B and FIG. 17E, the fourth/sixth-axis cartridge 410 fits inside the sixth-axis cartridge receptacle 606, which in turn attaches to the inside of the second-segment tube 590. In an embodiment, the temperature-sensor assembly 650 includes a temperature sensor 652 and thermal putty 654. In an embodiment, the fourth/sixth-axis cartridge 410 includes the elements described in FIGS. 16A, 16B, 16C, and FIG. 16D. The conductive grounding ring 592 provides electrical continuity between the cartridge 310 and the second-segment tube 590. In an embodiment illustrated in FIG. 17D, the fifth-axis assembly 500 provides for swivel rotation about a fifth-axis 511. As illustrated in FIG. 17C, the sixth-axis assembly 600 provides for a hinge rotation of the fourth/sixth-axis shaft 418 (FIG. 16B) in the sixth-axis assembly 600 about the sixth-axis 611.

In an embodiment, the second segment 595 includes a heater element 596 disposed within the hollow interior of the second-segment tube 590. The heater element 596 is in thermal contact with the second-segment tube 590. The heater element 596 is further in electrical contact with the base processor 2040, such as via bus 2138 for example. The base processor activates the heater element 596 in response to a signal from an adjacent temperature sensor, such as temperature sensor assembly 552 for example, indicating that the temperature of the second arm segment 595 is below a predetermined temperature range. In an embodiment, the second-segment tube 590 is made from a material having a relatively high CTE, such as aluminum for example.

It should be appreciated that while embodiments herein describe heater elements 291, 595 as being disposed in both the first segment 290 and the second segment 590 respectively, this is for example purposes and the claims should not be so limited. In other embodiments, the AACMM 10 may include the heater element 291 in first segment 290 and no heater element in second segment 590. In still further embodiments, the AACMM 10 may include the heater element 595 in second segment 590 and no heater element in first segment 290.

It should be appreciated that while embodiments herein describe the temperature sensors that transmit signals to the base processor 2040 to control the heater elements 291, 596 as being located in or adjacent the axis assemblies 200, 300, 400, 600, 700 this is for exemplary purposes and the claims should not be so limited. In another embodiment, additional temperature sensors may be incorporated into the arm segments 291, 596. For example, a temperature sensor may be disposed at the midpoint or centrally located on the arm segment for determining when the respective heating element 291, 596 should be activated. In still further embodiments, multiple temperature sensors may be disposed along the length of the segment for determining when the respective heating element 291, 596 should be activated. In an embodiment, the temperature of the arm segment may be determined using an average or a weighted average temperature of the multiple temperature sensors. In still further embodiments, the temperature of the arm segment may be inferred using the temperatures measured at the axis assemblies located at the opposing ends of the arm segment (e.g. the temperature sensors of axis assembly 200 and 300 are used to infer the temperature of the arm segment 290).

Figure 18:
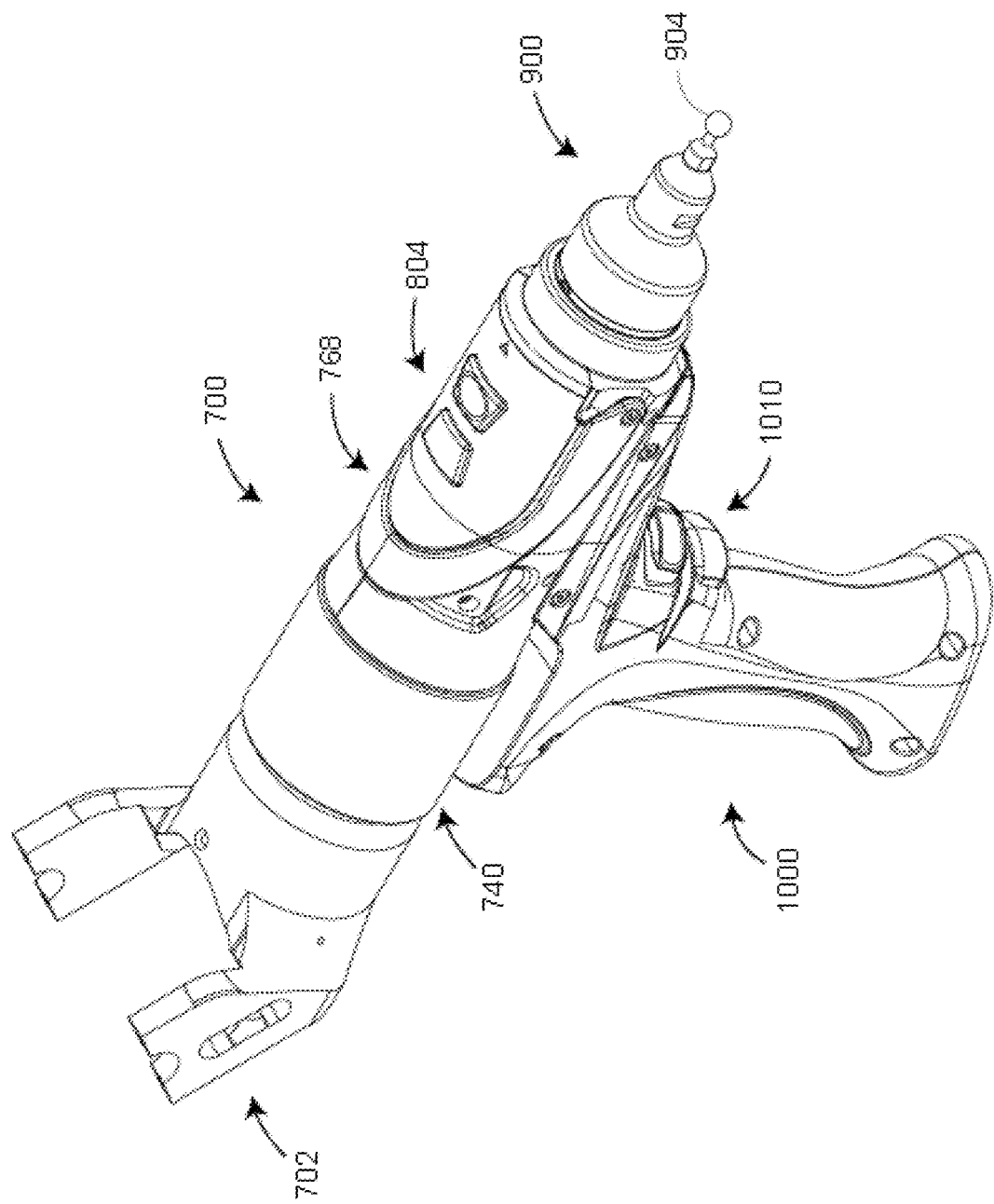
FIG. 18 is an isometric view of a seventh-axis assembly including a removable handle according to an embodiment.

In an embodiment, the AACMM 10 includes seven rotation axes, as illustrated beginning with FIG. 18. In another embodiment, the AACMM 10 includes six rotation axes. In an embodiment illustrated in FIG. 18 and FIGS. 19A-19G, the seventh-axis assembly 700 includes a seventh-axis housing/yoke 702, a shaft 750, a seventh-axis slip ring 710, a probe latch 768, upper end-effector buttons 804, a seventh-axis circuit board 820, and a carrier 770. In an embodiment, the seventh-axis housing/yoke 702 attaches at one end to the fourth/sixth-axis shaft 418 (FIG. 16B) of the six-axis assembly 600. In this attachment, the seventh-axis housing/yoke 702 serves a yoke function. The seventh-axis housing/yoke 702 couples to outer races of a rear bearing 732 and to the outer races of a front bearing 736. The shaft 750 couples to inner races of the rear bearing 732 and the front bearing 736. In an embodiment, the shaft 750 rotates about a seventh axis 711 relative to the housing/yoke 702. In an embodiment, a wave washer 734 applies force to the outer race of the rear bearing 732. The inner race of the rear bearing 732 is press fit onto the shaft 750. This results in preload being applied to both the rear bearing 732 and the front bearing 736.

In an embodiment, the encoder disk 724 is glued to the shaft 750, centered, and allowed to cure. An encoder board 723 with read heads 722 is attached to a read-head adapter 720, which in turn is attached to the housing/yoke 702. A seventh-axis slip ring 710 includes a slip-ring housing 712, a slip-ring shaft 714, a slip-ring flange 716, a front slip-ring cable 718, a rear slip-ring cable 717, bus connectors 719 attached to the rear slip-ring cable 717, and bus connectors 839 attached to the front slip-ring cable 718. In an embodiment, the slip-ring flange 716 is attached to an adapter plate 704 that is coupled to the yoke/housing 702. The slip-ring shaft 714 rotates independently of the slip-ring housing 712 and turns in response to force applied by wires that twist as the shaft rotates about the seventh axis 711. The seventh-axis slip ring 710 maintains electrical continuity among corresponding wires in the front slip-ring cable 718 and the rear slip-ring cable 717 even as the slip-ring shaft 714 rotates relative to the slip-ring housing 712. In an embodiment, each of the rear slip-ring cable 717 and the front slip-ring cable 718 include wires of the first bus 2182 and the second bus 2184. A T-connector 2152 associated with a T-cable 2154 of the first bus 2182 attaches to a board connector 2174 of the encoder board with read heads 722.

The nut assembly 740 surrounds the housing/yoke 702 and the shaft 750 at a central portion of the seventh-axis assembly 700. As shown in FIGS. 23A, 23B, 23C, and FIG. 23D, the nut assembly 740 includes a clutch nut 741, a clutch flexure 744, a nut cover 747 and snap rings 749. In an embodiment, the clutch flexure 744 attaches to the clutch nut 741 in two parts, with each part having flexure ridges 745 that fit into clutch nut grooves 743. As shown in FIG. 23C, a rear portion of the clutch nut 741 fits into the nut cover 747 and is locked into place with the two snap rings 749. A front portion of the clutch nut 741 includes a clutch nut flange 742 having an inner clutch-nut threaded region 739. As is shown in FIG. 19F, the clutch-nut threaded region 739 screws onto a threaded region 751 of the shaft 750. The clutch nut flange 742 is coupled to a push shoe shown in FIG. 19F. The push shoe 802 may be used to either engage or release the removable seventh-axis cover 800, the handle 1000 (FIG. 18), the LLP 1100 (FIG. 24A), or any other accessory attached to the seventh-axis assembly 700 in place of the seventh-axis cover 800. The nut assembly 740 provides a way of engaging or releasing the push shoe 802 while applying a consistent level of force to internal elements within the seventh-axis assembly 700. The result of this consistent level of force by the nut assembly 700 is to enable tactile probes and accessory measuring devices to be attached to the seventh-axis assembly 700 with a greater degree of consistency than would otherwise occur. In an embodiment, the nut assembly 740 reduces or eliminates the need to perform a compensation (also referred to as a calibration) on the tactile probe or other measuring device.

In an embodiment, the seventh-axis assembly 700 includes a first heater element 713 that is disposed about an inside diameter of yoke housing 702. In an embodiment, a second heater element 715 is thermally coupled to the shaft 750 within the hollow interior portion 717. In one or more embodiments, the seventh-axis assembly 700 may include either or both of the heater elements 713, 715. The heater elements 713, 714 are electrically coupled to the base processor 2040, such as via bus 2138 for example. The base processor activates the heater elements 713, 715 in response to a signal from an adjacent temperature sensor, such as temperature sensor associated with encoder board 723 for example, indicating that the temperature of the seventh-axis assembly 700 is below a predetermined temperature range.

It should be appreciated that while embodiments herein may describe the heater elements as being associated with each of the axis assemblies 200, 300, 400, 500, 600, 700, this is for exemplary purposes and the claims should not be so limited. In other embodiments, only a single axis assembly may have a heater assembly. In still further embodiments, one or more axis-assemblies may have heater elements.

Figure 20:
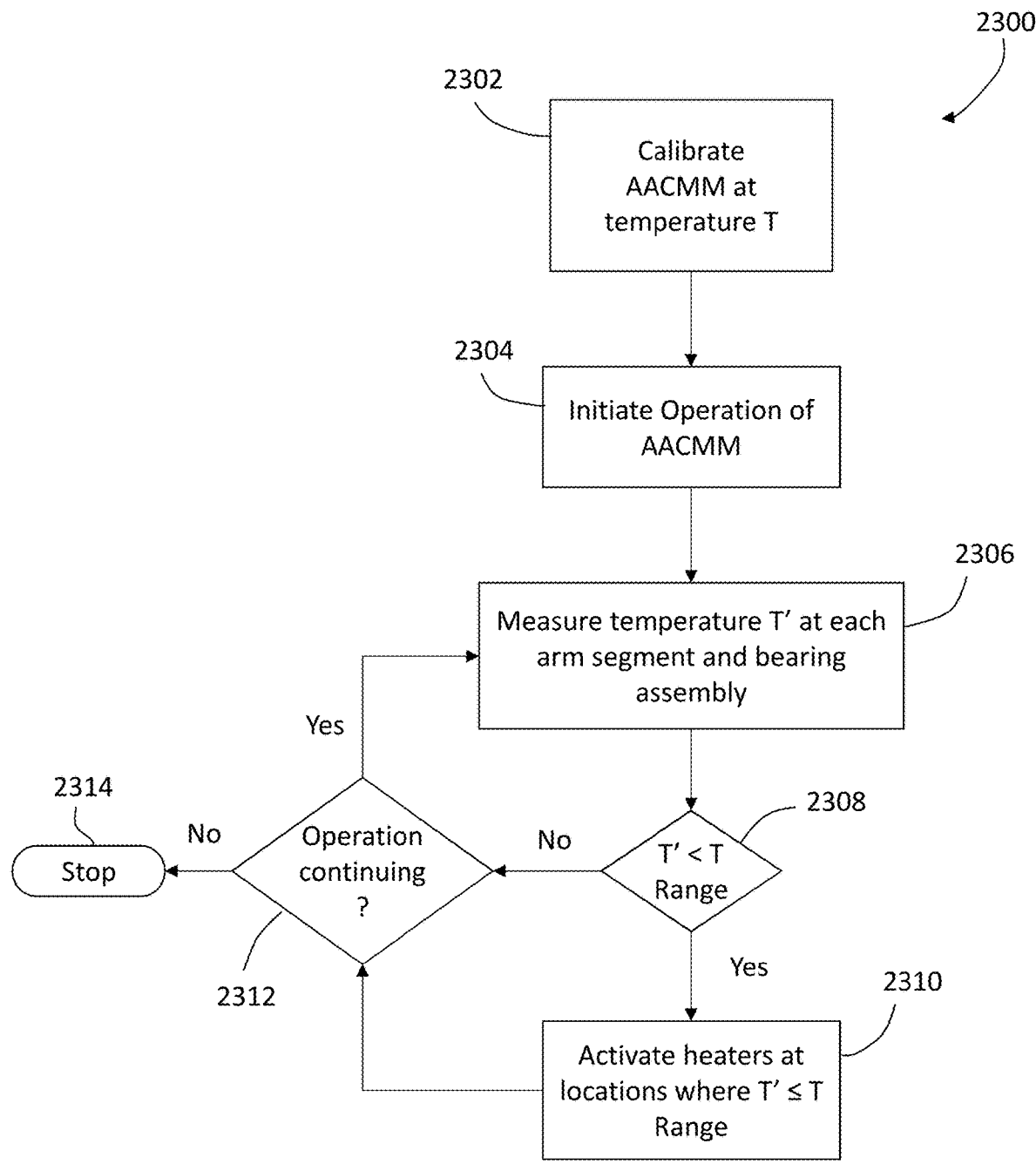
FIG. 20 is a flow diagram illustrating a method of operating the AACMM in accordance with an embodiment.

Referring now to FIG. 20, a method 2300 is shown for operating an AACMM having integrated heater elements. The method 2300 begins in block 2302 where the AACMM is assembled and calibrated (e.g. at the factory) at a predetermined temperature T. The method 2300 then proceeds to block 2304 where operation of the AACMM is initiated (e.g. at a customer's location). The method 2300 then proceeds to block 2306 where the operating temperature T' is measured at each location associated with a heater element.

The method 2300 then proceeds to query block 2308 where each measured temperature T' is compared with a predetermined operating temperature range. When the measured temperature T' of one or more components is less than or equal to the temperature range (e.g. the lower threshold of the temperature range), then the method 2300 proceeds to block 2310 where the heater elements associated with the temperature sensors that measured a temperature T' that was less than the temperature range are activated. After activating the heater elements, or when the query block 2308 returns a negative, the method 2300 proceeds to query block 2312 where it is determined if the operation of the AACMM is continuing. When the query block 2312 returns a positive, the method 2300 loops back to block 2306. When the query block 2312 returns a negative, the method 2300 proceeds to stop block 2314. In an embodiment, at stop block 2314, all of the heater elements are deactivated.

It should be appreciated that while specific embodiments herein refer to the placement of heater elements within particular arm segments or bearing assemblies, it should be appreciated that this is for example purposes and heater elements may be omitted from one or more of the arm segments or bearing assemblies and still fall within the scope of the claimed invention.

The technical effects and benefits from some of the disclosed embodiments includes the modulating of the temperature of components within the AACMM to maintain the component within a desired temperature range so as to provide a desired level of measurement accuracy by the AACMM.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A portable articulated arm coordinate measuring machine (AACMM) for measuring the coordinates of an object in space, comprising:
   a base;
   a manually positionable arm portion having an opposed first end and second end, the arm portion being rotationally coupled to the base, the arm portion including a plurality of connected arm segments, each arm segment including at least one position transducer for producing a position signal and at least one temperature sensor for producing a temperature signal;
   at least one heater element associated with at least one of the plurality of connected arm segments;
   a measurement probe coupled to the first end;

an electronic circuit that receives the temperature signal and activates the at least one heater element when a measured temperature is less than a predetermined temperature range.

2. The AACMM of claim 1, wherein the plurality of connected arm segments includes a first arm segment and a second arm segment.

3. The AACMM of claim 2, further comprising a first axis-assembly and a second axis assembly coupled between the base and the first arm segment.

4. The AACMM of claim 3, further comprising a first heater element thermally coupled to the first-axis assembly.

5. The AACMM of claim 4, wherein the first axis-assembly includes a bearing cartridge having a shaft and a housing operably coupled by a pair of bearings, the first heater element being thermally coupled to one of the shaft or housing.

6. The AACMM of claim 3, further comprising a third-axis rotary assembly and a fourth-axis rotary assembly coupled between the first arm segment and the second arm segment.

7. The AACMM of claim 4, further comprising a second heater element thermally coupled to one of the third rotary assembly and the fourth rotary assembly.

8. The AACMM of claim 7, further comprising a third heater element thermally coupled to the other of the third rotary assembly and the fourth rotary assembly.

9. The AACMM of claim 2, further comprising a fourth heater assembly thermally coupled to the first arm segment.

10. The AACMM of claim 9, wherein first arm segment includes a first tube operably coupled between the base and the second arm segment.

11. The AACMM of claim 10, wherein the fourth heater assembly is coupled to an inside diameter of the first tube.

12. The AACMM of claim 10, wherein the second arm segment includes a second tube operably coupled between the first arm segment and the first end.

13. The AACMM of claim 2, further comprising at least one segment temperature sensor operably coupled to measure a temperature of one of the first arm segment or the second arm segment.

14. The AACMM of claim 13, wherein the at least one segment temperature sensor includes a first segment temperature sensor and a second segment temperature sensor, the first segment temperature sensor being operably coupled to measure a first temperature of the first arm segment, the second segment temperature sensor being operably coupled to measure a second temperature of the second arm segment.

15. A portable articulated arm coordinate measuring machine (AACMM) for measuring the coordinates of an object in space, comprising:
a base;
a first-axis assembly coupled to the base and a second-axis assembly coupled to the first-axis assembly;
a first arm segment coupled to the second-axis assembly;
a second arm segment operably coupled to the first arm segment;
a measurement probe operably coupled to the second arm segment;
at least one heater element associated with at least one of the first-axis assembly, the second-axis assembly, the first arm segment or the second arm segment;
at least one temperature sensor associated with at least one of the first-axis assembly, the second-axis assembly, the first arm segment or the second arm segment, the at least one temperature sensor producing a temperature signal; and
an electronic circuit that receives the temperature signal and activates the at least one heater element when a measured temperature is less than a predetermined temperature range.

16. The AACMM of claim 15, wherein the first-axis assembly includes a first bearing cartridge having a housing operably coupled to a shaft by a pair of bearings.

17. The AACMM of claim 16, wherein the at least one heater element is thermally coupled to the shaft.

18. The AACMM of claim 17, wherein the at least one heater element is thermally coupled to the housing.

19. The AACMM of claim 18, wherein the at least one heater is coupled to an outer surface of the housing.

20. The AACMM of claim 18 wherein the at least one heater is coupled to the housing in a gap between the shaft and an inside diameter of the housing.

21. The AACMM of claim 15, wherein the at least one heater is thermally coupled to at least one of the first arm segment and the second arm segment.

22. The AACMM of claim 21, wherein the first arm segment includes a segment tube, the at least one heater element being coupled to an inside diameter of the segment tube.

23. The AACMM of claim 22, wherein the segment tube is made from aluminum.

* * * * *